US012703074B2

(12) United States Patent
Gehret et al.

(10) Patent No.: US 12,703,074 B2
(45) **Date of Patent: *Aug. 11, 2026**

(54) POWER TOOL WITH MULTISPEED TRANSMISSION

(71) Applicant: BLACK & DECKER INC., New Britain, CT (US)

(72) Inventors: Robert S. Gehret, Hampstead, MD (US); David C. Tomayko, Ellicott City, MD (US); Heather Schafer, Street, MD (US); Joseph Patrick Kelleher, Parkville, MD (US); Joseph Carl Biser, Parkville, MD (US); Trevor J. Koenig, Lancaster, PA (US)

(73) Assignee: Black & Decker Inc., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,326

(22) Filed: Mar. 18, 2024

(65) Prior Publication Data

US 2024/0261952 A1 Aug. 8, 2024

Related U.S. Application Data

(63) Continuation of application No. 16/952,758, filed on Nov. 19, 2020, now Pat. No. 11,964,375.

(Continued)

(51) Int. Cl.
*B25F 5/00* (2006.01)
*B25F 5/02* (2006.01)

(52) U.S. Cl.
CPC ................ *B25F 5/001* (2013.01); *B25F 5/02* (2013.01)

(58) Field of Classification Search
CPC ........... B25F 5/001; B25F 5/02; H01H 63/34; H01H 71/02
See application file for complete search history.

(56) References Cited

U.S. PATENT DOCUMENTS 1,785,798 A 12/1930 Weiss
2,001,036 A 5/1935 Prince (Continued)

FOREIGN PATENT DOCUMENTS

CN 110853960 A 2/2020
DE 3234571 C2 1/1985

(Continued)

OTHER PUBLICATIONS

Extended European Search Report, EP Application No. 20210243.0, Oct. 29, 2021, 8 pages, EPO.

(Continued)

*Primary Examiner* — Daniel Jeremy Leeds
(74) *Attorney, Agent, or Firm* — Brake Hughes Bellermann LLP

(57) ABSTRACT

A multi-speed, power-driven tool may include a transmission mechanism that transmits power from a motor to an output device. A speed selection mechanism may be coupled to the transmission mechanism, to control a speed reduction through the transmission mechanism, and an output speed of the tool. The transmission mechanism may employ a compound, stepped, planetary gear assembly, to provide for an axially compact arrangement of transmission mechanism components, to reduce an axial length of the tool. The speed selection mechanism may employ a multi-staged grounding device, corresponding to the reduced axial length of the transmission mechanism.

33 Claims, 62 Drawing Sheets

Related U.S. Application Data

(60) Provisional application No. 63/198,123, filed on Sep. 30, 2020, provisional application No. 62/941,043, filed on Nov. 27, 2019.

(56) References Cited

U.S. PATENT DOCUMENTS

| | | | |
|---|---|---|---|
| 2,489,102 | A | 11/1949 | Moore |
| 2,723,777 | A | 11/1955 | Amtsberg |
| 2,829,222 | A | 4/1958 | Dunham |
| 2,845,806 | A | 8/1958 | Miller |
| 3,234,821 | A | 2/1966 | Himmel et al. |
| 3,381,546 | A | 5/1968 | Holl |
| 3,473,416 | A | 10/1969 | Pope et al. |
| 3,589,489 | A | 6/1971 | Fehlings |
| 3,723,692 | A | 3/1973 | Wilbrecht |
| 3,727,484 | A | 4/1973 | Shea et al. |
| 3,766,805 | A | 10/1973 | Shea et al. |
| 3,842,691 | A | 10/1974 | Shea |
| 3,843,852 | A | 10/1974 | Lockard |
| 3,872,742 | A | 3/1975 | States |
| 4,185,520 | A | 1/1980 | Henneman et al. |
| 4,324,958 | A | 4/1982 | Valleau |
| 4,418,766 | A | 12/1983 | Grossmann |
| 4,493,223 | A | 1/1985 | Kishi et al. |
| 4,513,637 | A | 4/1985 | Hirt |
| 4,565,151 | A | 1/1986 | Buma |
| 4,621,541 | A | 11/1986 | Takahashi |
| 4,791,833 | A | 12/1988 | Sakai et al. |
| 4,892,013 | A | 1/1990 | Satoh |
| 5,011,463 | A | 4/1991 | Jarchow et al. |
| 5,025,903 | A | 6/1991 | Elligson |
| 5,458,206 | A | 10/1995 | Bourner et al. |
| 5,466,196 | A | 11/1995 | Ra et al. |
| 5,484,349 | A | 1/1996 | Ra et al. |
| 5,500,496 | A | 3/1996 | Venzke et al. |
| 5,517,876 | A | 5/1996 | Genise et al. |
| 5,550,416 | A | 8/1996 | Fanchang et al. |
| 5,692,575 | A | 12/1997 | Hellstrom |
| 5,704,433 | A | 1/1998 | Bourner et al. |
| 5,794,325 | A | 8/1998 | Fallandy |
| 5,897,454 | A | 4/1999 | Cannaliato |
| 5,900,603 | A | 5/1999 | Brush |
| 5,954,144 | A | 9/1999 | Thames |
| 5,967,934 | A | 10/1999 | Ishida et al. |
| 6,045,303 | A | 4/2000 | Chung |
| 6,070,675 | A | 6/2000 | Mayer et al. |
| 6,086,502 | A | 7/2000 | Chung |
| 6,142,242 | A | 11/2000 | Okumura et al. |
| 6,196,943 | B1 | 3/2001 | Chen |
| 6,213,224 | B1 | 4/2001 | Furuta et al. |
| 6,305,481 | B1 | 10/2001 | Yamazaki et al. |
| 6,408,951 | B1 | 6/2002 | Lin |
| 6,431,289 | B1 | 8/2002 | Potter et al. |
| 6,435,285 | B1 | 8/2002 | Tsai |
| RE37,905 | E | 11/2002 | Bourner et al. |
| 6,502,648 | B2 | 1/2003 | Milbourne |
| 6,523,442 | B2 | 2/2003 | Lehnert et al. |
| 6,599,219 | B2 | 7/2003 | Pan |
| 6,655,470 | B1 | 12/2003 | Chen |
| 6,676,557 | B2 | 1/2004 | Milbourne et al. |
| 6,796,921 | B1 | 9/2004 | Buck et al. |
| 6,805,207 | B2 | 10/2004 | Hagan et al. |
| 6,857,983 | B2 | 2/2005 | Milbourne et al. |
| 6,892,827 | B2 | 5/2005 | Toyama et al. |
| 6,939,262 | B1 | 9/2005 | Yu |
| 6,983,810 | B2 | 1/2006 | Hara et al. |
| 6,984,188 | B2 | 1/2006 | Potter et al. |
| 7,044,882 | B2 | 5/2006 | Eisenhardt |
| 7,101,300 | B2 | 9/2006 | Milbourne et al. |
| 7,121,361 | B2 | 10/2006 | Hara et al. |
| 7,124,839 | B2 | 10/2006 | Furuta et al. |
| 7,198,586 | B2 | 4/2007 | Brooks et al. |
| 7,220,210 | B2 | 5/2007 | Soh |
| 7,220,211 | B2 | 5/2007 | Potter et al. |
| 7,223,195 | B2 | 5/2007 | Milbourne et al. |
| 7,225,884 | B2 | 6/2007 | Aeberhard |
| 7,288,041 | B2 | 10/2007 | Bucknor et al. |
| 7,300,374 | B2 | 11/2007 | Bucknor et al. |
| 7,308,948 | B2 | 12/2007 | Furuta |
| 7,314,097 | B2 | 1/2008 | Jenner et al. |
| 7,334,646 | B2 | 2/2008 | Hara et al. |
| 7,354,375 | B2 | 4/2008 | Brooks et al. |
| 7,380,612 | B2 | 6/2008 | Furuta |
| 7,380,613 | B2 | 6/2008 | Furuta |
| 7,404,781 | B2 | 7/2008 | Milbourne et al. |
| 7,407,460 | B2 | 8/2008 | Eisenhardt |
| 7,410,441 | B2 | 8/2008 | Milbourne et al. |
| 7,452,304 | B2 | 11/2008 | Hagan et al. |
| 7,467,570 | B2 | 12/2008 | Wang |
| 7,513,845 | B2 | 4/2009 | Ho |
| 7,537,064 | B2 | 5/2009 | Milbourne et al. |
| 7,579,566 | B2 | 8/2009 | Sloan et al. |
| 7,662,061 | B2 | 2/2010 | Nagao |
| 7,900,714 | B2 | 3/2011 | Milbourne et al. |
| 7,980,324 | B2 | 7/2011 | Bixler et al. |
| 7,987,556 | B2 | 8/2011 | Chang |
| 8,118,702 | B2 | 2/2012 | Hansson |
| 8,205,685 | B2 | 6/2012 | Bixler et al. |
| 8,235,859 | B2 | 8/2012 | Yun |
| 8,251,158 | B2 | 8/2012 | Tomayko et al. |
| 8,303,449 | B2 | 11/2012 | Ho et al. |
| 8,434,564 | B2 | 5/2013 | Tomayko et al. |
| 8,460,153 | B2 | 6/2013 | Rudolph et al. |
| 8,485,275 | B2 | 7/2013 | Kuroyanagi et al. |
| 8,584,770 | B2 | 11/2013 | Zhang et al. |
| 8,720,598 | B2 | 5/2014 | Herr |
| 8,760,102 | B2 | 6/2014 | Hirabayashi |
| 8,851,201 | B2 | 10/2014 | Limberg et al. |
| 8,961,358 | B2 | 2/2015 | Hirabayashi |
| 9,014,933 | B2 | 4/2015 | Chen et al. |
| 9,205,547 | B2 | 12/2015 | Hirabayashi et al. |
| 9,233,461 | B2 | 1/2016 | Tomayko |
| 9,347,548 | B2 | 5/2016 | Vicenzo |
| 9,481,080 | B2 | 11/2016 | Kuehne |
| 9,482,316 | B2 | 11/2016 | Kurth |
| 9,579,785 | B2 | 2/2017 | Bixler et al. |
| 9,604,354 | B2 | 3/2017 | Tomayko |
| 9,724,816 | B2 | 8/2017 | Hecht et al. |
| RE46,827 | E | 5/2018 | Rudolph et al. |
| 10,118,486 | B2 | 11/2018 | Oram et al. |
| 10,195,731 | B2 | 2/2019 | Tomayko |
| 10,234,020 | B2 | 3/2019 | Vicenzo |
| 10,328,565 | B2 | 6/2019 | Moessnang et al. |
| 10,464,201 | B2 | 11/2019 | Kuehne |
| 10,497,523 | B2 | 12/2019 | Wong |
| 10,926,398 | B2 | 2/2021 | Tomayko |
| 11,059,160 | B2 | 7/2021 | Kuehne et al. |
| 11,302,498 | B1 | 4/2022 | Piper |
| 11,491,632 | B2 | 11/2022 | Kuehne |
| 11,738,439 | B2 | 8/2023 | Tomayko |
| 2003/0143042 | A1 | 7/2003 | Doyle et al. |
| 2005/0028997 | A1 | 2/2005 | Hagan et al. |
| 2005/0061524 | A1 | 3/2005 | Hagan et al. |
| 2005/0077063 | A1 | 4/2005 | Oretti |
| 2005/0215385 | A1 | 9/2005 | Spielmann et al. |
| 2006/0211534 | A1 | 9/2006 | Roberts et al. |
| 2007/0084614 | A1 | 4/2007 | Whitmire et al. |
| 2007/0201748 | A1 | 8/2007 | Bixler et al. |
| 2008/0173459 | A1 | 7/2008 | Kuroyanagi et al. |
| 2008/0220925 | A1 | 9/2008 | Schwingshandl |
| 2008/0287247 | A1 | 11/2008 | Pusateri |
| 2009/0071671 | A1 | 3/2009 | Zhong et al. |
| 2009/0071673 | A1 | 3/2009 | Zhong et al. |
| 2009/0173510 | A1 | 7/2009 | Milbourne et al. |
| 2009/0242226 | A1 | 10/2009 | Tokunaga |
| 2010/0071923 | A1 | 3/2010 | Rudolph et al. |
| 2010/0163261 | A1 | 7/2010 | Tomayko et al. |
| 2010/0200257 | A1 | 8/2010 | Scrimshaw et al. |
| 2011/0036605 | A1 | 2/2011 | Leong et al. |
| 2011/0162861 | A1 | 7/2011 | Borinato et al. |
| 2011/0186320 | A1 | 8/2011 | Ito |
| 2011/0214891 | A1 | 9/2011 | Roehm |
| 2011/0220377 | A1 | 9/2011 | Roehm |

(56) References Cited

U.S. PATENT DOCUMENTS

| | | | |
|---|---|---|---|
| 2011/0220379 | A1 | 9/2011 | Bixler et al. |
| 2011/0220380 | A1 | 9/2011 | Roehm |
| 2011/0275471 | A1 | 11/2011 | Roehm et al. |
| 2012/0000657 | A1 | 1/2012 | Dalmazzone et al. |
| 2012/0006574 | A1 | 1/2012 | Atsumi et al. |
| 2012/0010043 | A1 | 1/2012 | Inagaki et al. |
| 2012/0028753 | A1 | 2/2012 | Atsumi et al. |
| 2012/0040793 | A1 | 2/2012 | Hashimoto |
| 2012/0088620 | A1 | 4/2012 | Saur |
| 2012/0222878 | A1 | 9/2012 | Bixler et al. |
| 2012/0222879 | A1 | 9/2012 | Bixler et al. |
| 2013/0161040 | A1 | 6/2013 | Tomayko et al. |
| 2013/0220655 | A1 | 8/2013 | Tomayko |
| 2014/0024489 | A1 | 1/2014 | Heber et al. |
| 2015/0083451 | A1 | 3/2015 | Nishikawa |
| 2015/0367493 | A1 | 12/2015 | Pedersen |
| 2016/0250742 | A1 | 9/2016 | Kuehne |
| 2018/0264637 | A1 | 9/2018 | Kuehne et al. |
| 2019/0111556 | A1 | 4/2019 | Tomayko |
| 2020/0090886 | A1 | 3/2020 | Wong |
| 2021/0146521 | A1 | 5/2021 | Tomayko |
| 2021/0170564 | A1 | 6/2021 | Gehret et al. |
| 2021/0299841 | A1 | 9/2021 | Kuehne et al. |

FOREIGN PATENT DOCUMENTS

| | | | |
|---|---|---|---|
| DE | 3736413 | A1 | 5/1989 |
| DE | 9016415 | U1 | 7/1991 |
| DE | 69504925 | | 10/1998 |
| DE | 29820723 | U1 | 2/1999 |
| DE | 19902187 | A1 | 9/1999 |
| DE | 69516766 | | 6/2000 |
| DE | 20304314 | U1 | 7/2003 |
| DE | 202004006236 | U1 | 7/2004 |
| DE | 102004001251 | A1 | 9/2004 |
| DE | 2020090011705 | U1 | 12/2009 |
| DE | 202011106465 | U1 | 12/2011 |
| EP | 0404035 | A2 | 12/1990 |
| EP | 0695459 | B1 | 9/1998 |
| EP | 0926057 | A2 | 6/1999 |
| EP | 0695892 | B1 | 5/2000 |
| EP | 1382421 | A2 | 1/2004 |
| EP | 1815948 | A2 | 8/2007 |
| EP | 1578564 | B1 | 10/2007 |
| EP | 1886768 | A1 | 2/2008 |
| EP | 1886769 | B1 | 2/2009 |
| EP | 2095909 | A1 | 9/2009 |
| EP | 2368670 | A2 | 9/2011 |
| EP | 2394797 | A2 | 12/2011 |
| EP | 2404710 | A2 | 1/2012 |
| EP | 2161477 | B1 | 8/2012 |
| EP | 2184138 | B1 | 1/2013 |
| EP | 1884318 | B1 | 4/2014 |
| EP | 2338647 | B1 | 11/2014 |
| EP | 2842697 | A1 | 3/2015 |
| EP | 2631038 | B1 | 9/2018 |
| EP | 3477673 | A1 | 5/2019 |
| EP | 2551064 | B1 | 1/2020 |
| EP | 3915732 | A1 | 12/2021 |
| EP | 3572190 | B1 | 4/2022 |
| EP | 3919207 | B1 | 5/2023 |
| EP | 3919231 | B1 | 5/2023 |
| EP | 3919232 | B1 | 5/2023 |
| GB | 857771 | A | 1/1961 |
| GB | 2335011 | B | 6/2000 |
| JP | 2004160592 | A | 6/2004 |
| JP | 2009125909 | A | 6/2009 |
| JP | 2009125910 | A | 6/2009 |
| WO | 2007139784 | A2 | 12/2007 |
| WO | 2009024165 | A1 | 2/2009 |
| WO | 2009027821 | A2 | 3/2009 |
| WO | 2010048889 | A1 | 5/2010 |
| WO | 2010134431 | A1 | 11/2010 |
| WO | 2011085871 | A1 | 7/2011 |
| WO | 2011135076 | A1 | 11/2011 |
| WO | 2012038255 | A1 | 3/2012 |
| WO | 2012093010 | A1 | 7/2012 |
| WO | 2014086795 | A1 | 6/2014 |
| WO | 2015028678 | A1 | 3/2015 |

OTHER PUBLICATIONS

Office Communication, EP Application No. 20210243.0, May 11, 2023, 5 pages, EPO.

Office Communication, EP Application No. 20210243.0, Jul. 25, 2022, 4 pages, EPO.

Extended European Search Report, EP Application No. 20216520.5, Mar. 19, 2021, 9 pages, EPO.

Extended European Search Report, EP Application No. 20216548.6, Mar. 18, 2021, 8 pages, EPO.

Extended European Search Report, EP Application No. 20216570.0, Mar. 19, 2021, 7 pages, EPO.

Communication Pursuant to Article 94(3) EPC issued in EP Application No. 13157018.6 mailed on Nov. 28, 2016, 4 pages.

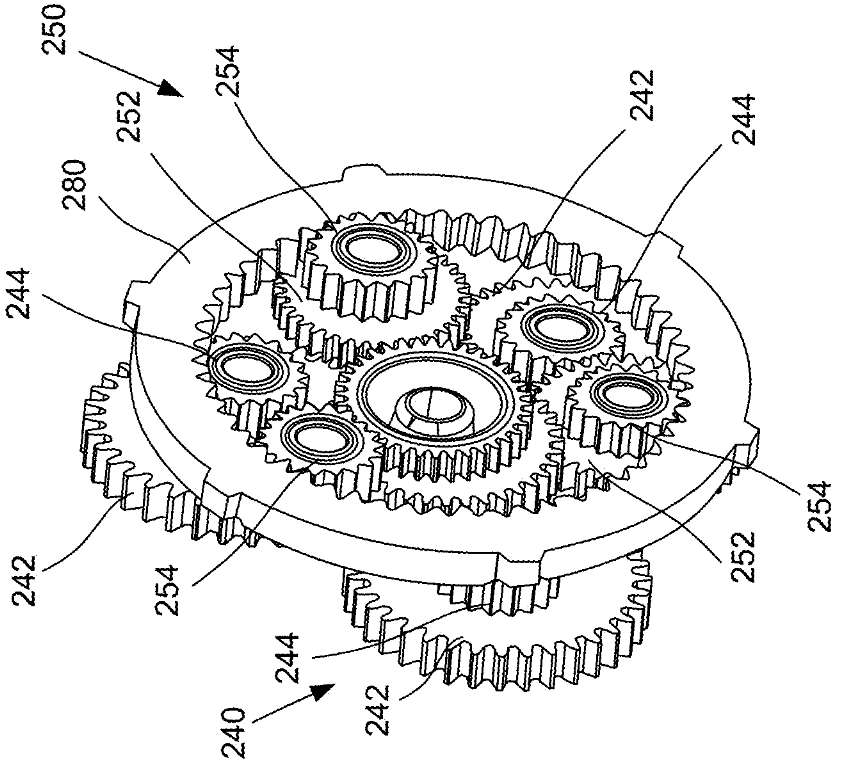
FIG. 8C(2)
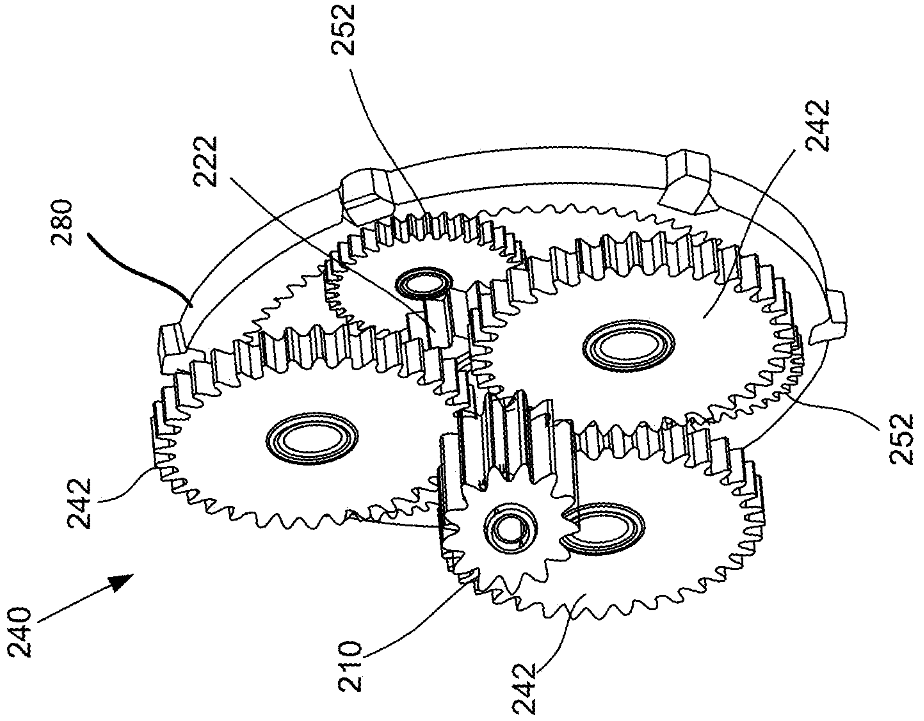
FIG. 8C(1)

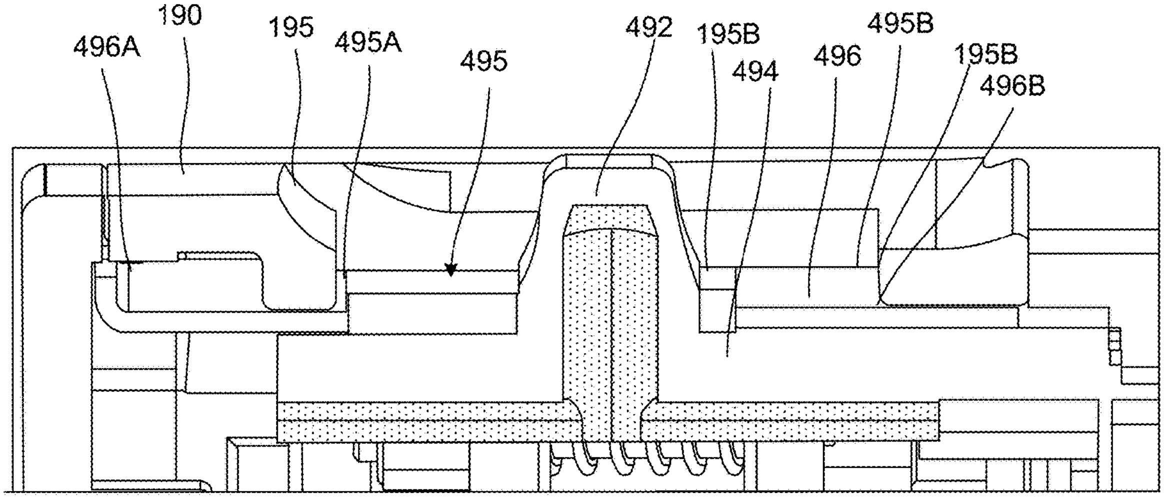
FIG. 20B(1)
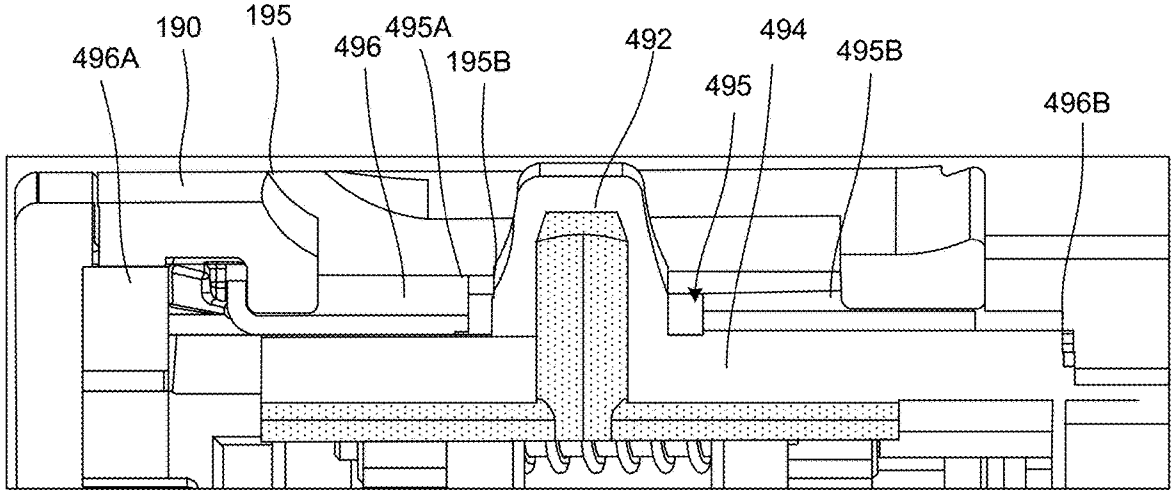
FIG. 20B(2)

POWER TOOL WITH MULTISPEED TRANSMISSION

RELATED APPLICATIONS

This application claims priority, under 35 U.S.C. § 120, as a continuation of U.S. patent application Ser. No. 16/952,758, filed Nov. 19, 2020, titled "Power Tool with Multispeed Transmission," which claims priority under 35 U.S.C. § 119(e), to U.S. Provisional Application No. 63/198,123, filed Sep. 30, 2020 and U.S. Provisional Application No. 62/941,043, filed Nov. 27, 2019. Each of the foregoing patent applications is incorporated by reference.

FIELD

This application relates, generally, to a multi-speed power tool.

BACKGROUND

A power driven tool may output a force generated by a motor of the tool to perform an operation on a workpiece. Multi-speed power tools may operate at multiple different speeds to, for example, accommodate different types of tasks, and/or allow different tasks to be performed at an appropriate operational speed for the particular task. Such multi-speed power tools may employ a transmission mechanism and a clutching mechanism, allowing for power from the motor to be output by an output device of the tool at different speeds to accommodate a variety of different tasks with the same tool. The arrangement of these components within a housing of the tool may render the tool relatively large, and relatively difficult to operate in confined spaces. More compact internal components may enhance utility and functionality of this type of multi-speed tool, thus enhancing utility to the operator.

SUMMARY

In one general aspect, a multi-speed power tool may include a housing, a motor received in the housing, and a multi-speed planetary transmission rotationally driven by the motor and defining a transmission axis, wherein the multi-speed transmission includes a plurality of subsections, each of the plurality of subsections being configured to produce a corresponding speed reduction, the plurality of subsections including a first subsection having a first set of planet gears and a first ring gear meshed with the first set of planet gears, and a second subsection having a second set of planet gears and a second ring gear meshed with the second set of planet gears. The transmission may include a carrier assembly, including a first carrier segment, a second carrier segment, a third carrier segment, a first set of supports or pins connecting the first carrier segment to one of the second carrier segment and the third carrier segment and carrying the first set of planet gears, and a second set of supports or pins connecting the third carrier segment to one of the first carrier segment and the third carrier segment and carrying the second set of planet gears, such that the first, second, and third carrier segments rotate in unison about the transmission axis, wherein the first and second sets of supports or pins are arranged such that each of the first set of planet gears is radially offset from each of the second set of planet gears. The tool may also include an output shaft rotationally driven by the transmission, and a speed selector moveable among a plurality of positions where the speed selector engages one or more of the plurality of subsections so as to cause the transmission to rotate the output shaft at a plurality of different output speeds.

In some implementations, each of the first set of planet gears may include a front face facing the second set of planet gears and aligned in a first plane, and each of the second set of planet gears may include a rear face facing the first set of planet gears and aligned in a second plane, wherein the first plane and the second plane are substantially coplanar.

In some implementations, the transmission may also include a first sun gear meshed with the first set of planet gears and a second sun gear meshed with the second set of planet gears. The first and second sun gears may be axially aligned, with at least the first sun gear being rotatably driven by the motor.

In some implementations, the speed selector may be configured to ground the first ring gear to the housing in a first position to cause the transmission to rotate the output shaft a first speed, and to ground the second ring gear to the housing in a second position to cause the transmission to rotate the output shaft at a second speed that is different than the first speed.

In some implementations, the transmission may include a third subsection having a third set of planet gears and a third ring gear meshed with the third set of planet gears. The third set of planet gears may be carried by a third set of supports or pins connected to one of the first carrier segment, the second carrier segment or the third carrier segment. The speed selector may be configured to ground the first ring gear to the housing in a first position to cause the transmission to rotate the output shaft a first speed, to ground the second ring gear to the housing in a second position to cause the transmission to rotate the output shaft at a second speed that is different from the first speed, and to ground the third ring gear to the housing in a third position to cause the transmission to rotate the output shaft at a third speed that is different from the first speed and the second speed.

In some implementations, the third set of supports or pins may be arranged such that the third set of planet gears is radially offset from each of the first set of planet gears and second set of planet gears. In some implementations, the carrier assembly further may include a fourth carrier segment, wherein the third set of supports or pins connect the fourth carrier segment to one of the second carrier segment or the third carrier segment.

In some implementations, the transmission may include a plurality of sun gears that includes a first sun gear, a second sun gear and a third sun gear. The first, second and third sun gears may be axially aligned. The first set of planet gears may include a first stage thereof engaged with the first sun gear and a second stage thereof engaged with the second sun gear. The second set of planet gears may include a first stage thereof engaged with the second sun gear and a second stage thereof engaged with the third sun gear. The third set of planet gears may be engaged with the third sun gear.

In some implementations, the speed selector may include a shift member having an at least partial ring shape configured to move axially with respect to the transmission, and a plurality of engagement members coupled to the shift member and configured to selectively engage one of the ring gears based on an axial position of the shift member with respect to the transmission. The plurality of engagement members may include a plurality of rods arranged on the shift member and extending in parallel to the transmission axis. At a first axial position of the shift member, a first portion of the plurality of rods may be configured to engage a respective plurality of lugs on an outer circumferential portion of the first ring gear, so as to ground the first ring gear, while the second ring gear remains freely rotatable. At a second axial position of the shift member, a plurality of engagement lugs formed on an inner circumferential portion of the shift member may be configured to engage a respective lug of a plurality of lugs on an outer circumferential portion of the second ring gear, while the first ring gear remains freely rotatable.

In some implementations, the plurality of engagement members may include a plurality of rods arranged circumferentially along the shift member and extending parallel to the transmission axis, the rods including a first protrusion formed at an end portion of the rod and a second protrusion formed at an intermediate portion of the rod between the first protrusion and the shift member. At a first axial position of the shift member, the first protrusion may be configured to engage a lug on an outer circumferential portion of the first ring gear, so as to ground the first ring gear, while the second ring gear remains freely rotatable. At a second axial position of the shift member, the second protrusion may be configured to engage a lug on an outer circumferential portion of the second ring gear, while the first ring gear remains freely rotatable.

In some implementations, the speed selector further may include a switch that is accessible from an outside of the housing, and that is movable within an opening formed in the housing, and at least one shift rail having a first end portion fixed to the switch and a second end portion fixed to the shift member. The switch may include a base portion having a first side portion coupled to the at least one shift rail, a shutter slidably coupled on a second side portion of the base portion, opposite the first side portion thereof, and a grasping member (e.g., a button or lever) extending from the base portion through an opening formed in the shutter. The grasping member (e.g., a button or lever) may be movable to a plurality of different positions between a first end of the opening in the housing and a second end of the opening in the housing, the plurality of different positions corresponding to a plurality of different axial positions of the shift member with respect to the transmission. In some implementations, a distance from a first end of the base portion to a second end of the base portion may be less than a distance from the first end of the opening in the housing to the second end of the opening in the housing, and the shutter may be configured to slide with respect to the base portion as the selection device moves in the opening, such that the shutter and the base portion close the opening in the housing at the plurality of positions of the grasping member (e.g., a button or lever) between the first end and the second end of the opening.

In another general aspect, a multi-speed power tool may include a housing, a motor received in the housing, a multi-speed planetary transmission rotationally driven by the motor and defining a transmission axis. The multi-speed transmission may include a plurality of subsections, each of the plurality of subsections being configured to produce a corresponding speed reduction. The plurality of subsections may include a first subsection having a first set of planet gears and a first ring gear meshed with the first set of planet gears, and a second subsection having a second set of planet gears and a second ring gear meshed with the second set of planet gears. The transmission may include a carrier assembly, including a first carrier segment, a second carrier segment, a third carrier segment, a first set of supports or pins connecting the first carrier segment to one of the second carrier segment or the third carrier segment, and a second set of supports or pins connecting the third carrier segment to one of the first carrier segment or the third carrier segment. The first set of supports or pins carrying the first set of planet gears and the second set of supports or pins may carry the second set of planet gears such that the first, second, and third carrier segments rotate in unison about the transmission axis. Each of the first set of planet gears may include a front face facing the second set of planet gears and aligned in a first plane, and each of the second set of planet gears may include a rear face facing the first set of planet gears and aligned in a second plane, wherein the first plane and the second plane are substantially coplanar. The tool may also include an output shaft rotationally driven by the transmission, and a speed selector moveable among a plurality of positions where the speed selector engages one or more of the plurality of subsections so as to cause the transmission to rotate the output shaft at a plurality of different output speeds.

In some implementations, the transmission may include a third subsection having a third set of planet gears and a third ring gear meshed with the third set of planet gears. The third set of planet gears may be carried by a third set of supports or pins connecting one of the first carrier segment, the second carrier segment or the third carrier segment to a fourth carrier segment. The first set of supports or pins, the second set of supports or pins and the third set of supports or pins may be arranged such that the first set of planet gears, the second set of planet gears, and the third set of planet gears are radially offset from each other. In some implementations, the speed selector may be configured to ground the first ring gear to the housing in a first position to cause the transmission to rotate the output shaft a first speed, to ground the second ring gear to the housing in a second position to cause the transmission to rotate the output shaft at a second speed that is different from the first speed, and to ground the third ring gear to the housing in a third position to cause the transmission to rotate the output shaft at a third speed that is different from the first speed and the second speed.

In some implementations, the speed selector may include a shift member having an at least partial ring shape configured to move axially with respect to the transmission, and a plurality of engagement members arranged circumferentially along the shift member, and extending in parallel to the transmission axis. At a first axial position of the shift member, a first engagement portion defined on the plurality of rods may be configured to engage a respective plurality of lugs on an outer circumferential portion of the first ring gear, so as to ground the first ring gear, while the second ring gear and the third ring gear remain freely rotatable. At a second axial position of the shift member, a second engagement portion defined by engagement lugs formed on an inner circumferential portion of the shift member may be configured to engage a respective lug of a plurality of lugs on an outer circumferential portion of the second ring gear, while the first ring gear and the third ring gear remain freely rotatable. At a third axial position of the shift member, a third engagement defined on the plurality of rods may be configured to engage a respective plurality of lugs on an outer circumferential portion of the third ring gear, so as to ground the third ring gear, while the first ring gear and the second ring gear remain freely rotatable.

In some implementations, the speed selector may include a switch that is accessible from an outside of the housing, and that is movable within an opening formed in the housing, and at least one shift rail having a first end portion fixed to the switch and a second end portion fixed to the shift member. The switch may include a base portion having a first side portion coupled to the at least one shift rail, a shutter slidably coupled on a second side portion of the base portion, opposite the first side portion thereof, and a grasping member (e.g., a button or lever) extending from the base portion through an opening formed in the shutter. The grasping member (e.g., a button or lever) may be movable to a plurality of different positions between a first end of the opening in the housing and a second end of the opening in the housing, the plurality of different positions corresponding to a plurality of different axial positions of the shift member with respect to the transmission.

In another general aspect, a multi-speed power tool may include a housing, a motor received in the housing, a multi-speed planetary transmission rotationally driven by the motor and defining a transmission axis, wherein the multi-speed transmission may include a plurality of subsections, each of the plurality of subsections being configured to produce a corresponding speed reduction, an output shaft rotationally driven by the transmission, and a speed selector moveable among a plurality of positions in which the speed selector engages one or more of the plurality of subsections of the transmission so as to cause the transmission to rotate the output shaft at a plurality of different output speeds. The speed selector may include a switch that is accessible from an outside of the housing, and that is movable within an opening formed in the housing, and at least one shift rail having a first end portion fixed to the switch and a second end portion fixed to a shift member having an at least partial ring shape that selectively engages one of the plurality of subsections of the transmission. The switch may include a base portion having a first side portion coupled to the at least one shift rail, a shutter slidably coupled on a second side portion of the base portion, opposite the first side portion thereof, and a grasping member (e.g., a button or lever) extending from the base portion through an opening formed in the shutter. The grasping member (e.g., a button or lever) may be movable to a plurality of different positions between a first end of the opening in the housing and a second end of the opening in the housing, the plurality of different positions corresponding to a plurality of different axial positions of the shift member with respect to the transmission.

In some implementations, the tool may include a hammer mechanism coupled to the output shaft. The hammer mechanism may include a first ratchet fixed to the output shaft so as to rotate with the output shaft, a second ratchet axially aligned with the first ratchet, and a cam mechanism surrounding the second ratchet. The second ratchet may be non-rotatable, and may be axially movable with respect to the first ratchet.

In some implementations, the cam mechanism may include a cam ring, a plurality of lugs extending radially inward from the cam ring, and a plurality of ramp surfaces defined on the plurality of lugs, and the second ratchet may include a hub, a plurality of lugs extending outward from the hub, and a plurality of teeth formed on a surface of the hub facing the first ratchet. In a first mode of operation, the cam ring may be in a first axial position and a first radial position, each lug of the plurality of lugs of the second ratchet may be positioned between a pair of lugs of the cam mechanism, and the first ratchet and the second ratchet may be axially separated and in a disengaged state. In a second mode of operation, the cam ring may be in a second axial position and a second radial position, the ramp surface of each lug of the plurality of lugs of the cam mechanism may be positioned against a corresponding lug of the plurality of lugs of the second ratchet, and the hub of the second ratchet may be positioned against a mating surface of the first ratchet, such that the teeth defined on the hub of the second ratchet are engaged with teeth on the mating surface of the first ratchet, and an axial percussive force is imparted on the output shaft.

In another general aspect, a multi-speed power tool includes a housing, a motor received in the housing, and a multi-speed planetary transmission rotationally driven by the motor and defining a transmission axis. The multi-speed transmission includes a plurality of sub-sections each of which is configured to provide an intermediate speed reduction when that subsection is active. An output shaft is rotationally driven by the transmission at an output rotational speed defined by intermediate speed reductions of any of the active subsections. A speed selector includes a shift member inside the housing that is moveable among a first plurality of positions where the shift member engages a one or more of the subsections of the transmission to activate one or more of the subjections so as to cause the transmission to rotate the output shaft at a plurality of different output rotational speeds. A switch is accessible from outside the housing, coupled to the shift member, and moveable among a second plurality of positions corresponding to selected output speeds of the transmission to cause movement of the shift member among the first plurality of positions. A plurality of springs is disposed in parallel between the shift member and the switch without any of the plurality of springs arranged serially, the plurality of springs exerting a bi-directional biasing force on the shift member in both an axial forward and an axial rearward direction relative to the switch. If the switch is moved from a first switch position to a second switch position of the second plurality of positions and the shift member is blocked from moving from the a first speed position to a second speed position of the first plurality of positions, the shift member remains stationary and when the shift member is later unblocked from moving from the first speed position to the second speed position, a force provided by the plurality of springs urge the shift member to move to the second speed position while the switch remains stationary.

In some implementations, each subsection may include a plurality of planet gears and a ring gear engaged with the planet gears. The shift member may include an at least partially ring shaped shift ring configured to engage a ring gear in at least one of the subsections of the transmission, wherein the subsection is active when the shift ring engages the ring gear. The shifter may be fixedly coupled to a first end of an axial pin that and is moveable with the axial pin parallel to the transmission axis. The speed selector may include a carriage fixedly coupled to a second end of the axial pin and moveable with the axial pin parallel to the transmission axis. The switch may include a base portion moveably coupled to the carriage with the plurality of springs disposed between the base portion and the carriage. The switch may include a shutter slidably coupled on a second side portion of the base portion, opposite the first side portion thereof, and a grasping portion extending from the base portion through an opening formed in the shutter, wherein the grasping is movable to a plurality of different positions between a first end of the opening in the housing and a second end of the opening in the housing, the plurality of different positions corresponding to a plurality of different axial positions of the shift member with respect to the transmission. A distance from a first end of the base portion to a second end of the base portion may be less than a distance from the first end of the opening in the housing to the second end of the opening in the housing, and the shutter may be configured to slide with respect to the base portion as the selection device moves in the opening, such that the shutter and the base portion close the opening in the housing at the plurality of positions of the button between the first end and the second end of the openings.

In some implementations, the plurality of springs comprises two parallel compression springs. The compression springs may be disposed on a pair of axial pins fixedly coupled to the shifting member. The plurality of sub-sections may include a first subsection having a first set of planet gears and a first ring gear meshed with the first set of planet gears, and a second subsection having a second set of planet gears and a second ring gear meshed with the second set of planet gears. The shifting member may be configured to selectively ground the first ring gear relative to the housing in a first shift position of the shifting member for a first output speed of the output shaft and the second ring gear relative to the housing in a second shift position of the shifting member for a second output speed of the output shaft. The plurality of sub-sections may further include a third subsection having a third set of planet gears and a third ring gear meshed with the third set of planet gears. The shifting member may be configured to selectively ground the third ring gear relative to the housing in a third shift position of the shifting member for a third output speed of the output shaft.

The details of one or more implementations are set forth in the accompanying drawings and the description below. Other features will be apparent from the description and drawings, and from the claims.

BRIEF DESCRIPTION OF THE DRAWINGS

FIG. 8C(1) is a first side perspective view and FIG. 8C(2) is a second side perspective view of an example second ring gear, an example first planet gear assembly and an example second planet gear assembly of the example transmission mechanism shown in FIG. 4, in accordance with implementations described herein.

FIGS. 20A-20D are partial cross-sectional views of the example switching device shown in FIG. 19, installed in an example housing of a multi-speed power-driven tool, in accordance with implementations described herein.

DETAILED DESCRIPTION

Figure 1:
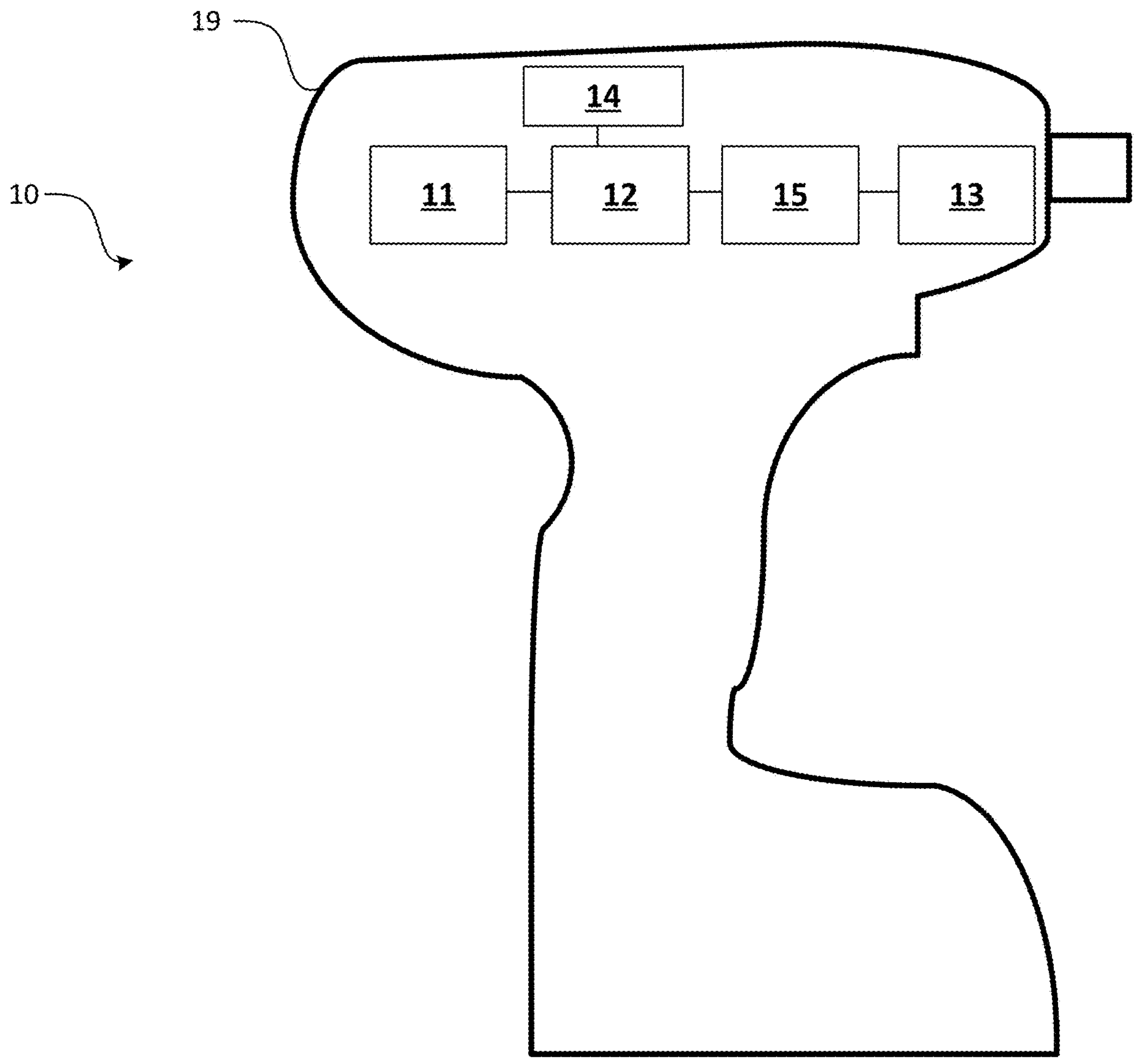
FIG. 1 is a schematic illustration of an example multi-speed power-driven tool.

A schematic view of an example multi-speed power-driven tool 10 is shown in FIG. 1. The example tool 10 may include a driving mechanism 11 generating a driving force, for example, a rotational driving force. A transmission mechanism 12 may be coupled to the driving mechanism 11, to transfer force, for example, rotational force, from the driving mechanism 11 to an output mechanism 13. A speed selection mechanism 14 may be coupled to the transmission mechanism 12. The speed selection mechanism 14 may provide for user selection of an operation speed to be output by the tool 10. In response to such a user selection, the speed selection mechanism may interface with the transmission mechanism 12 to control a rotational speed transmitted from the driving mechanism 11 to the output mechanism 13 accordingly. Some multi-speed power-driven tools may include a hammer or impact mechanism 15, which may be coupled to the output mechanism 13 to selectively impart a repeated impacting force on a workpiece. The driving mechanism 11, the transmission mechanism 12, the output mechanism 13, the speed selection mechanism 14 and the hammer or impact mechanism 15 (when included) may be received in and/or coupled to a housing 19. In some implementations, the driving mechanism 11 may be an electric motor that receives power from, for example, a power storage device (such as, for example, a battery), an external electrical power source, and the like. In some implementations, the driving mechanism 11 may be an air driven, or pneumatic motor, that is powered by compressed air introduced into the housing 19 from an external compressed air source. Other types of driving mechanisms, and other sources of power, may provide for power driven operation of the tool 10.

Figure 2:
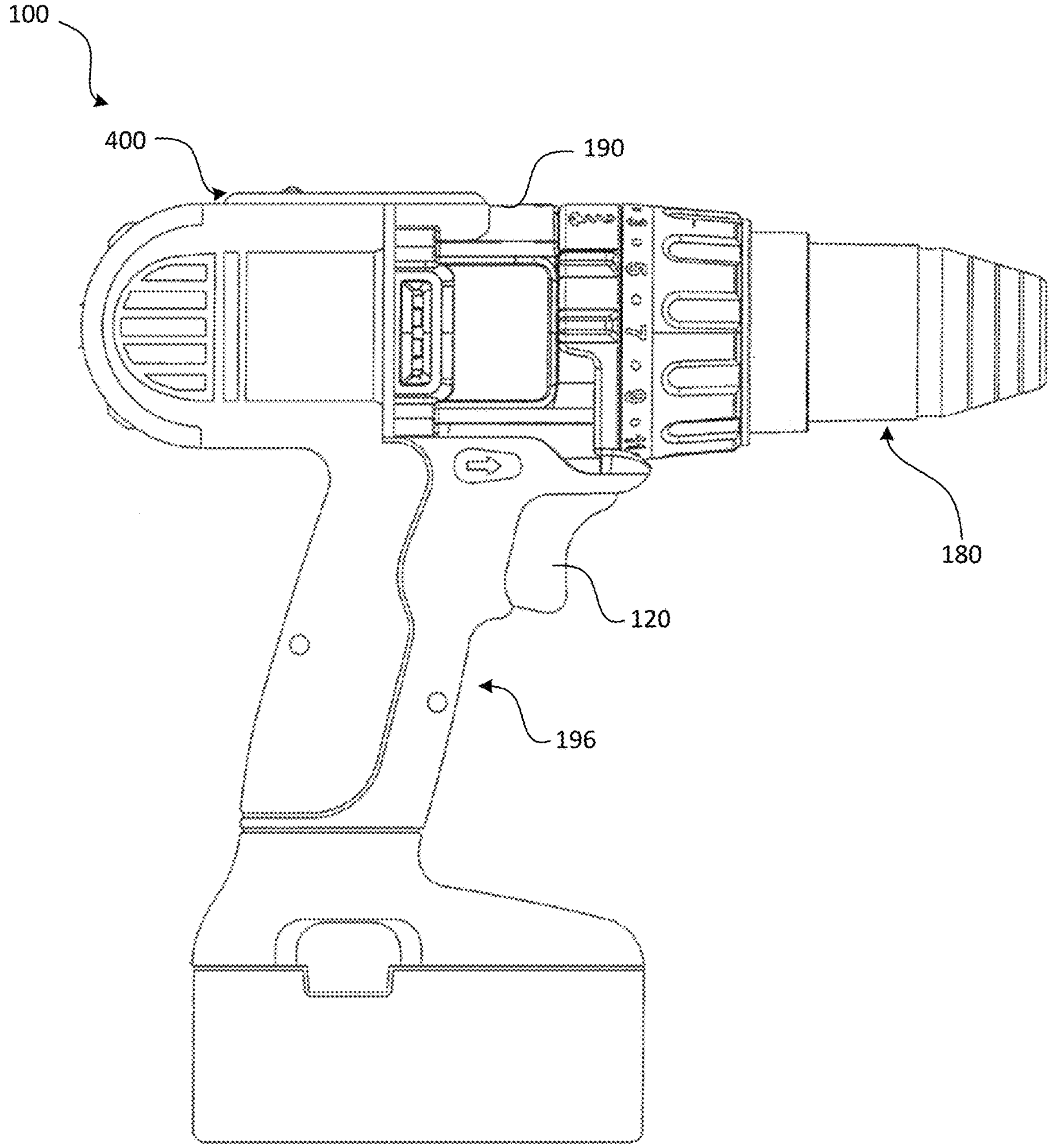
FIG. 2 is a side view of an example multi-speed power-driven tool, in accordance with implementations described herein.
Figure 3:
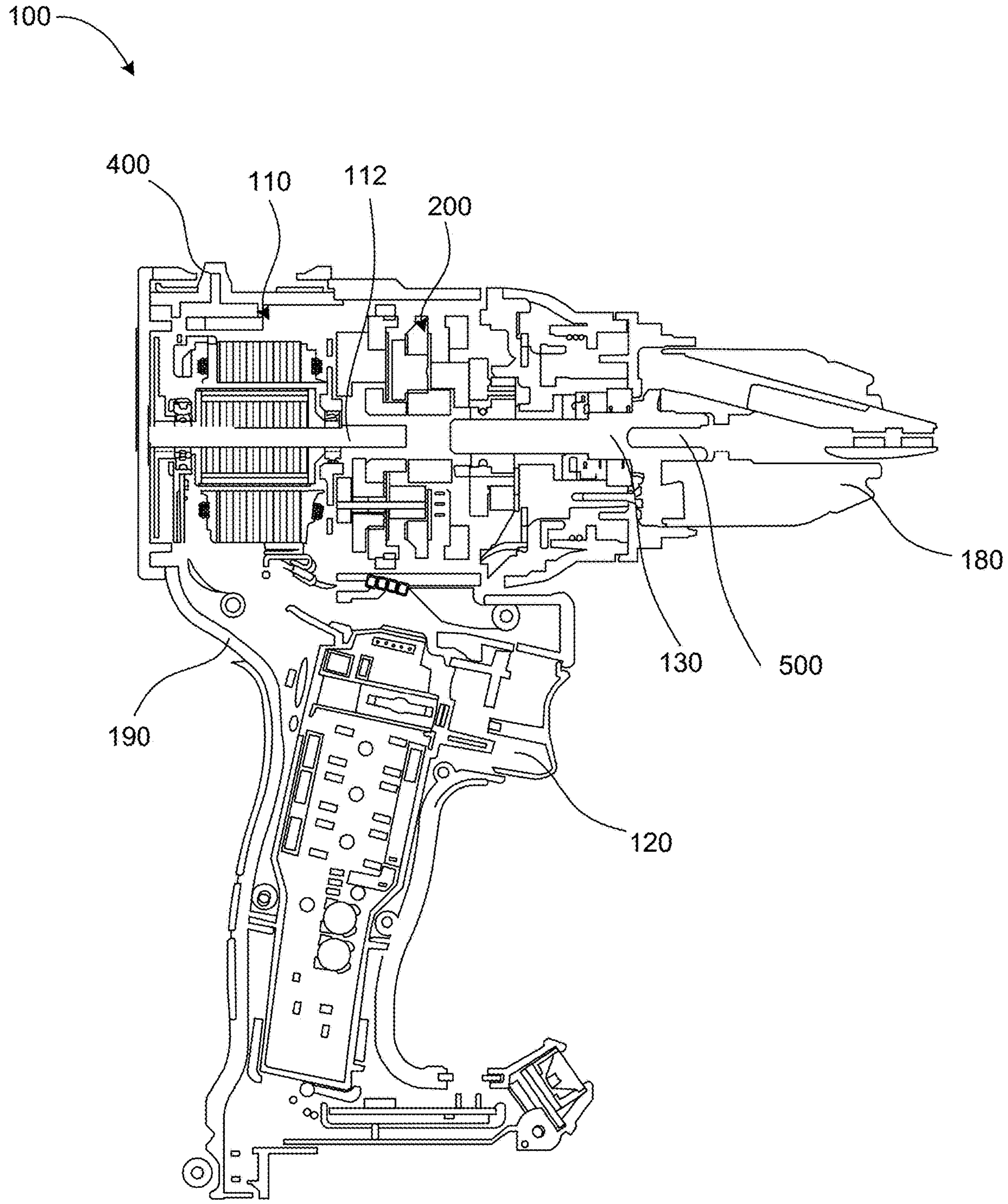
FIG. 3 is an internal view of the example tool shown in FIG. 2, with a portion of a housing removed, so that internal components are visible.

FIGS. 2 and 3 are side views of an example power-driven tool 100, in accordance with implementations described herein. In particular, FIG. 3 provides an internal view of the example tool 100, with a housing 190 shown in FIG. 2 partially removed, so that internal components of the example tool 100 are visible. As shown in FIGS. 2 and 3, the example power tool 100 may include a housing 190, with a chuck assembly 180 at an end portion of the housing 190, for example, at an end portion of the housing 190 corresponding to a working end of the tool 100. A trigger 120 for triggering operation of the tool 100 may be provided at a handle portion 196 of the housing 190. A speed selection mechanism 400, may provide for user selection of an operational speed of the tool 100 through user manipulation of the speed selection mechanism 400.

The example power tool 100 illustrated in FIGS. 2 and 3 is a driving tool, or a drill, simply for purposes of discussion and illustration. The principles to be described herein may be applied to other types of multi-speed power-driven tools. As noted above, in some implementations, power-driven tools such as, for example, the example tool 100 shown in FIGS. 2 and 3, may also optionally include a hammer or impact mechanism 500, which may selectively impart a hammering or impacting force on a fastener/workpiece. The principles to be described herein may applied to other implementations of multi-speed power tools, with or without a hammer/impact mechanism.

The example tool 100 shown in FIG. 3 may include a motor 110 housed in the housing 190 that may output a force, for example, a rotational force, via an output shaft 112, to a transmission mechanism 200. The transmission mechanism 200 may, in turn, transmit the rotary force from the motor 110 to an output mechanism 130, for example, an output spindle 130. As noted above, in some implementations, the tool 100 may include a hammer mechanism 500, or impact mechanism 500, positioned between the transmission mechanism 200 and the chuck assembly 180, to selectively output a hammering/impacting force via the output spindle 130.

Figure 4:
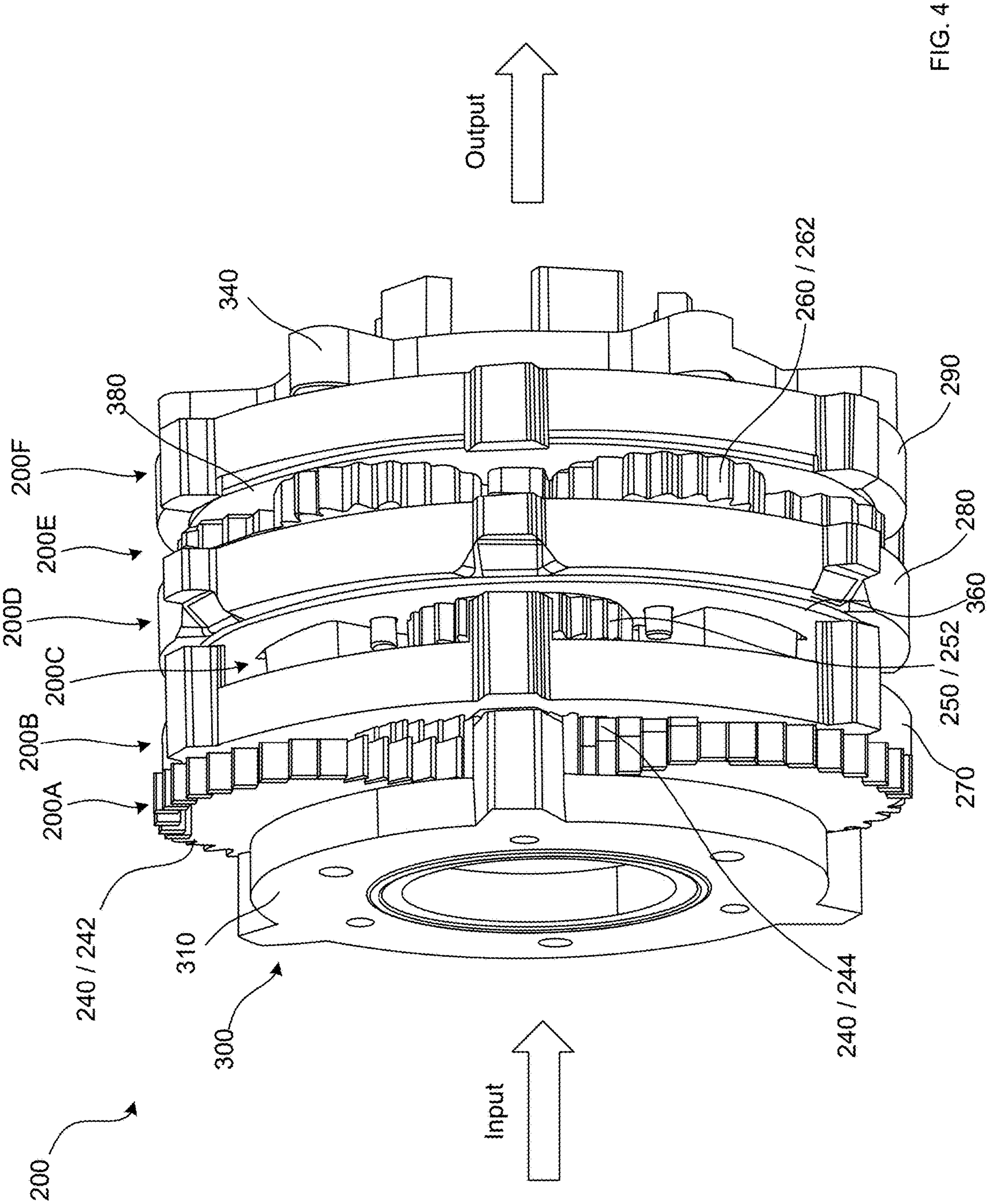
FIG. 4 is a side view of an example transmission mechanism of an example multi-speed power-driven tool, in accordance with implementations described herein.

FIG. 4 is a side perspective view of the example transmission mechanism 200 shown in FIG. 3. As shown in FIG. 4, in some implementations, the transmission mechanism 200 may be a multi-speed compound planetary transmission mechanism 200. In particular, the example transmission mechanism 200 shown in FIG. 4 is a 3-speed compound planetary transmission mechanism 200, having three sets of planet gears, mounted in a common planet carrier assembly 300. The arrangement of the individual components of the compound planetary transmission mechanism 200 in the common planet carrier assembly 300, in accordance with implementations described herein, may provide for an axially compact arrangement of the component planet gear assembly. The example arrangement of the components of the compound planetary transmission mechanism 200 in the common planet carrier assembly 300, may result in a reduced axial length of the transmission mechanism compared to, for example, a radially aligned arrangement of transmission mechanism components. The example arrangement to be described below may reduce bending stresses in the components of the transmission mechanism 200, while allowing the transmission mechanism to achieve a relatively great speed reduction in a relative compact profile.

Figure 5:
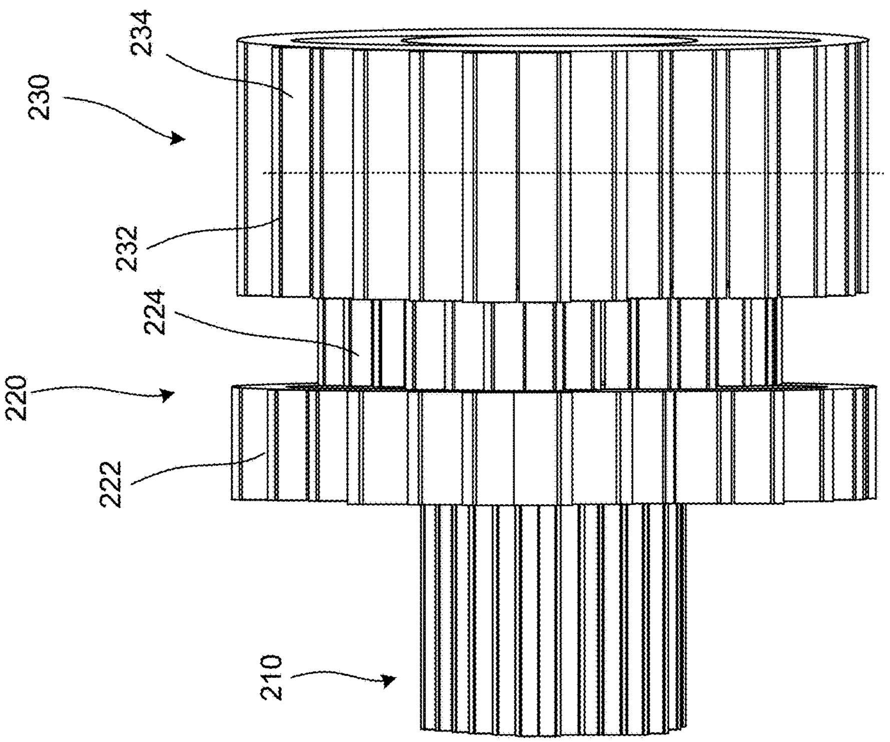
FIG. 5 is a side view of a plurality of sun gears of the example transmission mechanism shown in FIG. 4, in accordance with implementations described herein.

The example transmission mechanism 200 shown in FIG. 4 may include example subsections 200A, 200B, 200C, 200D, 200E, and 200F. In some implementations, the example transmission mechanism 200 may include a first sun gear 210, a second sun gear 220, and a third sun gear 230. The example first, second and third sun gears 210, 220, 230 are not visible in FIG. 4, but are separately illustrated in FIG. 5. The first sun gear 210 may be driven by rotational force of the output shaft 112. In some implementations, the first, second and third sun gears 210, 220, 230 may mesh with first, second, and third stepped compound planet gear assemblies 240, 250, 260, such that the second sun gear 220 rotates in response to rotation of the first compound planet gear assembly 240 and causes rotation of the second compound planet gear assembly 250 and the third sun gear 230 rotates in response to rotation of the second compound planet gear assembly 250 and causes rotation of the of third compound planet gear assembly 260. The example first, second and third stepped compound planet gear assemblies 240, 250, 260 are partially visible in FIG. 4, and are separately illustrated in FIG. 6. The three stepped compound planet gear assemblies 240, 250, 260 may be pinned to and carried by a common planet carrier assembly 300, so as to rotate together as a unit about an axis of the output shaft 112. In some implementations, the three planet gear assemblies 240, 250, 260, may be respectively engaged by three ring gears 270, 280, 290. The example first, second and third ring gears 270, 280, 290 are separately illustrated in FIG. 7. The three ring gears 270, 280, 290 may respectively mesh with a corresponding portion of each of the three compound planet gear assemblies 240, 250, 260. A shift member 410 having an at least partial ring shape 410 (not shown in FIG. 3) of the speed selection mechanism 400 may move axially with respect to the transmission mechanism 200, to selectively ground one of the three ring gears 270, 280, 290 to the housing 190 of the tool 100, to set a selected speed reduction ratio to be output by the transmission mechanism 200. The shift member or ring 410 410 may be a complete ring (e.g., a circular shape) or a partial ring (e.g., a C-shape).

Figure 8A:
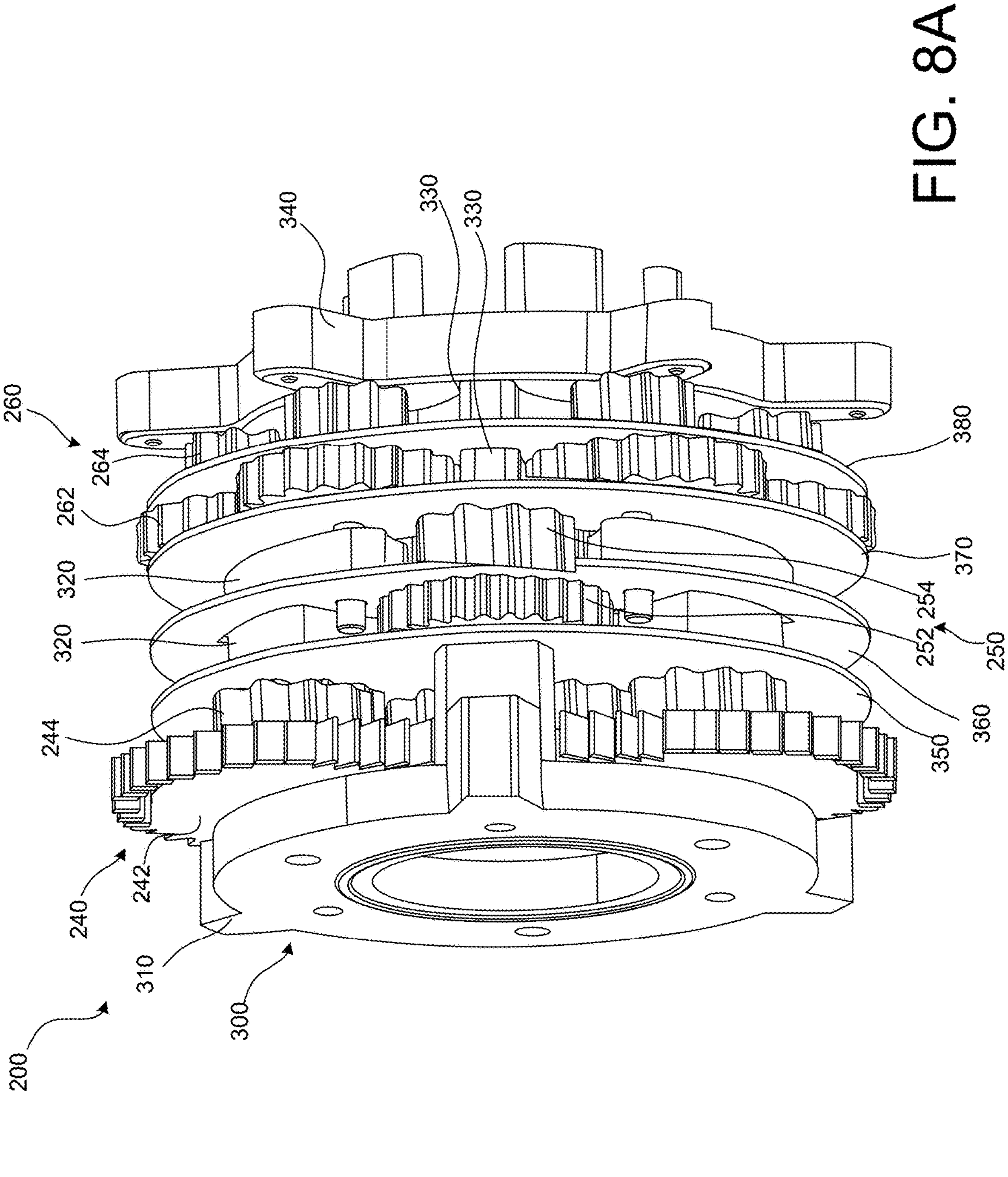
FIG. 8A is a side view of the example transmission mechanism shown in FIG. 4, with the plurality of example ring gears shown in FIG. 7 removed, in accordance with implementations described herein.
Figure 8B:
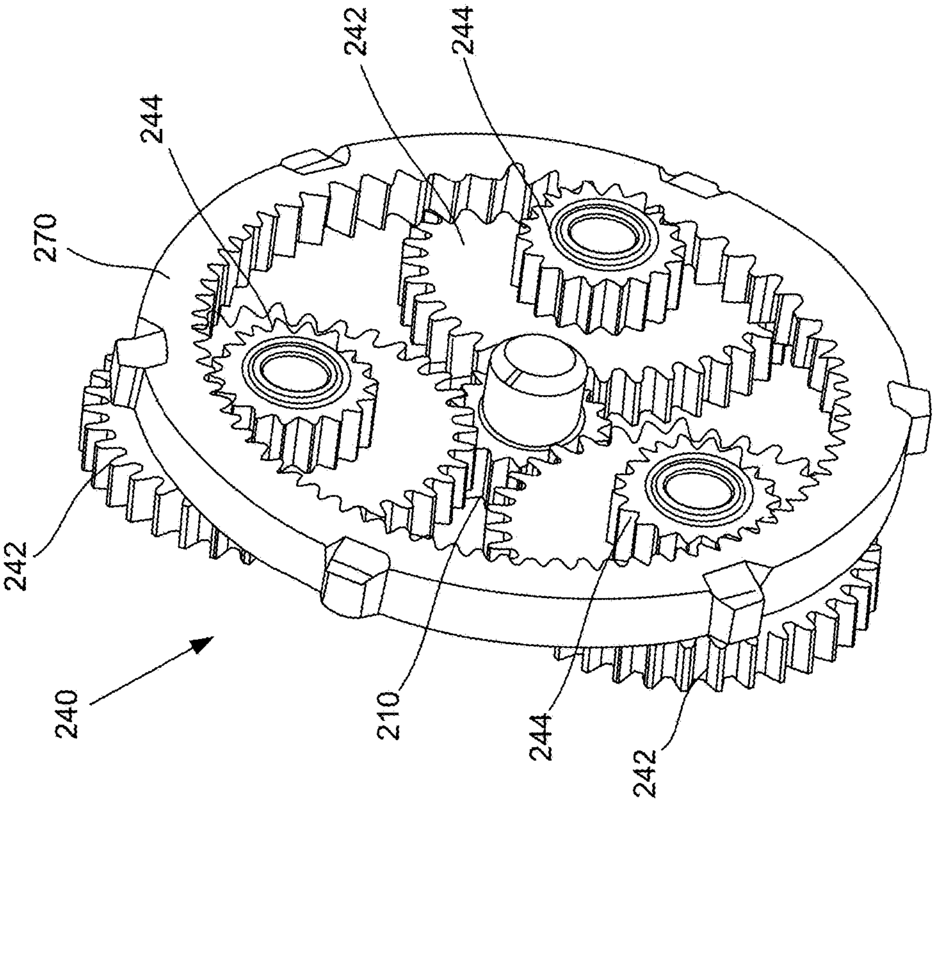
FIG. 8B is a perspective view of an example first ring gear and an example first planet gear assembly of the example transmission mechanism shown in FIG. 4, in accordance with implementations described herein.
Figure 8D:
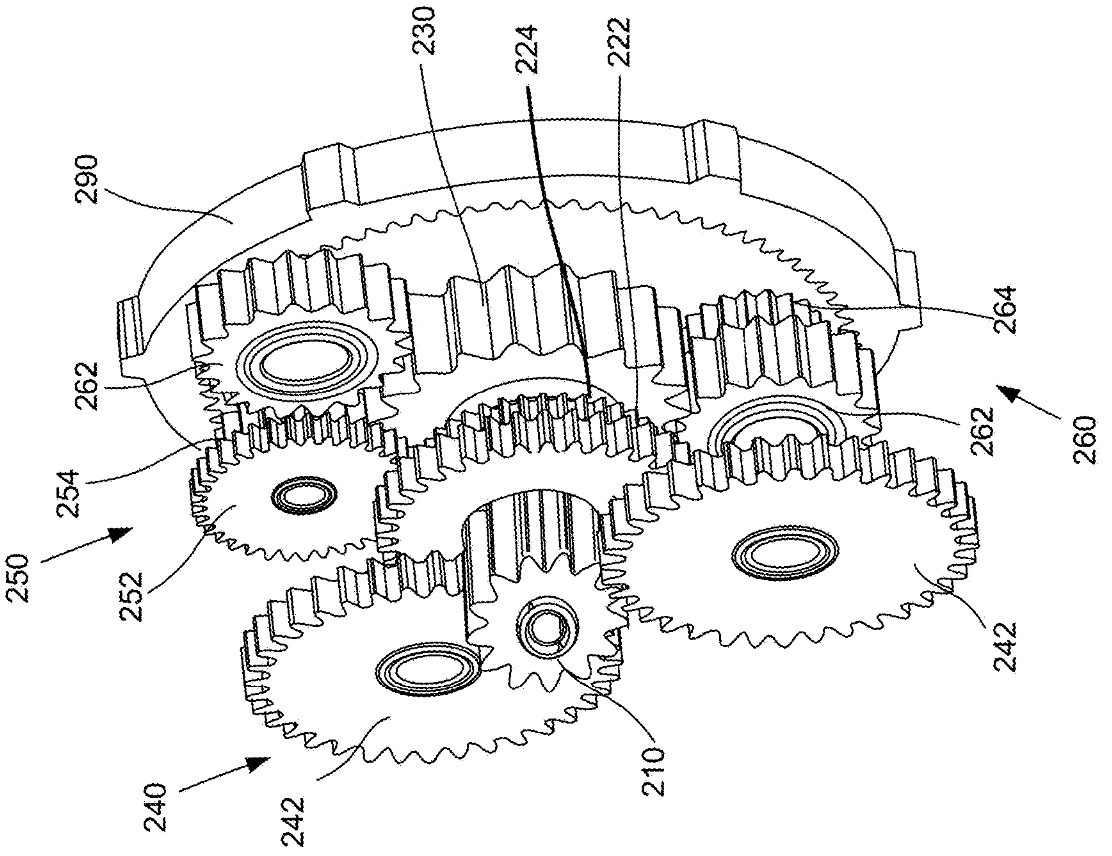
FIG. 8D is a perspective view of an example third ring gear, portions of an example first planet gear assembly, portions of an example second planet gear assembly, and portions of an example third planet gear assembly of the example transmission mechanism shown in FIG. 4, in accordance with implementations described herein.
Figure 9:
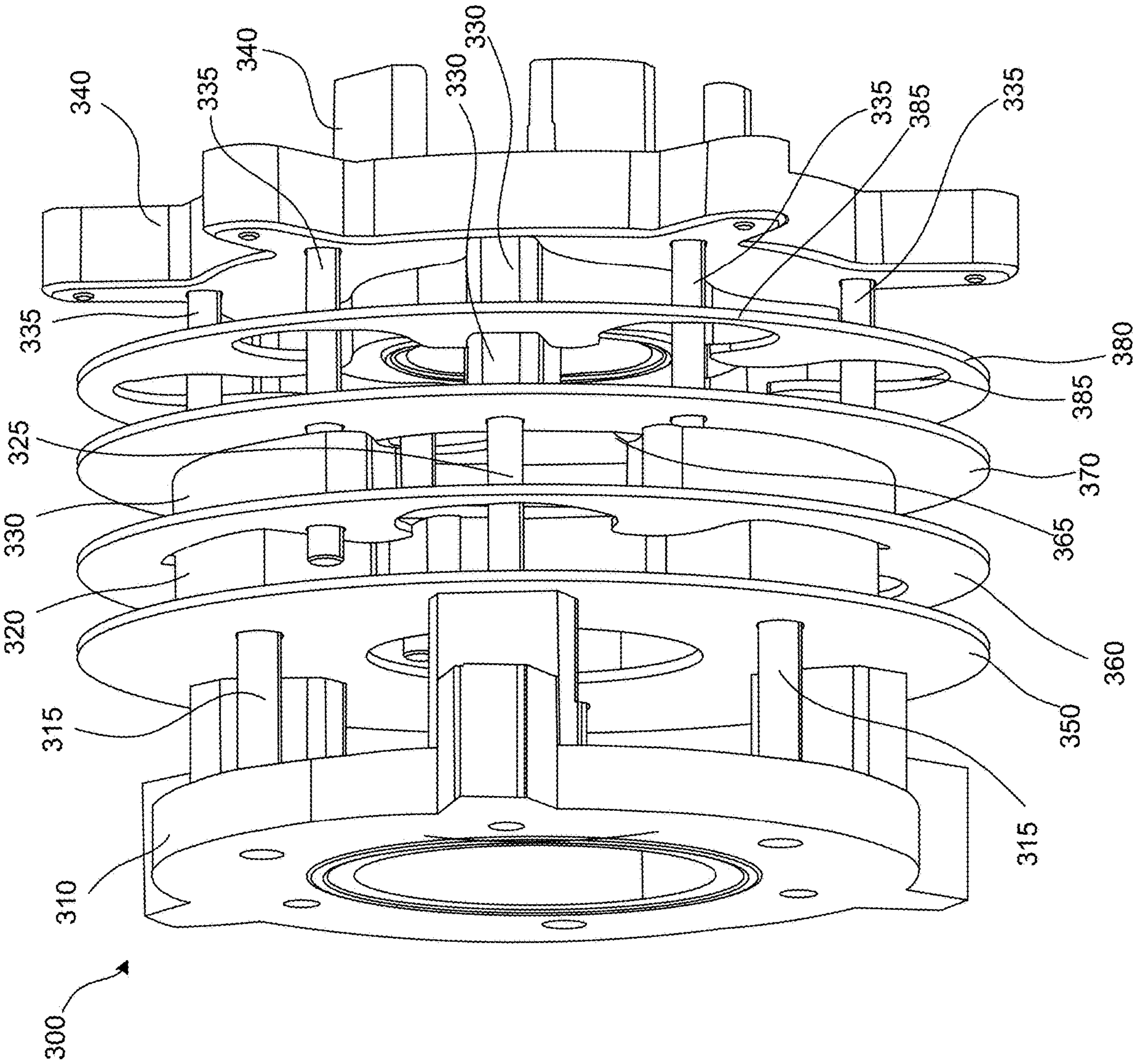
FIG. 9 is a perspective view of an example planet carrier assembly of the example transmission mechanism shown in FIG. 4, in accordance with implementations described herein.
Figure 10:
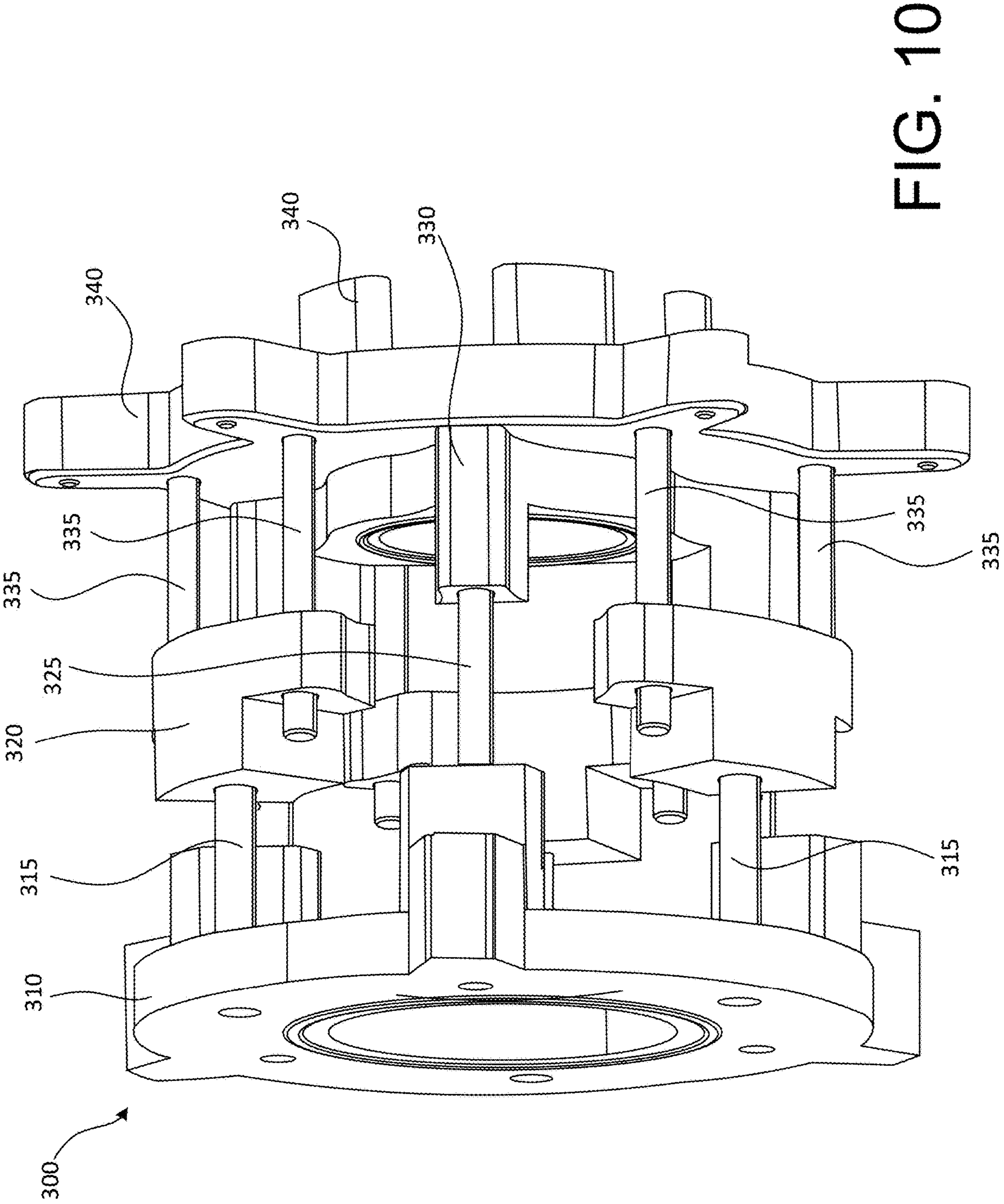
FIG. 10 is a perspective view of the example planet carrier assembly shown in FIG. 9, with a plurality of separator plates removed, in accordance with implementations described herein.

FIG. 8A is a side view of the example transmission mechanism 200 shown in FIG. 4, with the ring gears 270, 280, 290 removed, so that the arrangement of the planet gear assemblies 240, 250, 260 with respect to the components of the planet carrier assembly 300 are more easily visible. FIG. 8B is a perspective view of an arrangement of the first planet gear assembly 240 and the first ring gear 270. FIGS. 8C(1) and 8C(2) are opposite side views of an arrangement of the first planet gear assembly 240, the second planet gear assembly 250 and the second ring gear 280. FIG. 8D is a perspective view of the first, second and third planet gear assemblies 240, 250, 260 and the third ring gear 290, with some of the planet gears removed so that the engagement of the planet gear assemblies 240, 250, 260 is visible. FIG. 9 is a side view of the example planet carrier assembly 300, i.e., a side view without the ring gears 270, 280, 290, the planet gear assemblies 240, 250, 260 and the sun gears 210, 220, 230 of the example transmission mechanism 200 installed therein, so that the arrangement of the components of the planet carrier assembly 300 are more easily visible. FIG. 10 is a side view of the example planet carrier assembly 300, with intermediary plates, or separating plates, or wear plates, removed, so that the arrangement of carrier segments of the planet carrier assembly 300, and of supports or pins connecting the carrier segments of the planet carrier assembly 300, are more easily visible.

Figure 6:
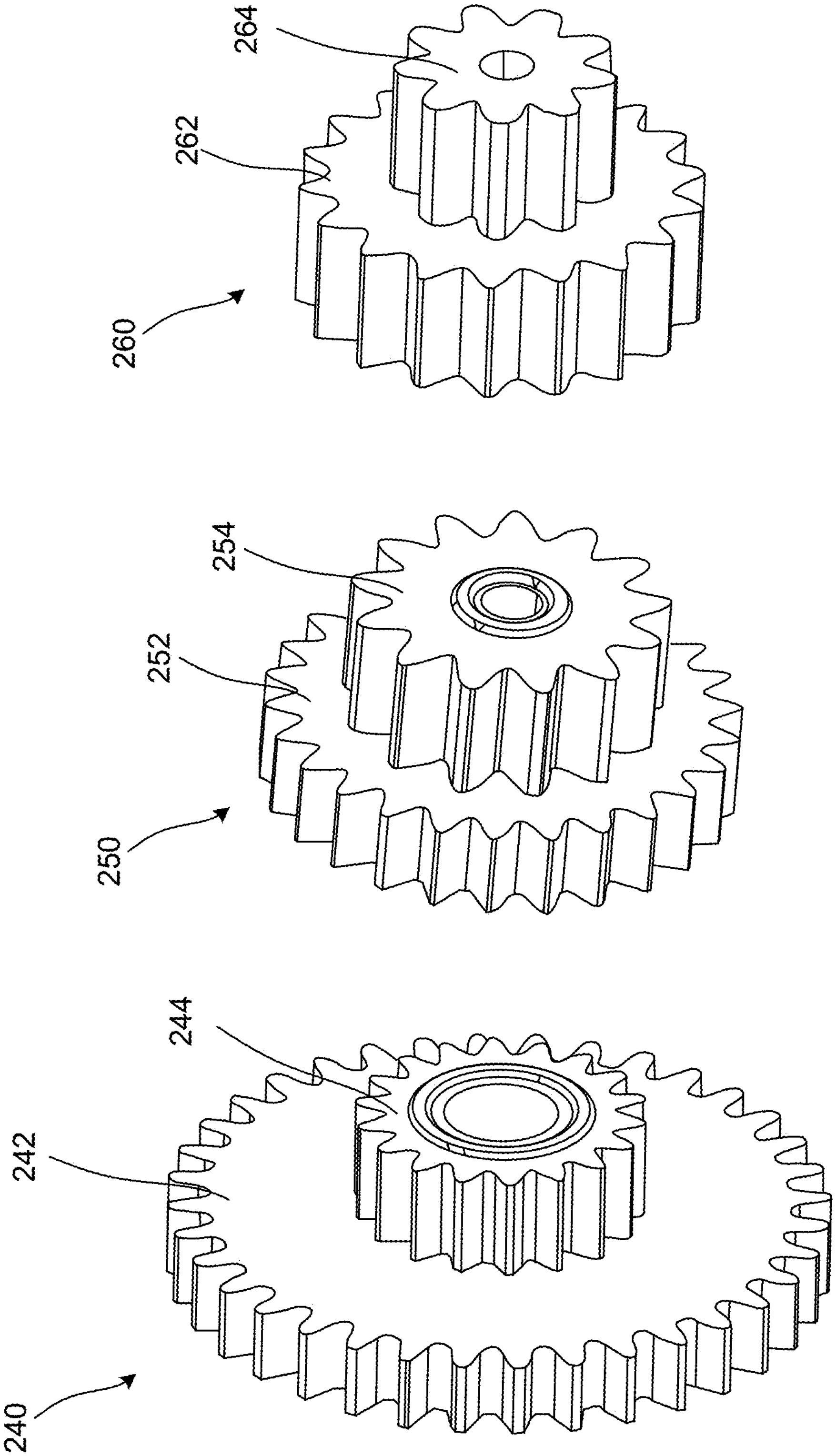
FIG. 6 is a perspective view of a plurality of example planet gears of a plurality of example planet gear assemblies of the example transmission mechanism shown in FIG. 4, in accordance with implementations described herein.
Figure 7:
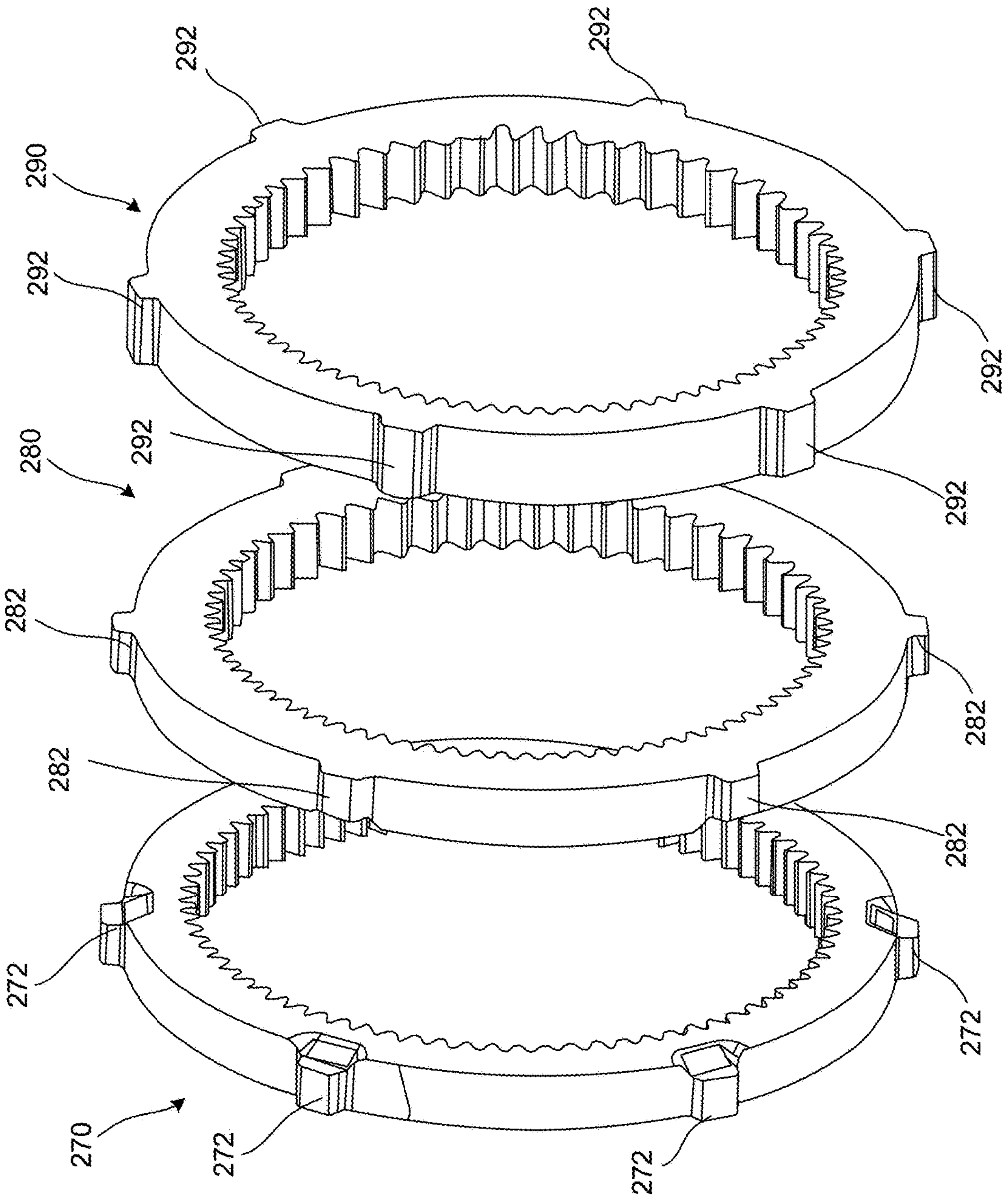
FIG. 7 is a perspective view of a plurality of example ring gears of the example transmission mechanism shown in FIG. 4, in accordance with implementations described herein.

As noted above, the first sun gear 210 may be driven in response to a rotational force transmitted from the motor 110, via the output shaft 112, to the transmission mechanism 200. In this example implementation, the first sun gear 210 is engaged with, for example, in meshed engagement with, the first planet gear assembly 240. For example, each stepped planet gear of the first planet gear assembly 240 may include a first stage gear 242 and a second stage gear 244, as shown in FIG. 6. A dimension such as, for example, a diameter, of the second stage gear 244 may be different from, a corresponding dimension, or diameter, of the first stage gear 242 of the stepped planet gear(s) of the first planet gear assembly 240. In this example, the first sun gear 210 is a single stage (i.e., not stepped) gear, in meshed engagement with the first stage gear 242 of the first planet gear assembly 240.

In this example implementation, the second sun gear 220 may be a compound sun gear including a first stage gear 222 and a second stage gear 224. The second sun gear 220 may span subsections 200B and 200C of the transmission mechanism 200. That is, the first stage gear 222 of the second sun gear 220 may be in meshed engagement with the second stage gear 244 of the first stepped planet gear assembly 240, and the second stage gear 224 of the second sun gear 220 may be in meshed engagement with a first stage gear 252 of the second planet gear assembly 250. In this example implementation, the third sun gear 230 may be a single stage (i.e., not stepped) gear that may span subsections 200D and 200E of the transmission mechanism 200. That is, the third sun gear 230 may include a first portion 232 and a second portion 234. The first portion 232 of the third sun gear 230 may be in meshed engagement with a second stage gear 254 of the second stepped planet gear assembly 250, and the second portion 234 of the third sun gear 230 may be in meshed engagement with a first stage gear 262 of the third planet gear assembly 260.

In this example implementation, each compound stepped planet gear of the first, second and third compound planet gear assemblies 240, 250, 260 may include a concentrically formed larger diameter portion and smaller diameter portion, each larger diameter portion having a greater number of teeth than the respective smaller diameter portion. In some implementations, the larger diameter portion and the smaller diameter portion may be integrally formed. Each compound stepped planet gear of the first, second and third compound planet gear assemblies 240, 250, 260 may rotate about its own respective axis at a substantially constant speed, so that each compound stepped planet gear orbits its respective sun gear at substantially the same rate.

As described above, the first ring gear 270 may be engaged with the first stepped planet gear assembly 240. Similarly, the second ring gear 280 may be engaged with the second stepped planet gear assembly 250, and the third ring gear 280 may be engaged with the third stepped planet gear assembly 260. For example, in some implementations, the first ring gear 270 may be in meshed engagement with the second stage gear 244 of the first planet gear assembly 240; the second ring gear 280 may be in meshed engagement with the second stage gear 254 of the second planet gear assembly 250; and the third ring gear 290 may be in meshed engagement with the second stage gear 264 of the third planet gear assembly 260. In some implementations, for example, an implementation in which an orientation of the third planet gear assembly 260 is reversed from the orientation shown in FIGS. 4, 6 and 8, the third ring gear 290 may be in meshed engagement with the first stage gear 262 of the third planet gear assembly 260.

One of the first ring gear 270, the second ring gear 280 or the third ring gear 290 may be selectively grounded to the housing 190 in response to manipulation of the speed selection mechanism 400 and corresponding axial movement of the shift ring 410 to set a gear reduction ratio of the transmission mechanism 200, and an output speed of the tool 100. When one of the ring gears 270, 280, 290 is grounded to the housing 190, rotation of the grounded ring gear is restricted, i.e., the grounded ring gear cannot rotate. The remaining ring gears (i.e., the ring gears that are not grounded to the housing 190) can freely rotate. For example, in this example implementation, grounding of the first ring gear 270 may produce a first (for example, low) speed reduction ratio through the transmission mechanism 200, and a corresponding first (for example, high) output speed for the tool 100. Grounding of the second ring gear 280 may produce a second, intermediate speed reduction ratio through the transmission mechanism 200, and a corresponding second, intermediate output speed for the tool 100. Grounding of the third ring gear 290 may produce a third (for example, high) speed reduction ratio through the transmission mechanism 200, and a corresponding third (for example, low) output speed for the tool 100.

As shown in FIGS. 8A, 9 and 10, in some implementations, the planet carrier assembly 300 may include a first carrier segment 310 (or set of carrier segments), a second carrier segment 320 (or set of carrier segments), a third carrier segment 330 (or set of carrier segments), and a fourth carrier segment 340 (or set of carrier segments). A set of first supports or pins 315 may connect the first carrier segment 310 and the second carrier segment 320. The gear assemblies of the first stepped planet gear assembly 240 may be carried on the first set of supports or pins 315. A set of second supports or pins 325 may connect the first carrier segment 310 and the third carrier segment 330. The gear assemblies of the second stepped planet gear assembly 250 may be carried on the second set of supports or pins 325. A set of third supports or pins 335 may connect the second carrier segment 320 and the fourth carrier segment 340. The gear assemblies of the third stepped planet gear assembly 260 may be carried on the third set of supports or pins 335. The connection of the first, second, third and fourth carrier segments 310, 320, 330 and 340 by the first, second and third sets of supports or pins 315, 325, 335 in this manner may allow the carrier segments 310, 320, 330 and 340 to rotate together, as a single unit. The first supports or pins 315, the second supports or pins 325 and the third supports or pins 335 may be radially offset from each other. The radial offset of the first, second and third supports or pins 315, 325, 335 may, in turn, provide for a radially offset positioning of the first, second and third planet gear assemblies 240, 250, 260 carried thereon.

This radially offset positioning of the first, second and third planet gear assemblies 240, 250, 260 may allow the first, second and third planet gear assemblies 240, 250, 260 to be axially closer to one another, compared to, for example, an otherwise radially aligned arrangement of the planet gear assemblies along an axial direction of the transmission mechanism. For example, this radially offset positioning of the first, second and third planet gear assemblies 240, 250, 260 may allow a rear plane of one planet gear assembly to be essentially in line with a front plane of the next adjacent planet gear assembly. This relatively compact arrangement of the first, second and third planet gear assemblies 240, 250, 260 may provide for a more axially compact transmission mechanism 200, and a more compact overall tool profile.

The radially offset positioning of the first, second and third planet gear assemblies 240, 250, 260 may allow for the use of multiple, shorter supports or pins 315, 325, 335, compared to, for example, longer supports or pins on which radially aligned gear assemblies might otherwise be axially arranged. The shorter supports or pins 315, 325, 335 may experience reduced bending stress (compared to, for example, longer supports or pins), thus enhancing durability and reliability.

In some implementations, the planet carrier assembly 300 may include a plurality of plates axially positioned between the first carrier segment 310 and the fourth carrier segment 340 of the carrier assembly 300. For example, a first plate 350 may separate subsection 200B from subsection 200C; a second plate 360 may separate subsection 200C from subsection 200D; a third plate 370 may separate subsection 200D from subsection 200E; and a fourth plate 380 may separate subsection 200E from subsection 200F. In some implementations, the plates 350, 360, 370, 380 may be carried on the respective pins 315, 325, 335 and/or on the respective carrier segments 310, 320, 330, 340. Each of the plates 350, 360, 370, 380 may be positioned, for example, axially positioned, between axially adjacent planet gear assemblies 240, 250, 260, to prevent interference between the adjacent planet gear assemblies during operation. In some implementations, the plates 350, 360, 370, 380 may prevent contact between adjacent planet gear assemblies which may impede rotation of the planet gear assemblies and/or cause undue wear of the planet gear assemblies.

In some implementations, one or more of the plates 350, 360, 370, 380 may include cut outs, or cored out areas, to accommodate respective planet gears of the planet gear assemblies 240, 250, 260 therethrough. For example, in the example implementation illustrated in FIG. 9, the second plate 360 includes a cored out area 365 to accommodate the second planet gear assembly 250. Similarly, in the example implementation illustrated in FIG. 9, the fourth plate 380 includes a cored out area 385 to accommodate the third planet gear assembly 260. In some implementations, one or more of the plates 350, 360, 370, 380 may be made of, for example, a steel material. In some implementations, a material for one or more of the plates 350, 360, 370, 380 may be selected based on, for example, a material of a corresponding one or more of the planet gear assemblies 240, 250, 260 and related wear properties, weight considerations, lubrication properties, and other such factors.

Figure 11A:
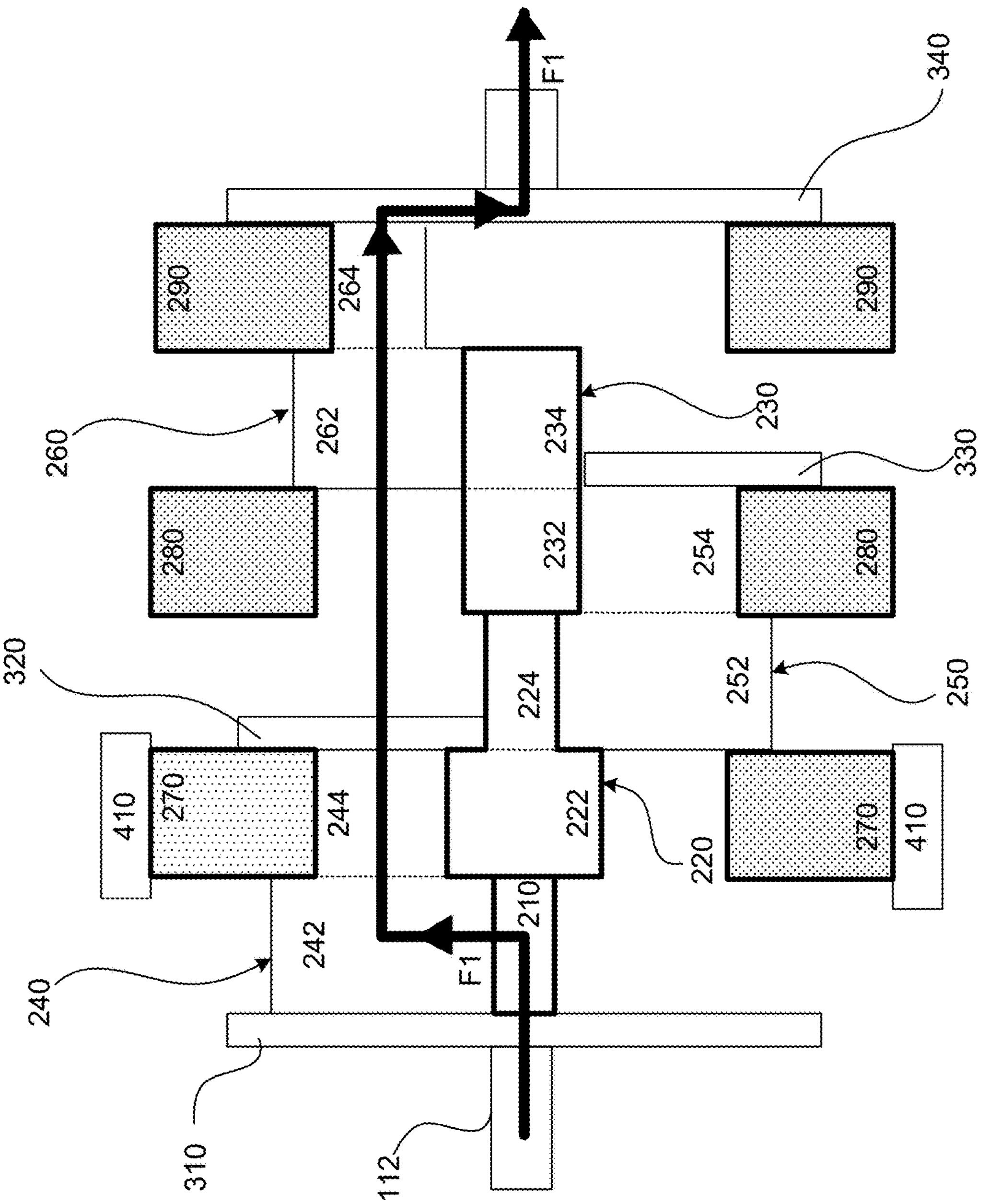
FIG. 11A is a schematic illustration of the example transmission mechanism in a first output speed mode of operation.
Figure 11B:
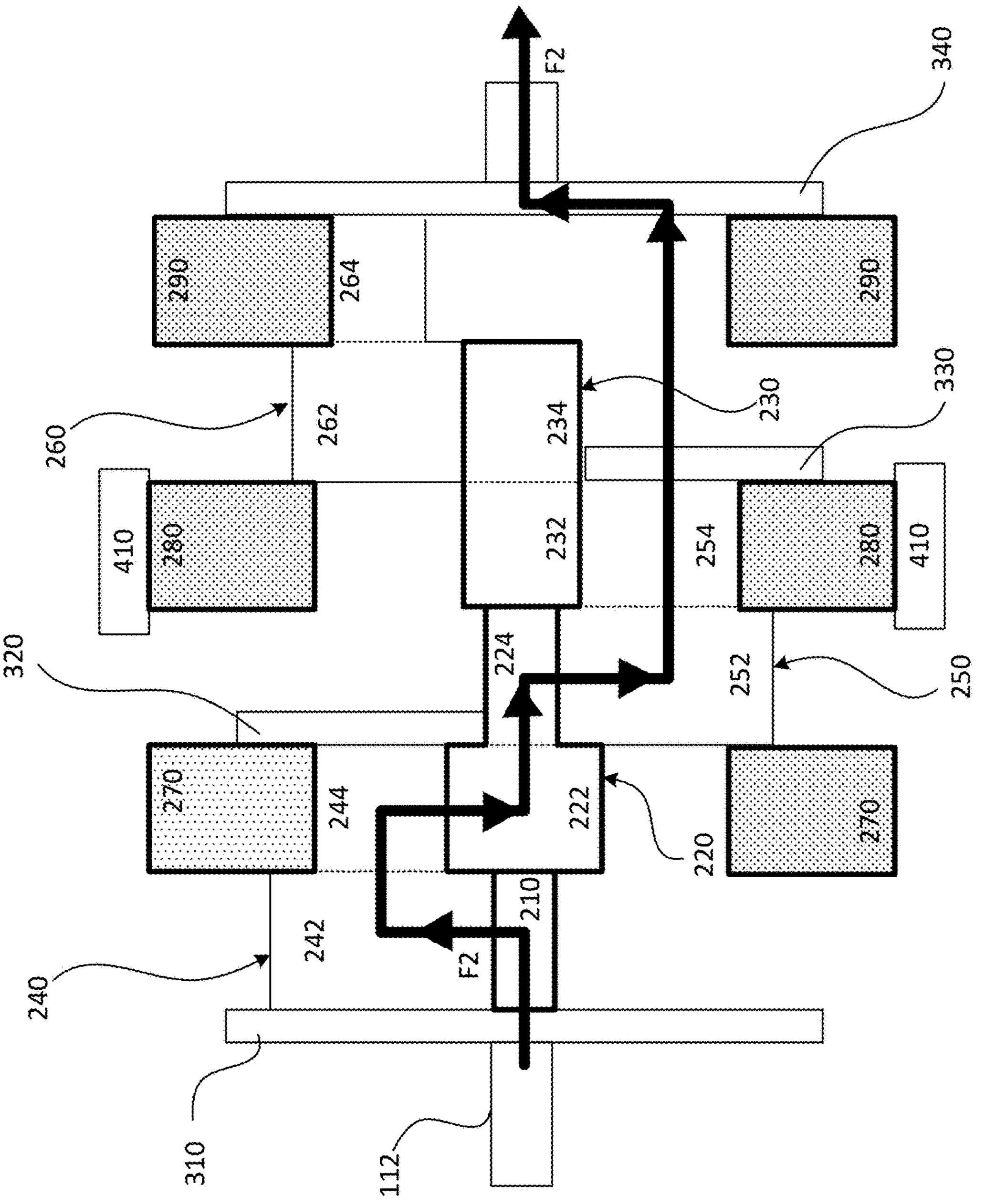
FIG. 11B is a schematic illustration of the example transmission mechanism in a second, intermediate output speed mode of operation.
Figure 11C:
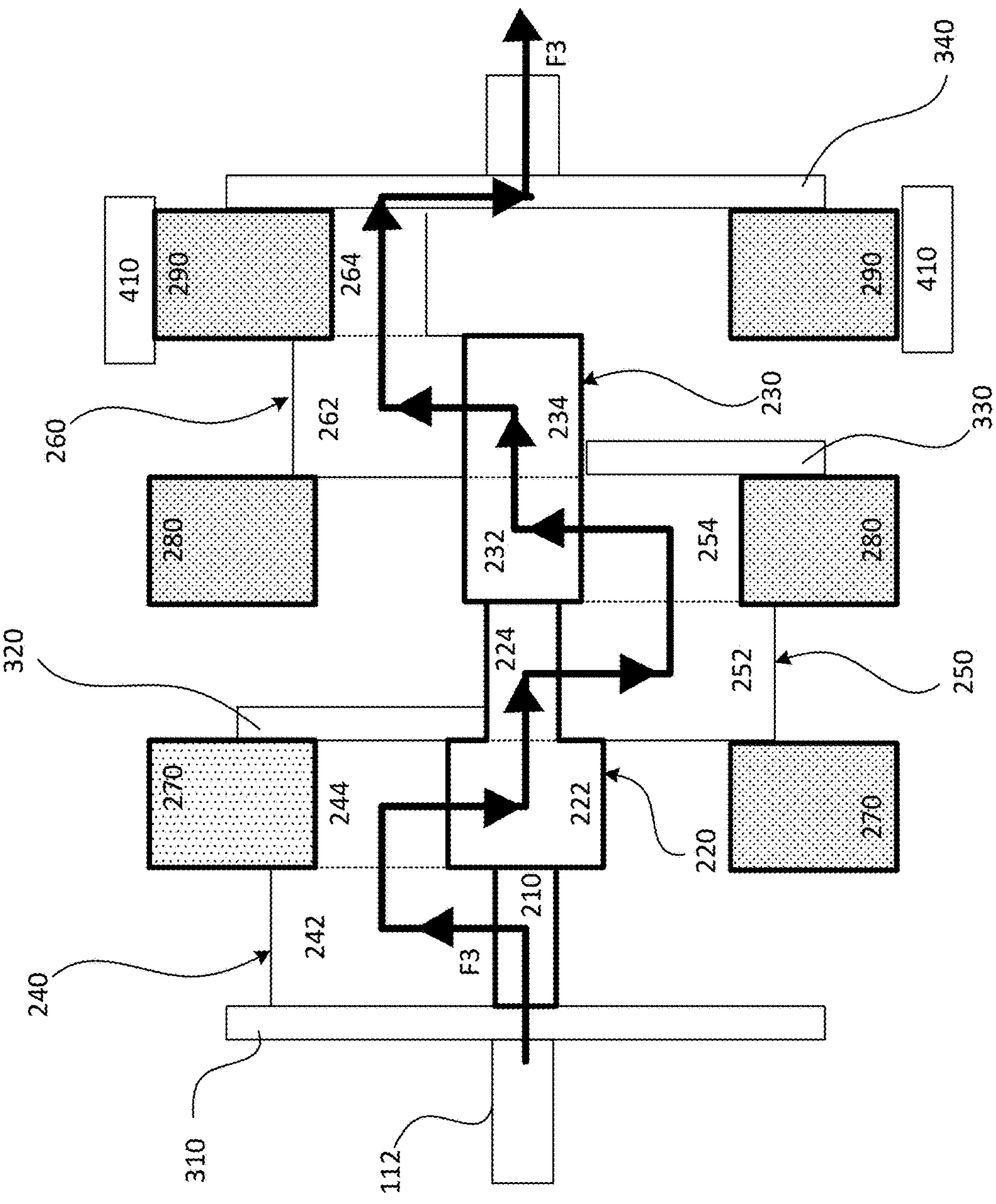
FIG. 11C is a schematic illustration of the example transmission mechanism in a third output speed mode of operation, in accordance with implementations described herein.
Figure 11D:
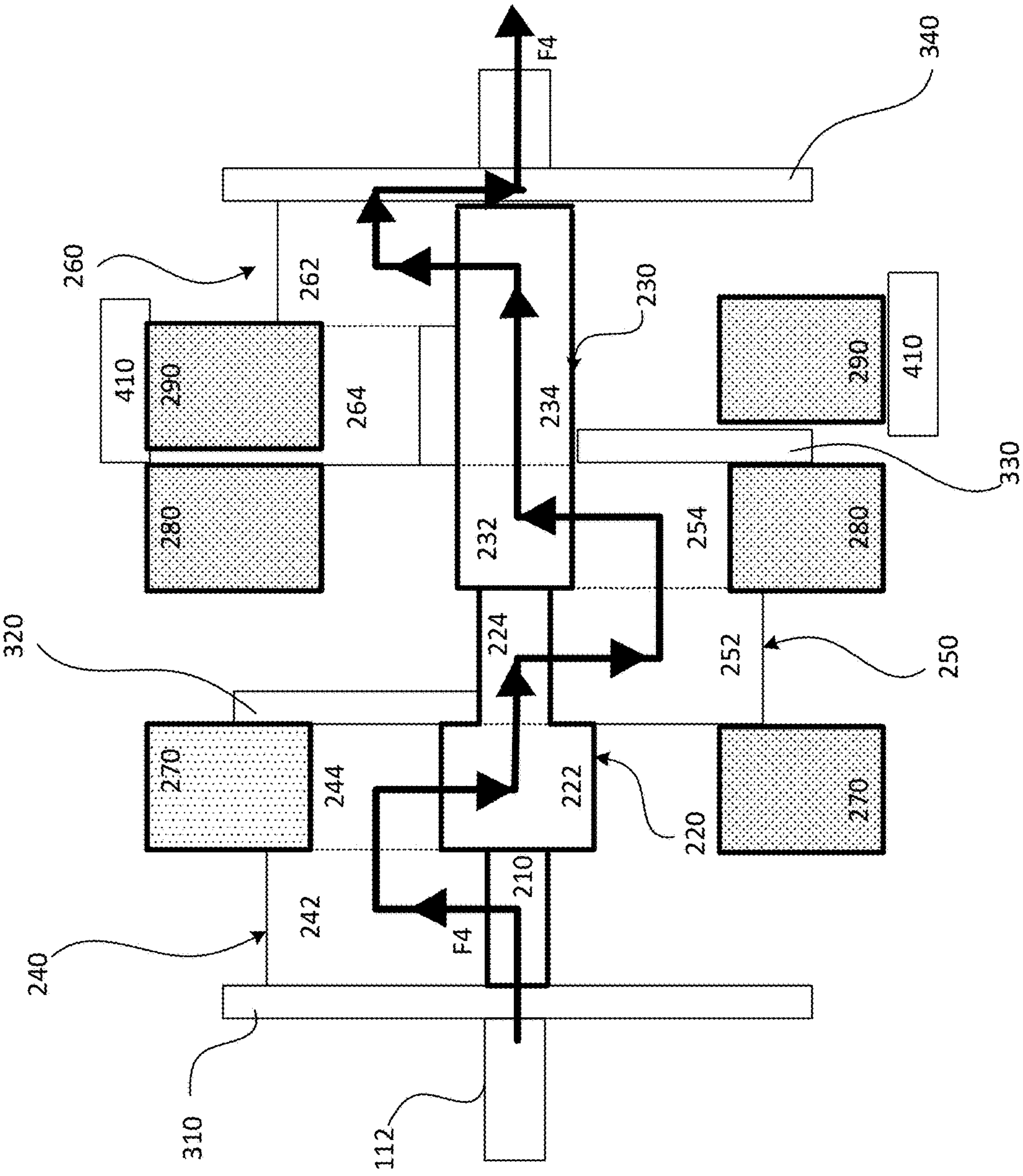
FIG. 11D is a schematic illustration of the example transmission mechanism in the third output speed mode of operation, in accordance with another implementation described herein.
Figure 12A:
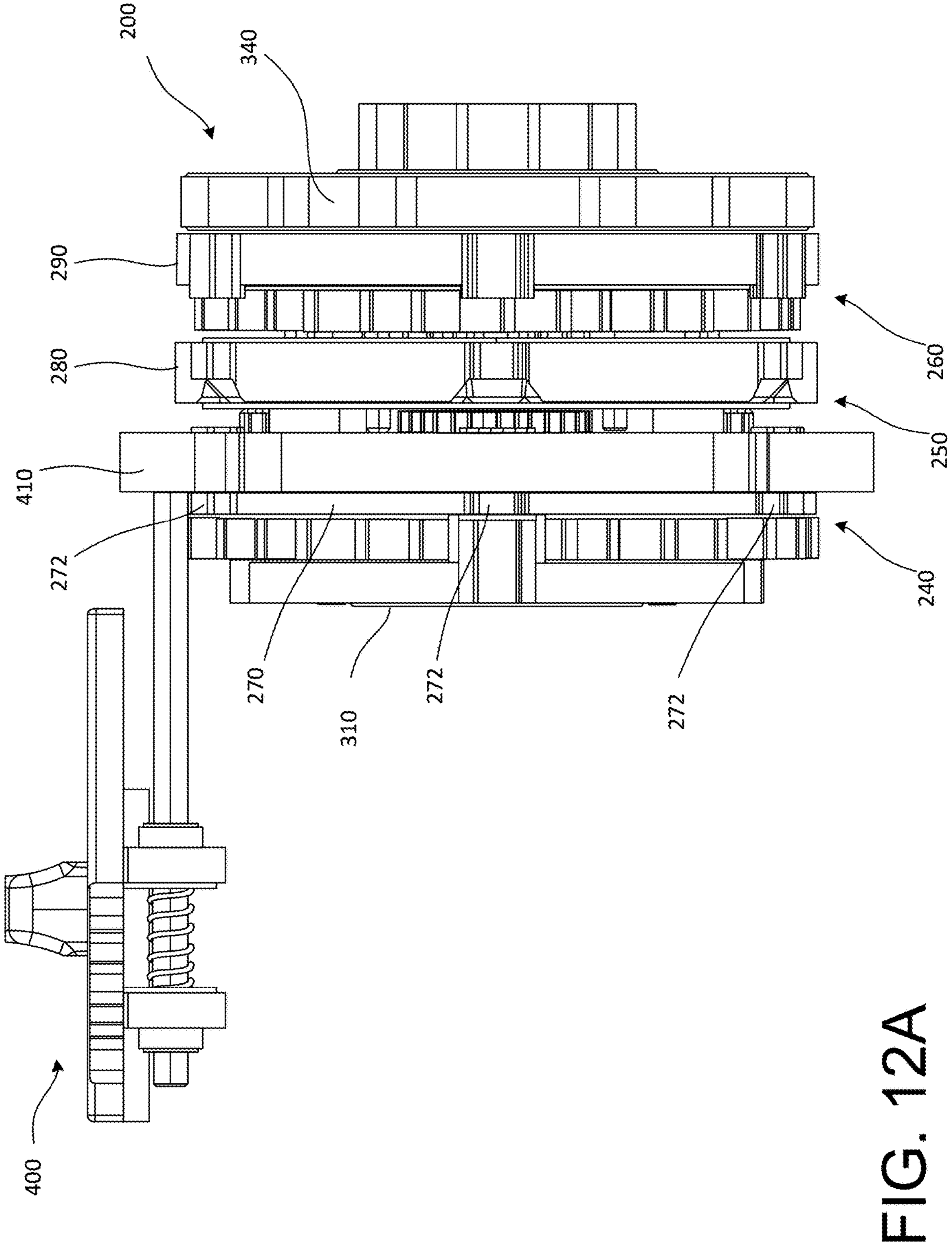
FIGS. 12A-12C are side views of the example transmission system and an example speed selection mechanism of the example power-driven tool, in a first output speed mode of operation, in a second, intermediate output speed mode of operation, and in a third output speed mode of operation, respectively, in accordance with implementations described herein.
Figure 12B:
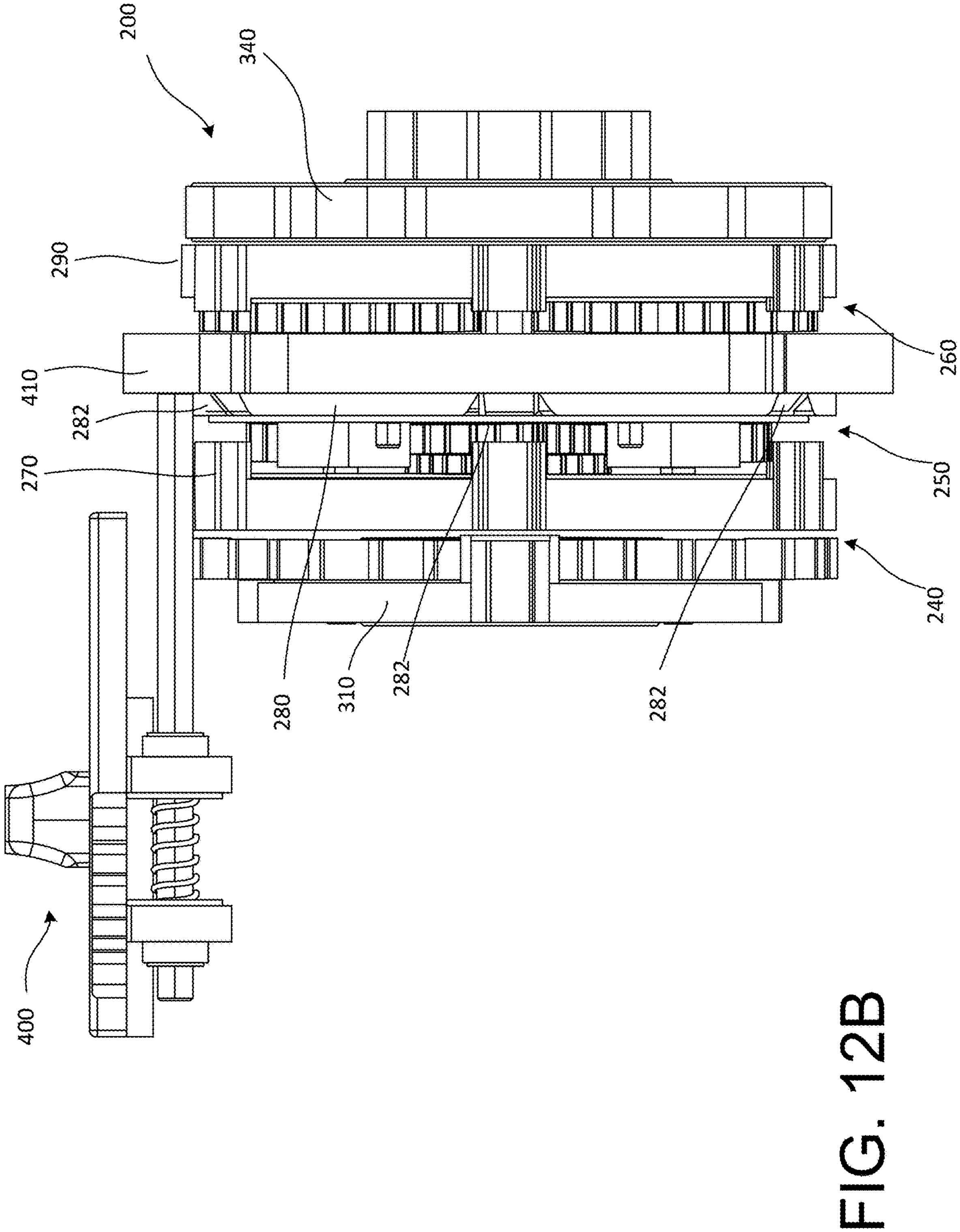
Figure 12C:
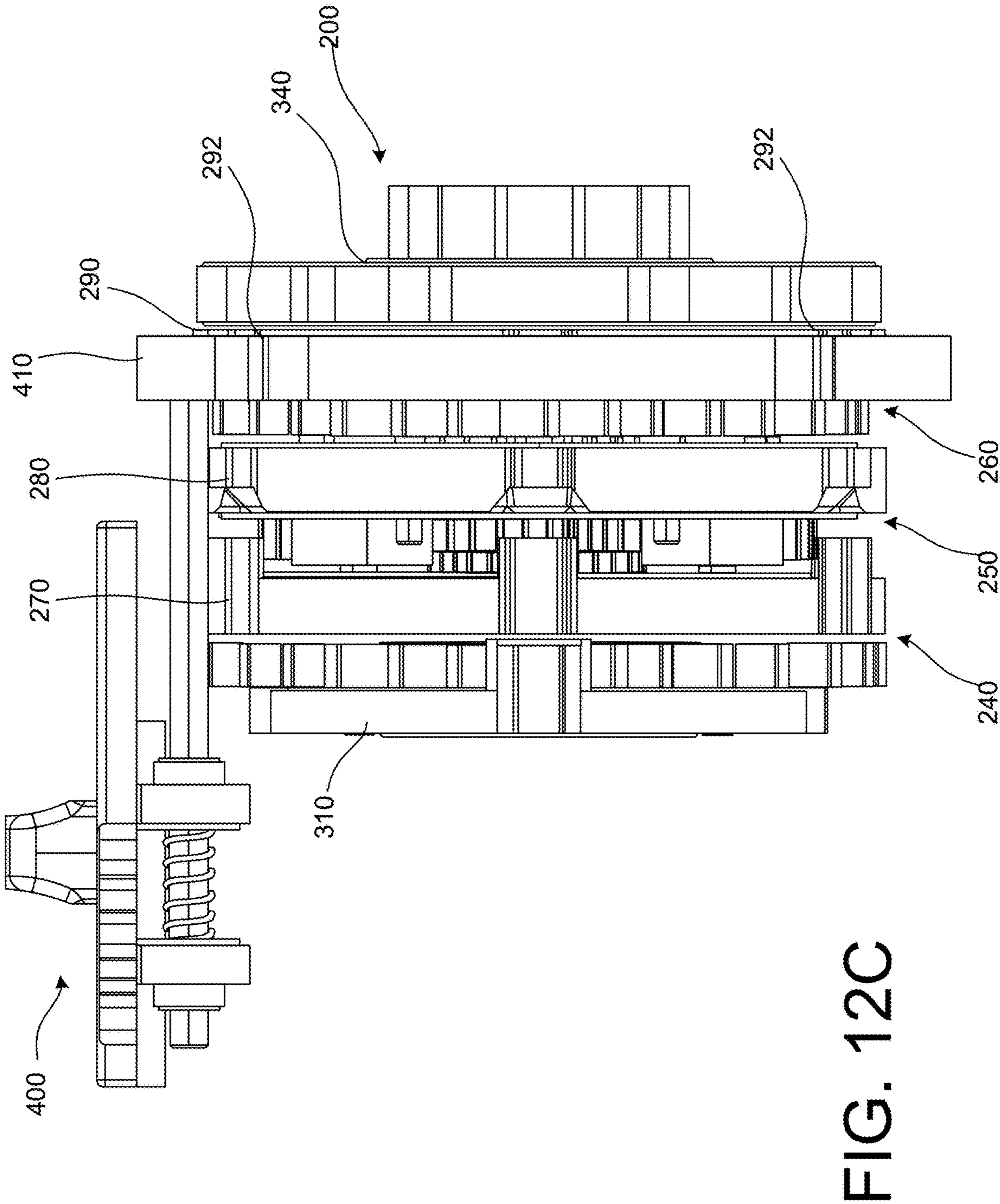

FIGS. 11A-11C are schematic illustrations of the engagement of the sun gears 210, 220, 230, the planet gear assemblies 240, 250, 260, the ring gears 270, 280, 290, and the shift ring 410 of the speed selection mechanism 400, at a first (for example, high) output speed setting, a second, intermediate output speed setting, and a third (for example, low) output speed setting, respectively. FIG. 11D is a schematic illustration of the engagement of the sun gears 210, 220, 230, the planet gear assemblies 240, 250, 260, the ring gears 270, 280, 290, and the shift ring 410 of the speed selection mechanism 400, at the third (for example, low) output speed setting, in which an orientation of the third planet gear assembly 260 is reversed from the orientation shown in FIGS. 11A-11C. FIGS. 12A-12C are corresponding side views of the transmission mechanism 200 and the shift selection mechanism 400 at the first (for example, high) output speed setting, the second, intermediate output speed setting, and the third (for example, low) output speed setting, respectively.

As described above, in some implementations, the first sun gear 210 (a single stage, i.e., not stepped, gear in this example) may be engaged with, for example, in meshed engagement with, the first stepped planet gear assembly 240. For example, the first sun gear 210 may be in meshed engagement with the first stage gear 242 of the first stepped planet gear assembly 240. The second sun gear 220 (a stepped, compound sun gear in this example) may span subsections 200B and 200C of the transmission mechanism 200, and may be in meshed engagement with both the first planet gear assembly 240 and the second planet gear assembly 250. That is, the first stage gear 222 of the second sun gear 220 may be in meshed engagement with the second stage gear 244 of the first stepped planet gear assembly 240, and the second stage gear 224 of the second sun gear 220 may be in meshed engagement with the first stage gear 252 of the second planet gear assembly 250. The third sun gear 230 (a single stage i.e., not stepped, gear in this example) may span subsections 200D and 200E of the transmission mechanism 200. That is, the first portion 232 of the third sun gear 230 may be in meshed engagement with the second stage gear 254 of the second planet gear assembly 250, and the second portion 234 of the third sun gear 230 may be in meshed engagement with the first stage gear 262 of the third planet gear assembly 260.

In the first (for example, low) speed reduction/first (for example, high) output speed mode shown in FIGS. 11A and 12A, the shift ring 410 of the speed selection mechanism 400 is engaged with one or more of the lugs 272 of the first ring gear 270. This engagement of the shift ring 410 and the first ring gear 270 may ground the first ring gear 270 to the housing 190 of the tool 100, or may fix a position of the first ring gear 270 relative to the housing 190 of the tool 100. The grounding of the first ring gear 270 relative to the housing 190 in this first (for example, high) output speed mode of operation restricts rotation of the first ring gear 270, while the second ring gear 280 and the third ring gear 290 may rotate freely. In this example arrangement, the rotational force generated by the motor 110 goes through a first (for example, low) speed reduction in the transmission mechanism 200, resulting in a first (for example, high) speed output by the tool 100, as shown by the arrow F1 in FIG. 11A.

In the intermediate speed reduction ratio/intermediate output speed mode shown in FIGS. 11B and 12B, the shift ring 410 of the speed selection mechanism 400 is engaged with a lug 282 of the second ring gear 280. This engagement of the shift ring 410 and the second ring gear 280 may ground the second ring gear 280 to the housing 190 of the tool 100, or fix a position of the second ring gear 280 relative to the housing 190 of the tool 100. The grounding of the second ring gear 280 relative to the housing 190 in this intermediate output speed mode of operation restricts rotation of the second ring gear 280, while the first ring gear 270 and the third ring gear 290 may rotate freely. In this example arrangement, the rotational force generated by the motor 110 goes through an intermediate speed reduction in the transmission mechanism 200, resulting in an intermediate speed output by the tool 100, as shown by the arrow F2 in FIG. 11B.

In the third speed reduction ratio/third output speed mode shown in FIGS. 11C and 12C, the shift ring 410 of the speed selection mechanism 400 is engaged with a lug 292 of the third ring gear 290. This engagement of the shift ring 410 and the third ring gear 290 may ground the third ring gear 290 to the housing 190 of the tool 100, or fix a position of the third ring gear 290 relative to the housing 190 of the tool 100. The grounding of the third ring gear 290 relative to the housing 190 in this third output speed mode of operation restricts rotation of the third ring gear 290, while the first ring gear 270 and the second ring gear 280 may rotate freely. In this example arrangement, the rotational force generated by the motor 110 goes through a third speed reduction in the transmission mechanism 200, resulting in a third speed output by the tool 100, as shown by the arrow F3 in FIG. 11C.

As noted above, and as shown in FIG. 11D, in some implementations, an orientation of the first (larger diameter) stage gear 262 and the second (smaller diameter) stage gear 264 of the third planet gear assembly 260 may be reversed from the orientation shown in FIGS. 11A-11C. When oriented, or arranged, in this manner, the third ring gear 290 may be in meshed engagement with the second (smaller diameter) stage gear 264 of the third planet gear assembly 260, as illustrated schematically in FIG. 11D. Engagement of the shift ring 410 and the third ring gear 290 may ground the third ring gear 290 to the housing 190 of the tool 100. The grounding of the third ring gear 290 relative to the housing 190 in this third output speed mode of operation restricts rotation of the third ring gear 290 (now meshed to the second, smaller diameter stage gear 264 of the third planet gear assembly 260 in this example), while the first ring gear 270 and the second ring gear 280 may rotate freely. In this example arrangement, the rotational force generated by the motor 110 goes through a third speed reduction in the transmission mechanism 200, resulting in a third speed output by the tool 100, as shown by the arrow F4 in FIG. 11D.

Figure 13A:
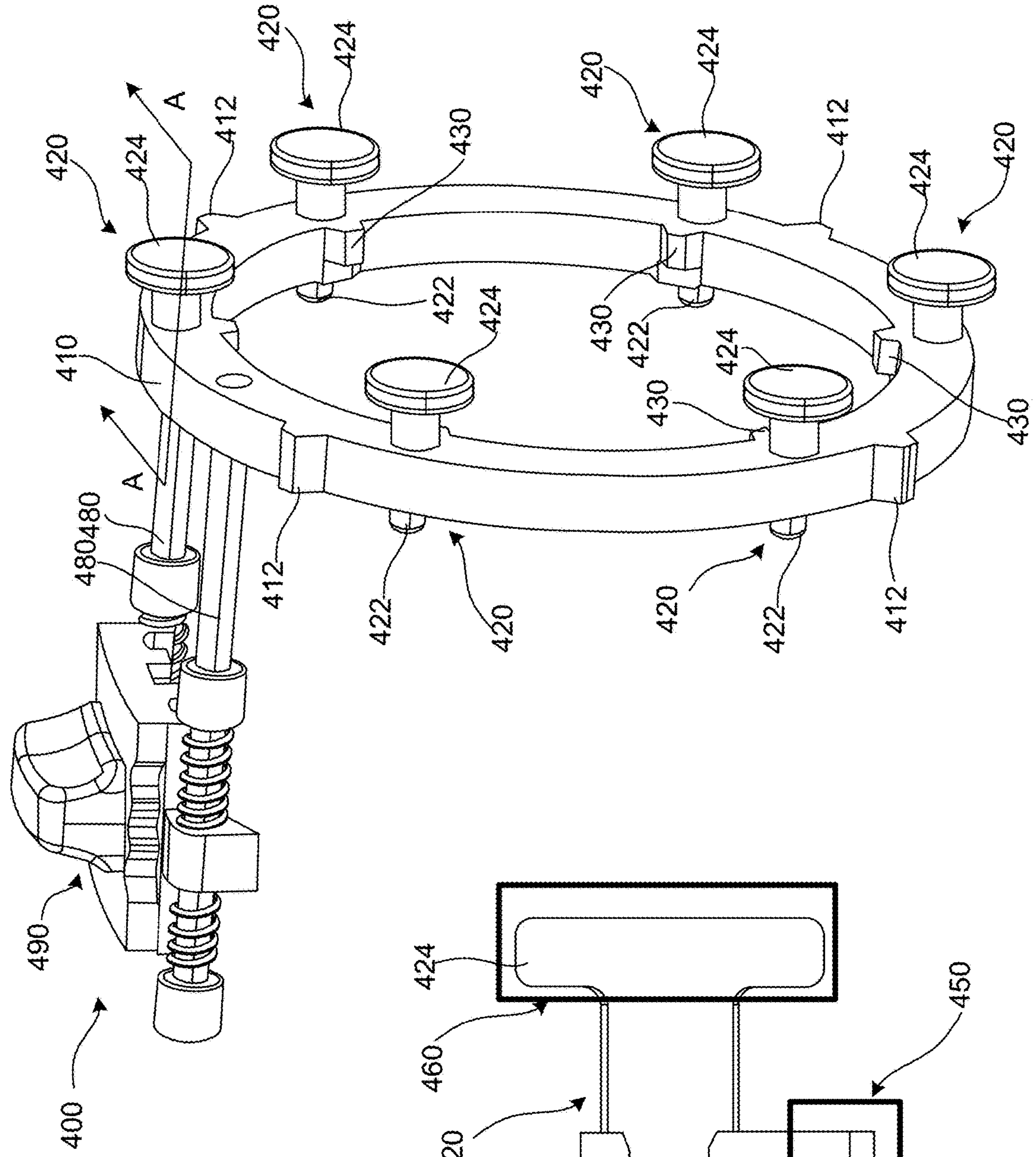
FIG. 13A is a perspective view of an example speed selection mechanism of the example multi-speed power-driven tool, in accordance with implementations described herein.
Figure 13B:
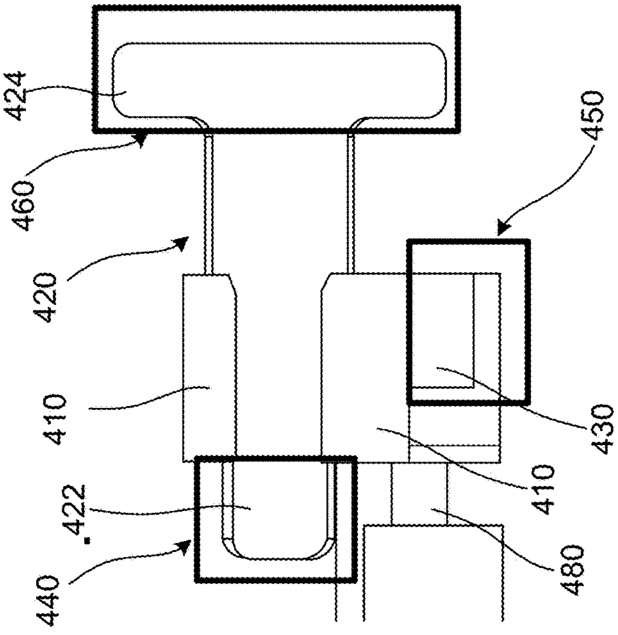
FIG. 13B is a cross-sectional view taken along line A-A of FIG. 13A.

FIG. 13A is a perspective view of an example speed selection mechanism of the example multi-speed power-driven tool, in accordance with implementations described herein. FIG. 13B is a cross-sectional view taken along line A-A of FIG. 13A.

As described above, the speed selection mechanism 400, in accordance with implementations described herein, may provide for multi-level shifting amongst a plurality of different speed reduction ratios, and amongst a plurality of corresponding operational output speeds, of the multi-speed power-driven tool. In the example implementation described above, the example multi-speed power-driven tool 100 included three modes of operation, or three output speeds (i.e., a first speed operation mode shown in FIGS. 11A and 12A, a second, intermediate speed operation mode shown in FIGS. 11B and 12B, and a third speed operation mode shown in FIGS. 11C, 11D and 12C). Accordingly, the example speed selection mechanism 400 will be described with respect to shifting amongst three operation modes, or three output speeds, simply for purposes of discussion and illustration.

As shown in FIG. 13A, in some implementations, the speed selection mechanism 400 may include a switching device 490, or shifting device 490. The switching device 490 may be mounted, for example, movably mounted, on one or more shift rails 480. In some implementations, the switching device 490 may extend at least partially out of the housing 190 of the tool 100, and/or may be accessible from an exterior of the tool 100, for manipulation by an operator of the tool 100. In some implementations, index marks (not shown) may be provided on the housing 190 of the tool 100, to provide the operator with a visual indication of alignment of a position of the switching device 490 with an index mark corresponding to a desired mode of operation of the tool 100, or output speed of the tool 100. The shift ring 410 may be coupled at an opposite end of the shift rail(s) 480, such that the shift rail(s) 480 couple the switching device 490 and the shift ring 410. In some implementations, one or more guide lugs 412 formed at an outer circumferential portion of the shift ring 410 may be received in corresponding channels formed in an interior of the housing 190 (not shown) to guide the axial movement of the shift ring 410 relative to the transmission mechanism 200.

A plurality of shift pins 420 may be coupled to, or provided on, the shift ring 410. In some implementations, the plurality of shift pins 420 may be positioned circumferentially on the shift ring 410, at circumferential positions on the shift ring 410 corresponding to the lugs 272, 292 of the first and third ring gears 270, 290, respectively. One or more engagement lugs 430 may be defined on an inner circumferential portion of the shift ring 410, at circumferential positions corresponding to the lugs 282 of the second ring gear 280. The circumferential positions of the shift pins 420 and the engagement lugs 430 may be generally aligned or may be offset from each other. A tip end portion 422 of each of the shift pins 420 may define a level one stop 440, or a first grounding device 440, or a first stopping device 440, or a first engagement device 440, of the speed selection mechanism 400. The engagement lugs 430 may define a level two stop 450, or a second grounding device 450, or a second stopping device 450, or a second engagement device 450, of the speed selection mechanism 400. A head end portion 424 of each of the shift pins 420 may define a level three stop 460, or a third grounding device 460, or a third stopping device 460, or a third engagement device 460, of the speed selection mechanism 400.

Figure 14A:
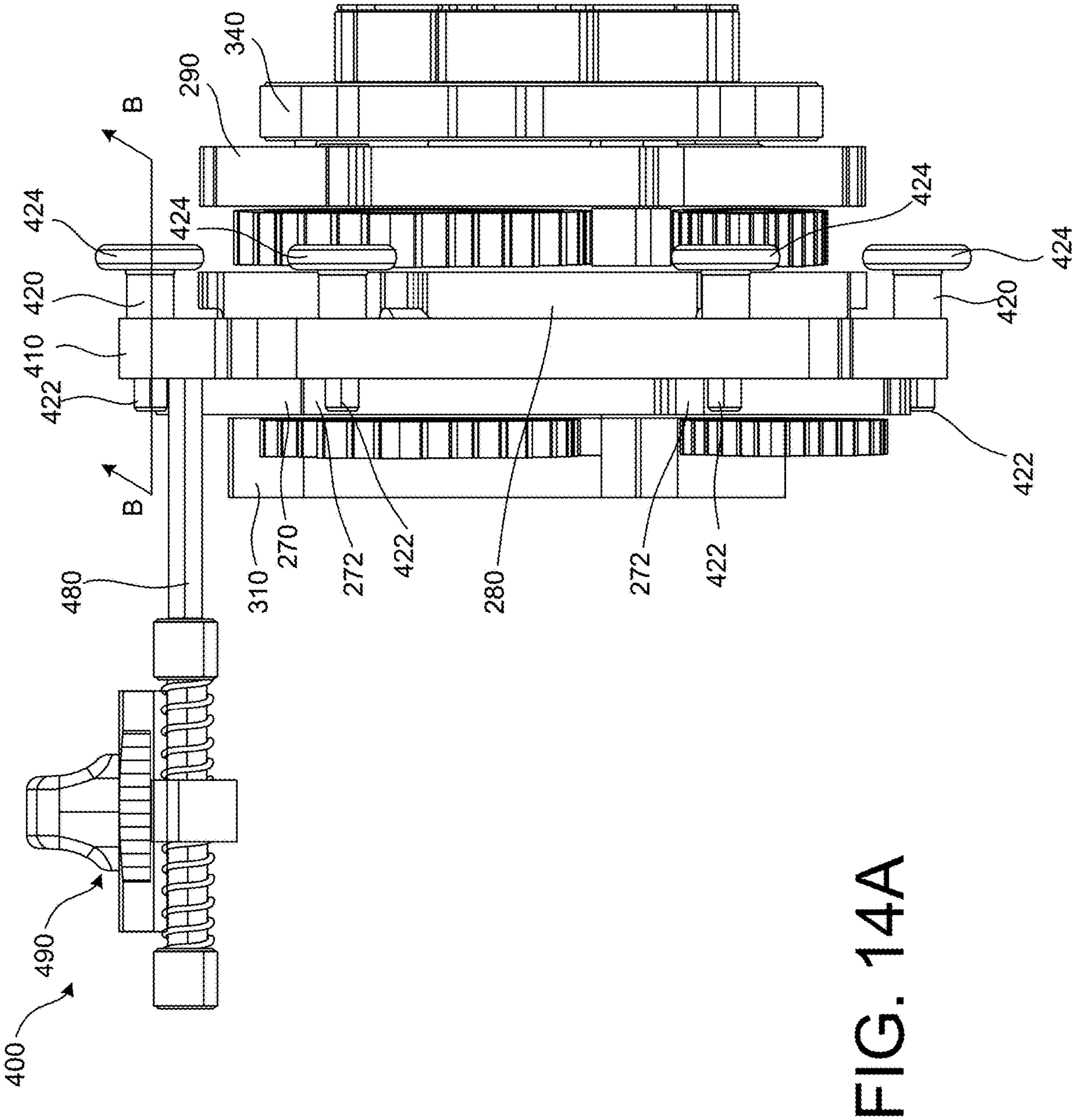
FIG. 14A is a side view.
Figure 14B:
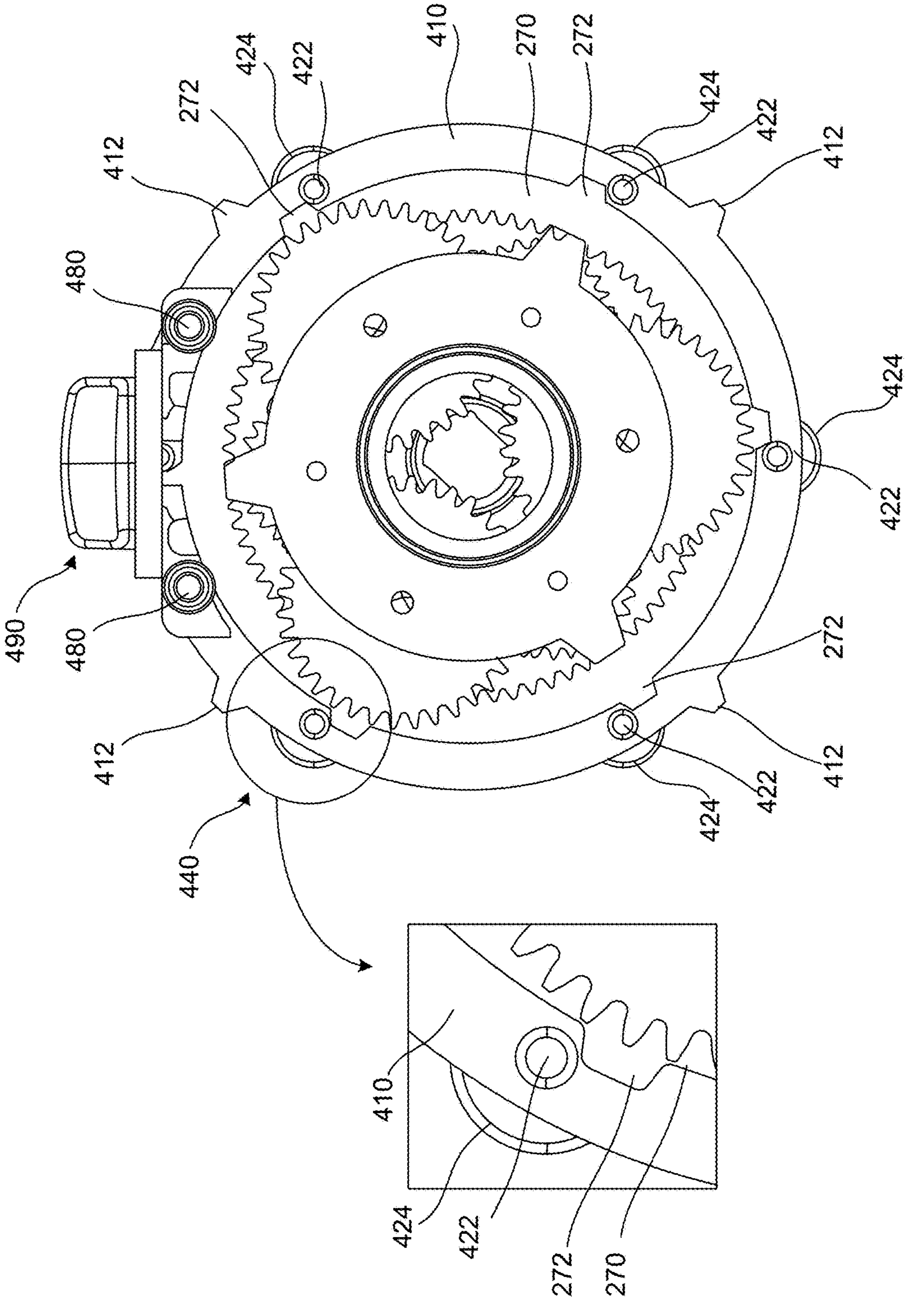
FIG. 14B is an axial end view, of the example speed selection mechanism engaged with the example transmission mechanism in a first mode of operation, in accordance with implementations described herein.
Figure 14C:
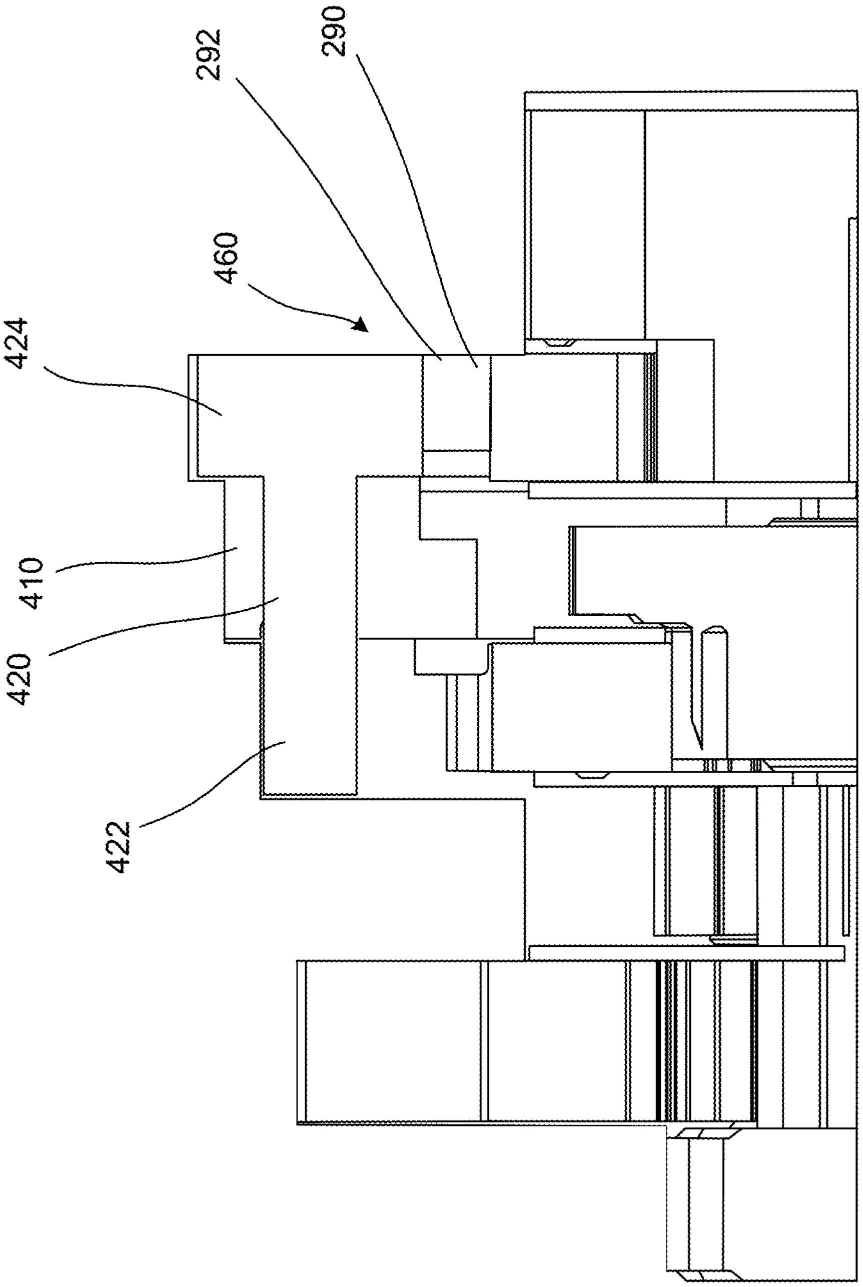
FIG. 14C is a cross sectional view taken along line B-B of FIG. 14A.

FIG. 14A is a side view of the example speed selection mechanism 400 engaged with the example transmission mechanism 200 in the first output speed mode of operation. FIG. 14B is an axial end view of the engagement between the example speed selection mechanism 400 and the example transmission mechanism 200 illustrated in FIG. 14A. FIG. 14C is a cross-sectional view taken along line B-B of FIG. 14A [[inventors please confirm this is shown accurately?]]. As shown in FIG. 14A, in the first output speed mode of operation, a manipulation of the switching device 490 may position the shift ring 410 such that the level one stop 440, or first grounding device 440, defined by the tip end portion 422 of the shift pins 420 is positioned against the lugs 272 of the first ring gear 270, as shown in FIG. 14B. In this arrangement, level two stop 450, or second grounding device 450, defined by the engagement lugs 430 of the shift ring 410 remain clear of/disengaged from the lugs 282 of the second ring gear 280, and the level three stop 460, or third grounding device 460, defined by the head end portion 424 of the shift pins 420 each remain clear of/disengaged from the lugs 292 of the third ring gear 290, allowing the second and third ring gears 280, 290 to rotate freely. The positioning of tip end portion 422 of the shift pins 420 against the lugs 272 of the first ring gear 270 grounds the first ring gear 270 relative to the housing 190 of the tool 100, thus restricting rotation of the first ring gear 270. Restriction of rotation of the first ring gear 270 in this manner (while the second ring gear 280 and the third ring gear 290 rotate freely) produces a first speed reduction through the transmission mechanism 200, resulting in a first speed output by the tool 100, as described above in detail.

Figure 15A:
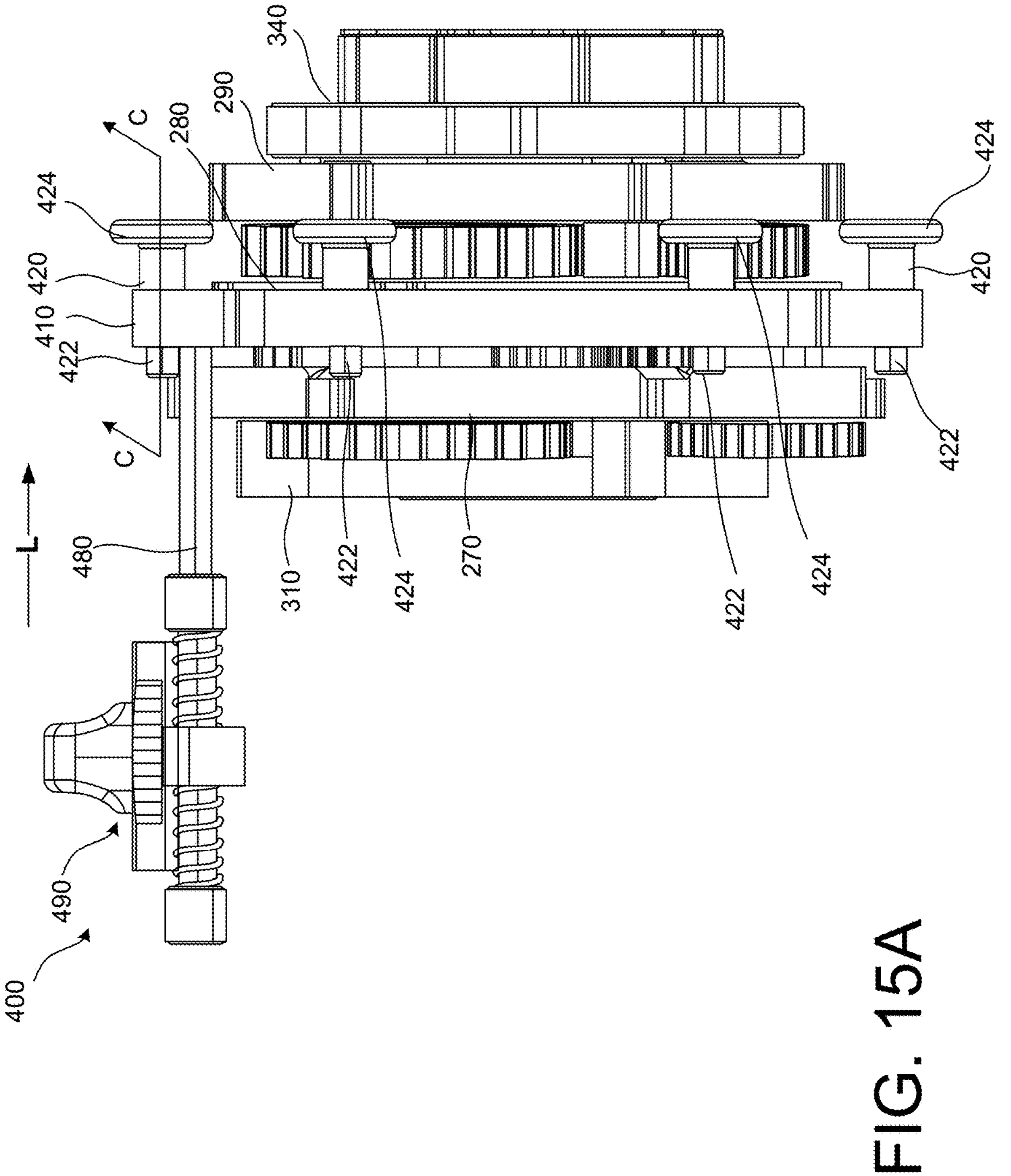
FIG. 15A is a side view.
Figure 15B:
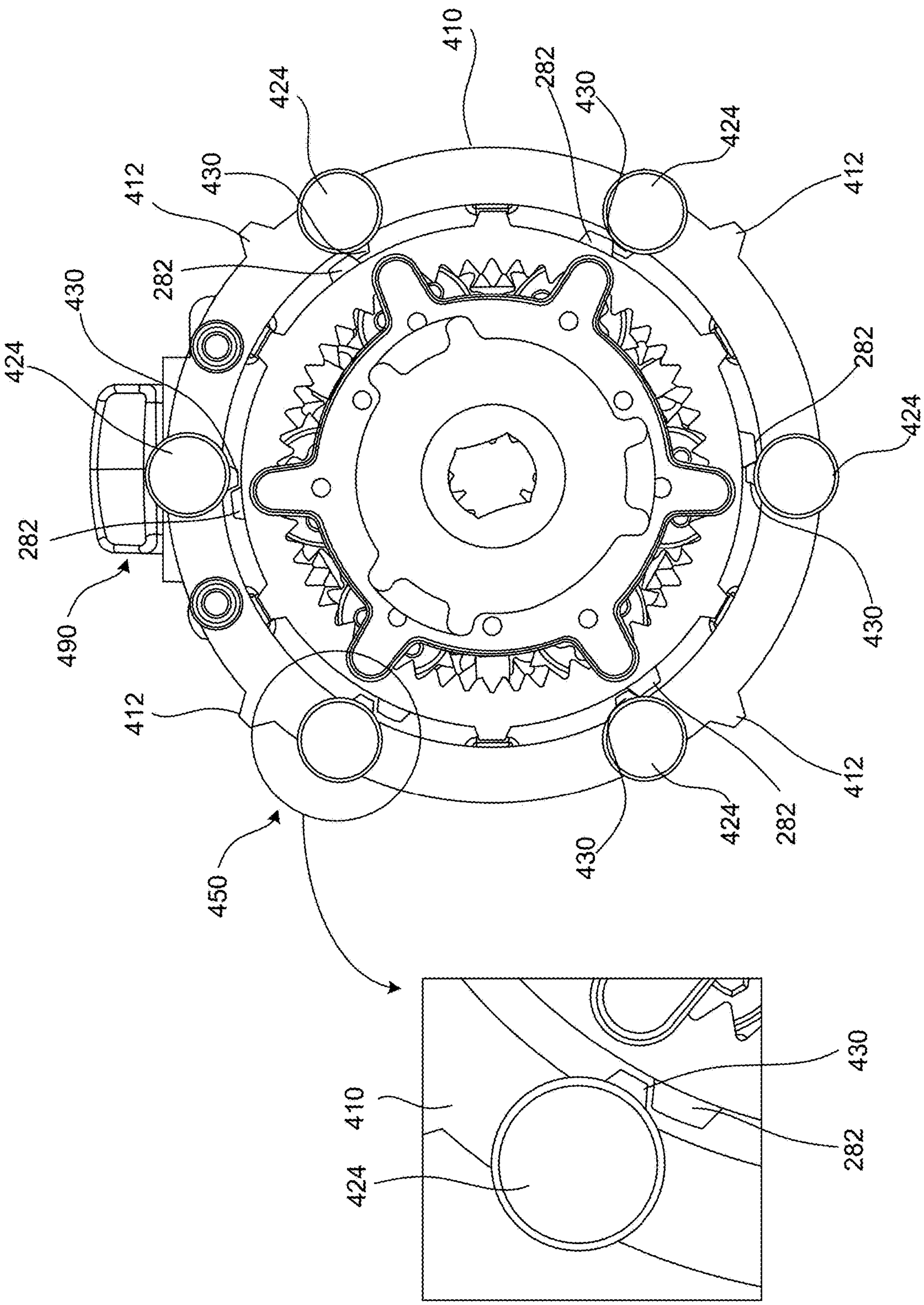
FIG. 15B is an axial end view, of the example speed selection mechanism engaged with the example transmission mechanism in a second mode of operation, in accordance with implementations described herein.
Figure 15C:
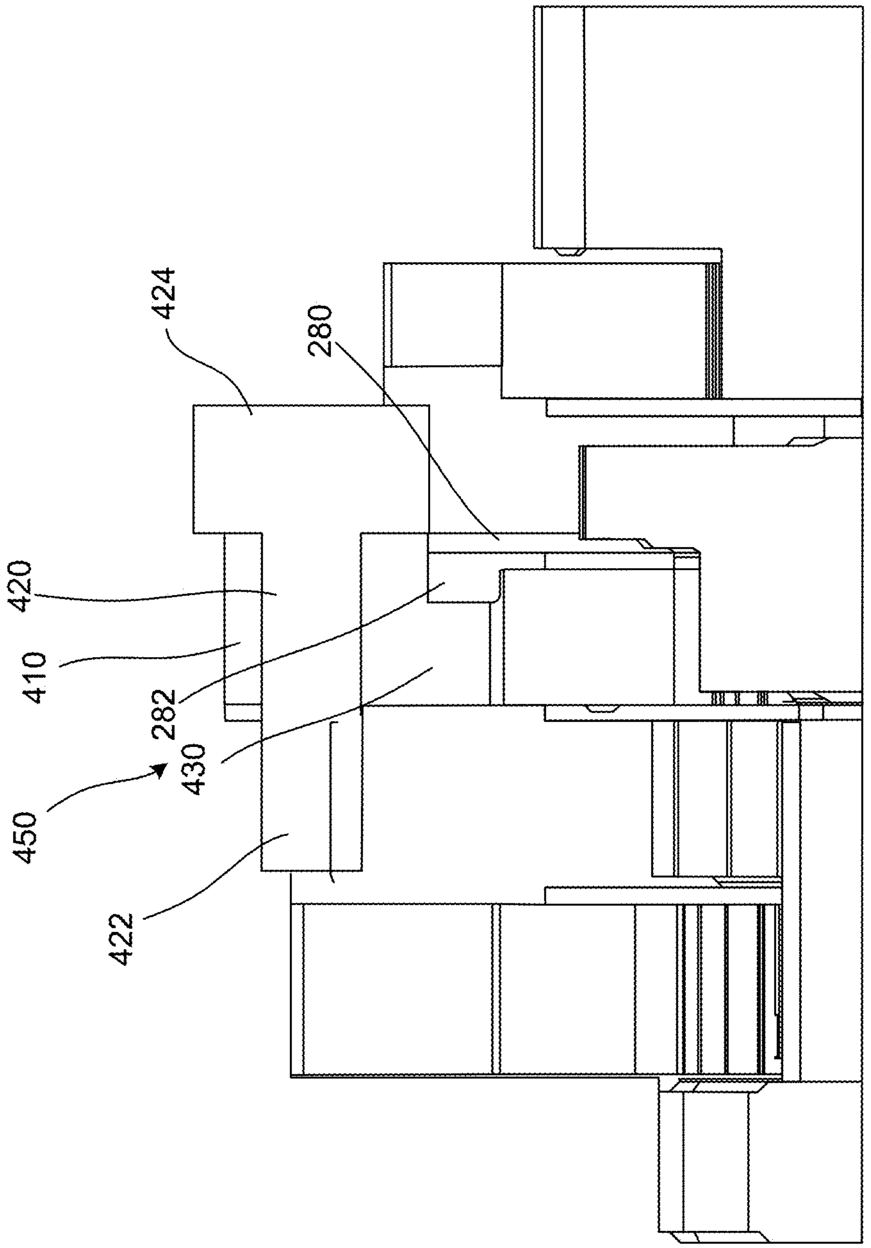
FIG. 15C is a cross sectional view taken along line C-C of FIG. 15A.

FIG. 15A is a side view of the example speed selection mechanism 400 engaged with the example transmission mechanism 200 in the intermediate output speed mode of operation. FIG. 15B is an axial end view of the engagement between the example speed selection mechanism 400 and the example transmission mechanism 200 illustrated in FIG. 15A. FIG. 15C is a cross-sectional view taken along line C-C of FIG. 15A. As shown in FIG. 15A, in the second, intermediate output speed mode of operation, a shifting of the switching device 490 along the shift rail(s) 480, for example, in the direction of the arrow L, from the position shown in FIG. 14A to the position shown in FIG. 15A, may position the shift ring 410 such that the engagement lugs 430 defining the level two stop 450, or second grounding device 450, are positioned against the lugs 282 of the second ring gear 280, as shown in FIG. 15B. In this arrangement, the level one stop 440, or first grounding device 440, defined by the tip end portion 422 of the shift pins 420 remains clear of/disengaged from the lugs 272 of the first ring gear 270, and the level three stop 460, or third grounding device 460, defined by the head end portion 424 of the shift pins 420 each remain clear of/disengaged from the lugs 292 of the third ring gear 290, allowing the first and third ring gears 270, 290 to rotate freely. The positioning of engagement lugs 430 of the shift ring 410 against the lugs 282 of the second ring gear 280 grounds the second ring gear 280 relative to the housing 190 of the tool 100, thus restricting rotation of the second ring gear 280. Restriction of the rotation of the second ring gear 280 in this manner (while the first ring gear 270 and the third ring gear 290 rotate freely) produces a second, intermediate speed reduction through the transmission mechanism 200, resulting in a second, intermediate speed output by the tool 100, as described above in detail.

Figure 16A:
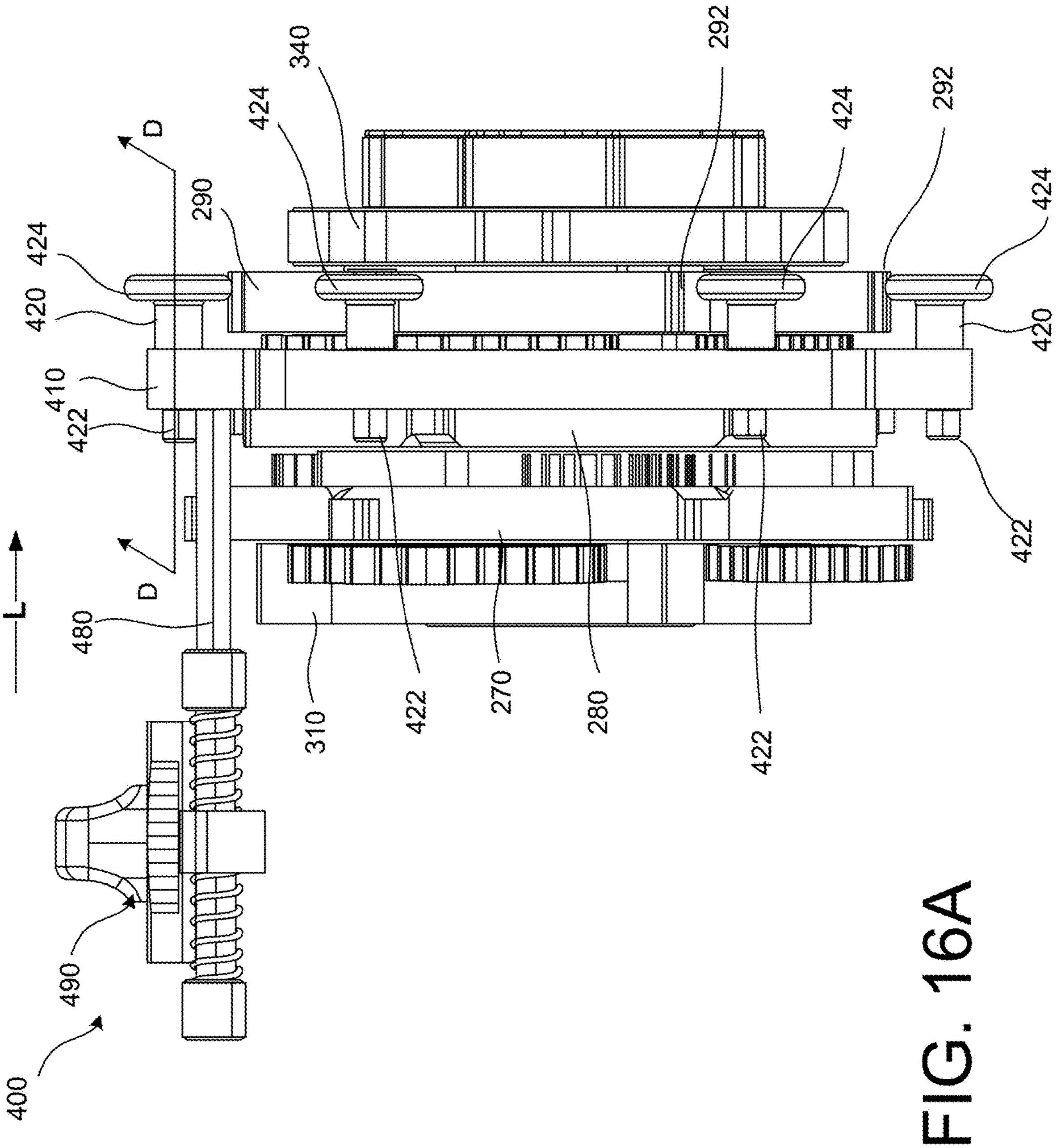
FIG. 16A is a side view.

FIG. 16A is a side view of the example speed selection mechanism 400 engaged with the example transmission mechanism 200 in the third output speed mode of operation.

Figure 16B:
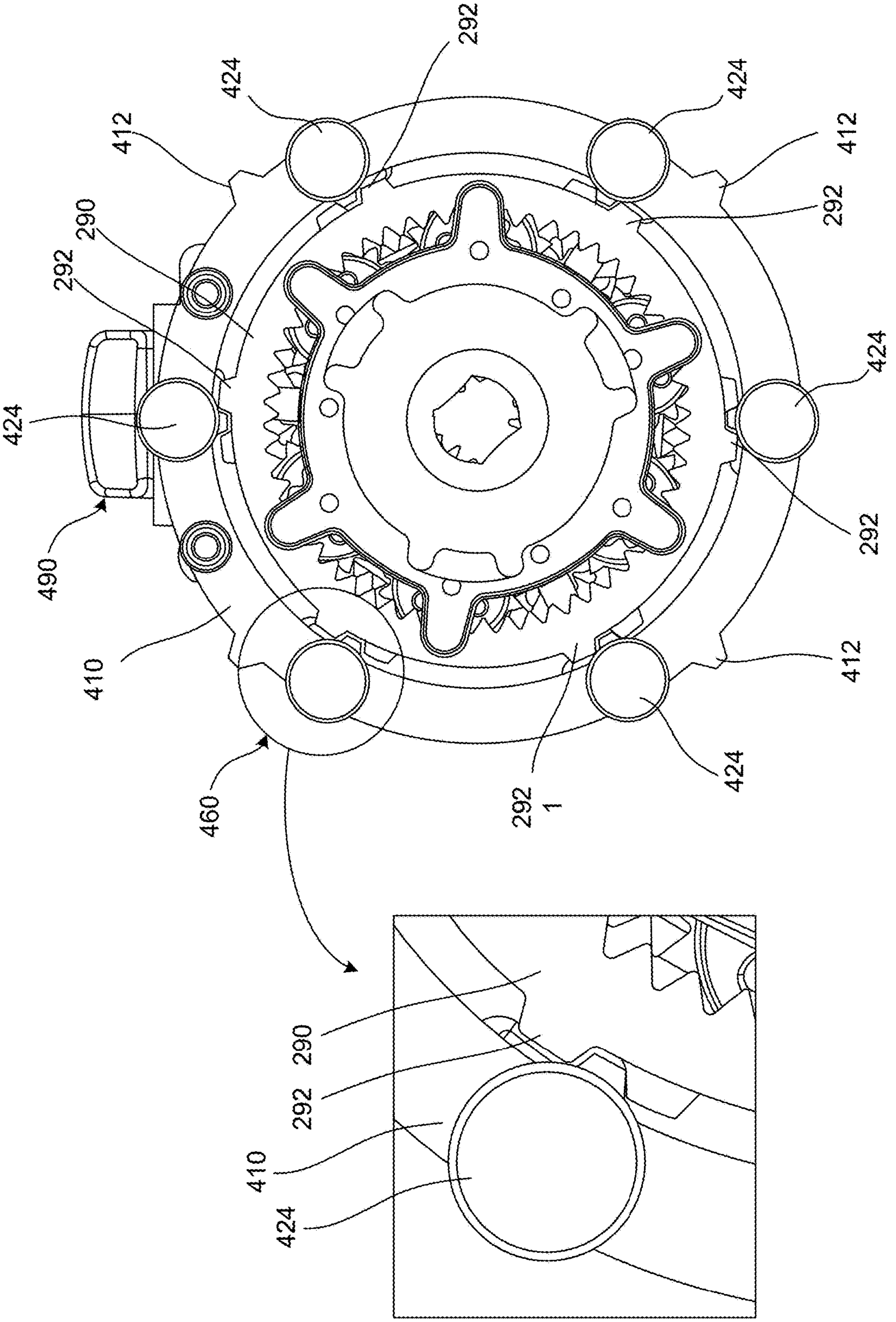
FIG. 16B is an axial end view, of the example speed selection mechanism engaged with the example transmission mechanism in a third mode of operation, in accordance with implementations described herein.
Figure 16C:
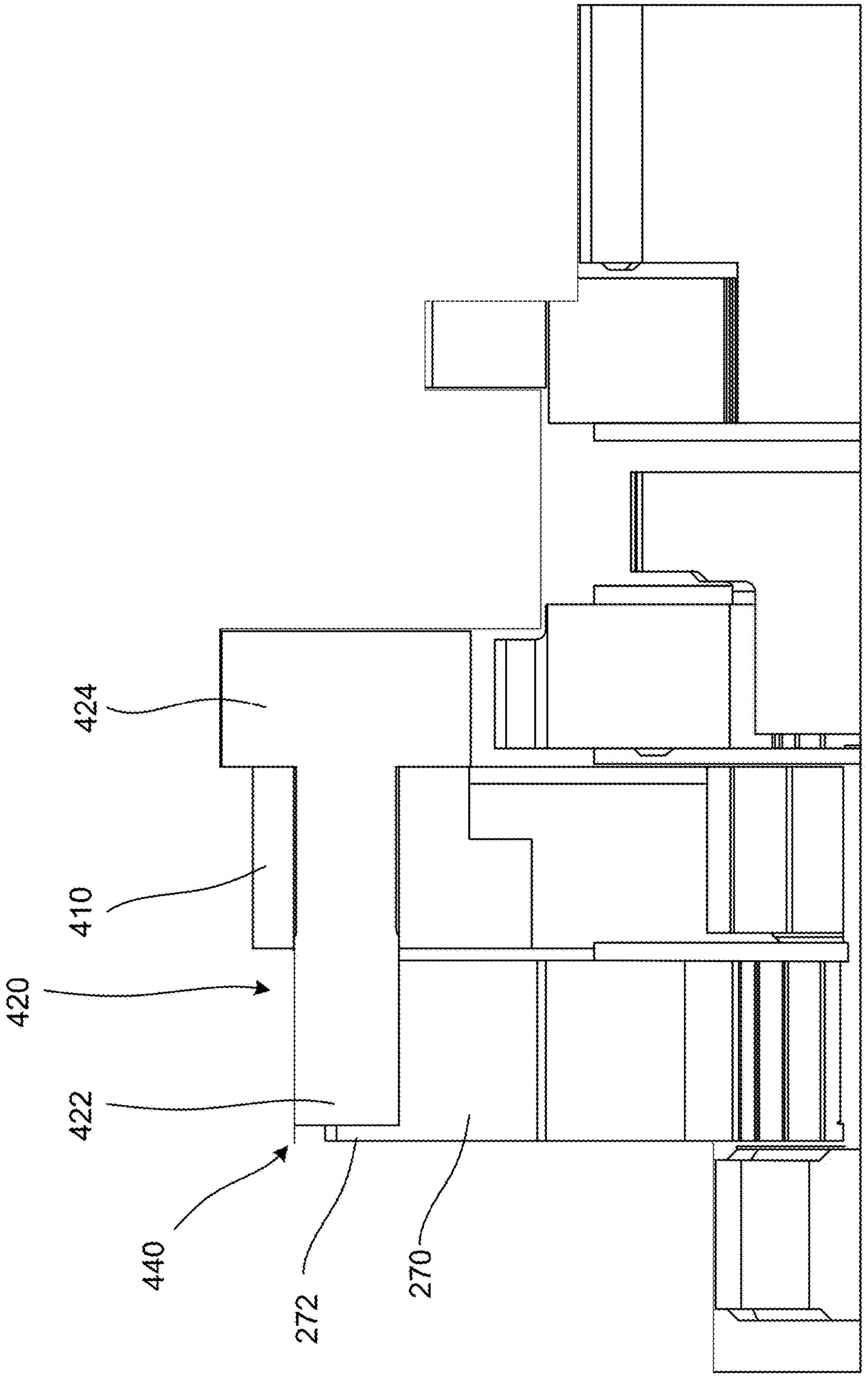
FIG. 16C is a cross sectional view taken along line D-D of FIG. 16A.

FIG. 16B is an axial view of the engagement between the example speed selection mechanism 400 and the example transmission mechanism 200 illustrated in FIG. 16A. FIG. 16C is a cross-sectional view taken along line D-D of FIG. 16A. As shown in FIG. 16A, in the third output speed mode of operation, a shifting of the switching device 490 along the shift rail(s) 480, for example, in the direction of the arrow L, from the position shown in FIG. 15A to the position shown in FIG. 16A, may position the shift ring 410 such that the head end portion 424 of the shift pins 420 defining the level three stop 460, or third grounding device 460, are positioned against the lugs 292 of the third ring gear 290, as shown in FIG. 16B. In this arrangement, the level one stop 440, or first grounding device 440, defined by the tip end portion 422 of the shift pins 420 remain clear of/disengaged from the lugs 272 of the first ring gear 270, and the level two stop 450, or second grounding device 450, defined by the lugs 430 of the shift ring 410 remain clear of/disengaged from the lugs 282 of the second ring gear 280, allowing the first and second ring gears 270, 280 to rotate freely. The positioning of head end portion 424 of the shift pins 420 against the lugs 292 of the third ring gear 290 grounds the third ring gear 290 relative to the housing 190 of the tool 100, thus restricting rotation of the third ring gear 290. Restriction of the rotation of the third ring gear 290 in this manner (while the first ring gear 270 and the second ring gear 280 rotate freely) produces a third (for example, high) speed reduction through the transmission mechanism 200, resulting in a third speed output by the tool 100, as described above in detail.

Figure 17:
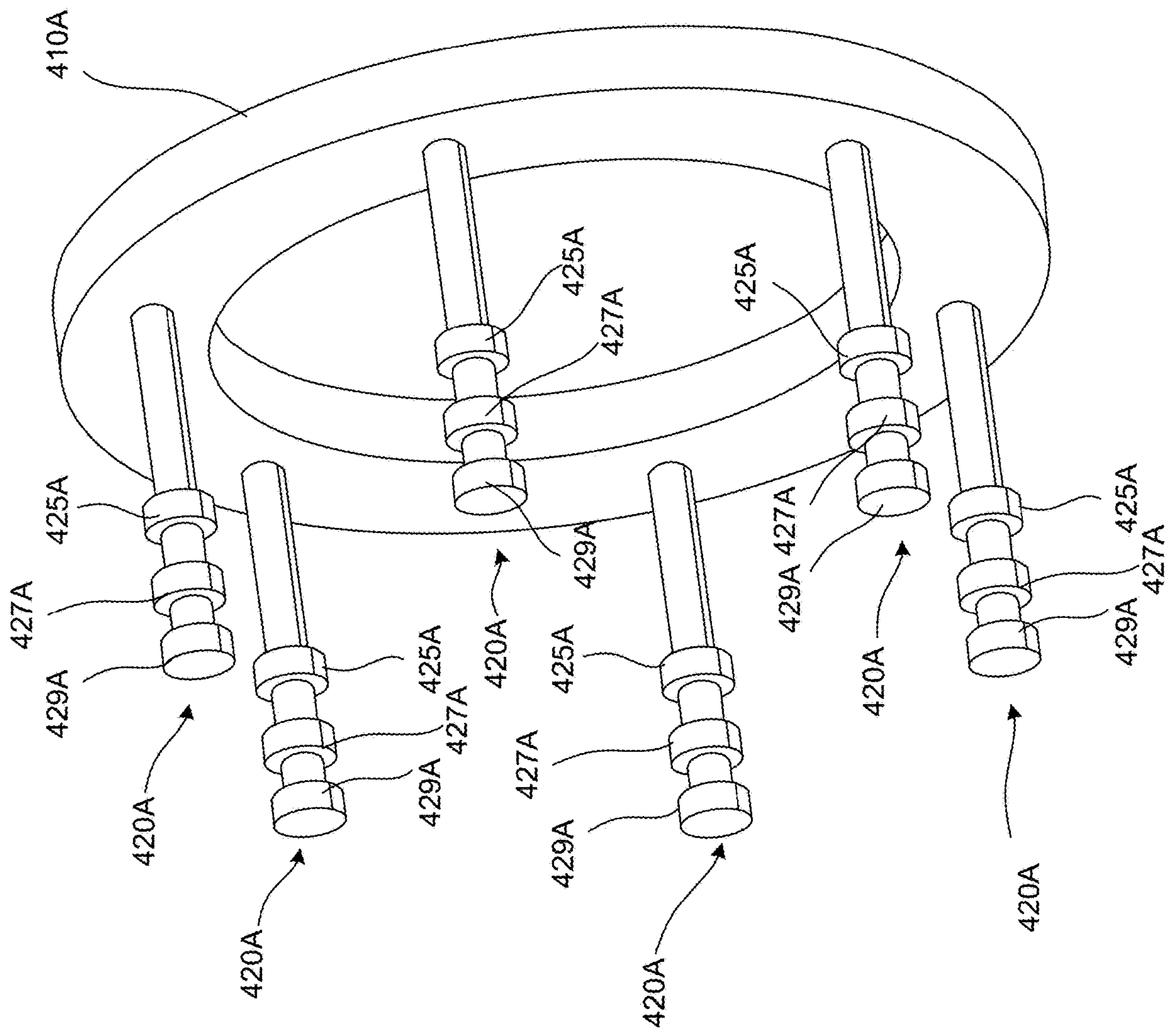
FIG. 17 is a perspective view of an example shift member having an at least partial ring shape of an example speed selection mechanism, in accordance with implementations described herein.
Figure 18:
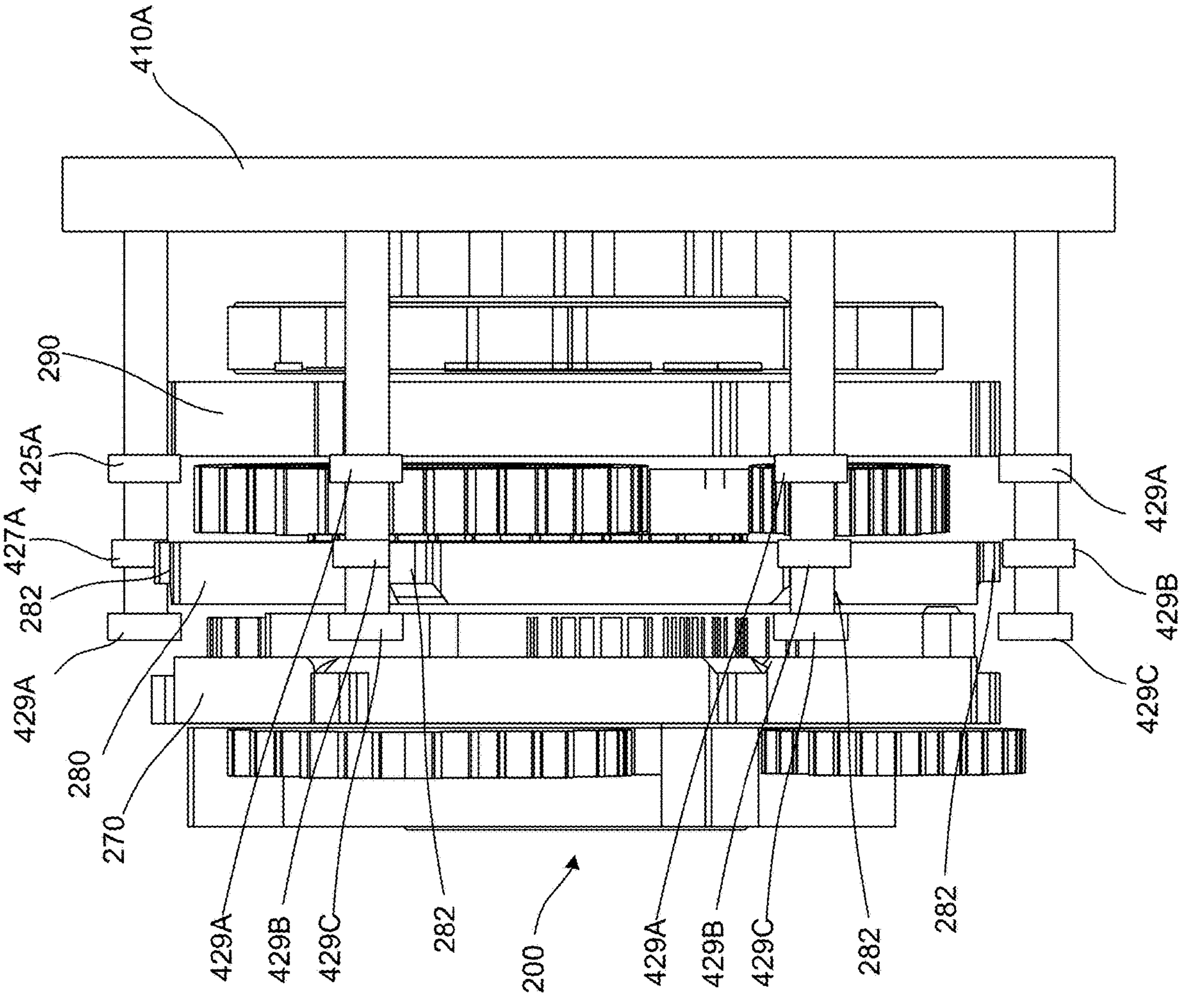
FIG. 18 is a side view of the example shift member having an at least partial ring shape engaged with an example transmission mechanism, in accordance with implementations described herein.

FIG. 17 is a perspective view of a shift ring 410A including a plurality of shift pins 420A, for use with a speed selection mechanism for a multi-speed power driven tool, in accordance with implementations described herein. FIG. 18 is a side view of the shift ring 410A shown in FIG. 17, engaged with the example transmission mechanism 200, in accordance with implementations described herein. The shift ring 410A may be a complete ring (e.g., a circular shape) or a partial ring (e.g., a C-shape).

As shown in FIGS. 17 and 18, the shift ring 410A may include a plurality of shift pins 420A, circumferentially arranged on the shift ring 410A, at positions corresponding to the lugs 272, 282, 292 of the first, second and third ring gears 270, 280, 290. Each of the shift pins 420A may include a first protrusion 425A defining a level one stop 440, or first grounding device 440, or first stopping device 440, or first engagement device 440. Each of the shift pins 420A may include a second protrusion 427A defining a level two stop 450, or second grounding device 450, or second stopping device 450, or second engagement device 450. Each of the shift pins 420A may include a third protrusion 429A defining a level three stop 460, or third grounding device 460, or third stopping device 460, or third engagement device 460.

Axial movement of the shift ring 410A in the manner described above (for example, with respect to FIGS. 14A through 16C) may engagement between one of the protrusions 425A, 427A, 429A with corresponding lugs 272, 282, 292 of a selected one of the ring gears 270, 280, 290, to ground the selected ring gear 270, 280, 290 as described above. For example, as shown in FIG. 18, at an intermediate axial position of the shift ring 410A relative to the transmission mechanism 200, the second protrusion 427A of each of the shift pins 420A may be positioned against the corresponding lugs 282 of the second ring gear 280, thus restricting rotation of the second ring gear 280 (while rotation of the first ring gear 270 and the third ring gear 290 remain unrestricted, and rotate freely). Restriction of the rotation of the second ring gear 280 in this manner (while the first ring gear 270 and the third ring gear 290 rotate freely) produces an intermediate speed reduction through the transmission mechanism 200, resulting in an intermediate speed output by the tool 100, as described above in detail.

A speed selection mechanism 400 including the switching device 490, shift rails 480 and shift ring(s) 410, 410A that incorporate multi-level shift pins, in accordance with implementations described herein, may provide for a relatively axially compact mechanism for grounding one of a plurality of ring gears of the example transmission mechanism, while allowing the remaining ring gears to rotate freely. The use of multi-level shift pins 420, 420A as described above, providing for multiple levels of speed selection along the same set of multi-level shift pins 420, 420A may provide for speed selection with relatively minimal axial travel of the shift ring 410, 410A and shift pins 420, 420A relative to the transmission mechanism 200.

A reduction in an overall profile of the example tool 100, and in particular, a reduction in an axial length of the tool 100, as provided by the features described above, may enhance functionality and utility of the tool 100 to the user. However, a reduction in the axial length of the tool 100, and a corresponding adjustment in the dimension(s) of the housing 190, may, in turn, dictate a reduction in the overall profile of the shift selection mechanism 400, such as, for example, a reduction in the axial travel distance of the switching device 490 to effect the shifting, or switching, or speed selection as described above (i.e., shifting between operation at the first output speed, the second output speed and the third output speed, as described above).

Figure 19:
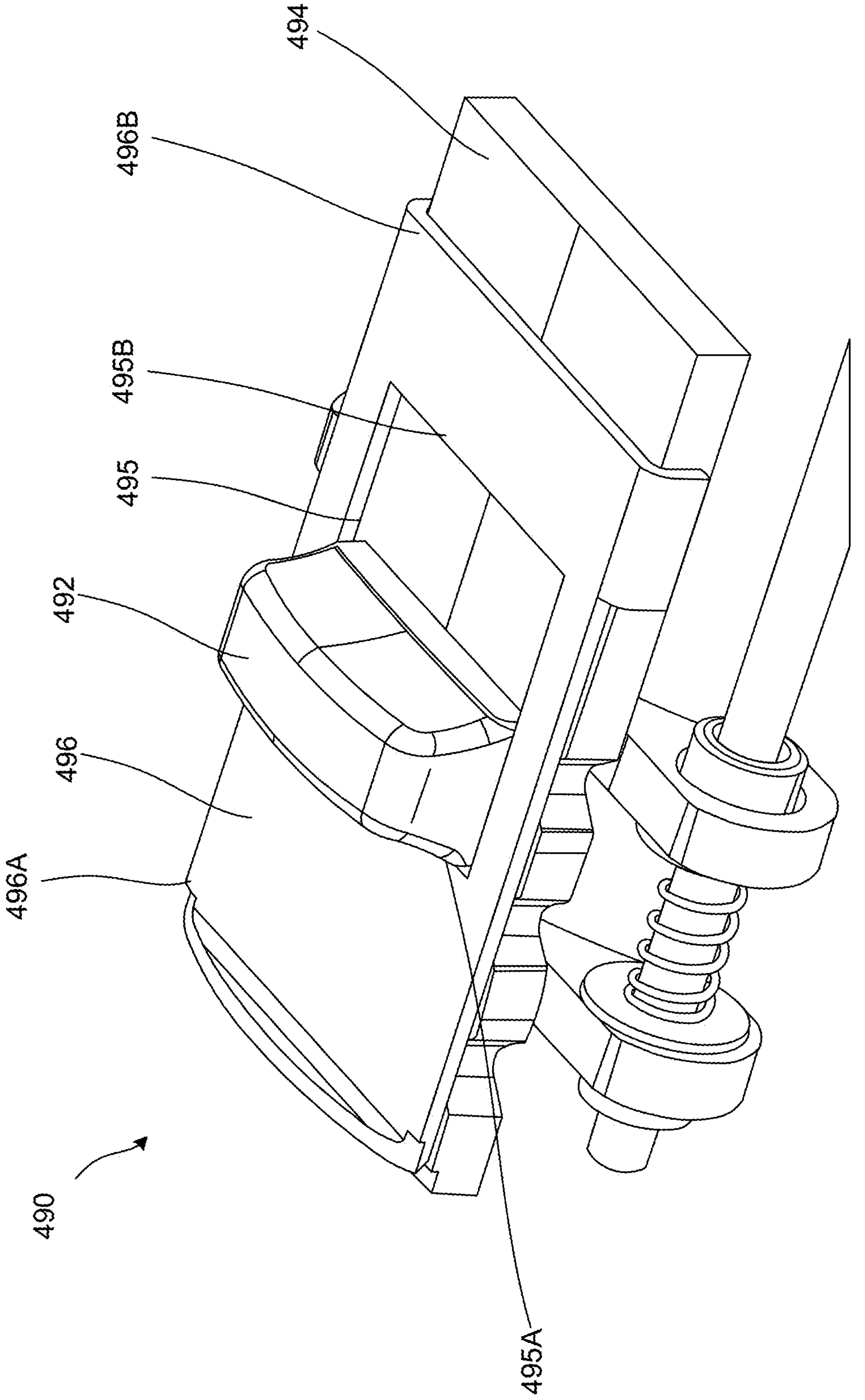
FIG. 19 is a perspective view of an example switching device of an example speed selection mechanism, in accordance with implementations described herein.

As shown in FIG. 19, in some implementations, the switching device 490, or shifting device 490, or selection device 490, may include a grasping member (e.g., a button or lever) 492 and a base portion 494. In some implementations, the grasping member (e.g., a button or lever) 492 and the base portion 494 may be integrally formed. A shutter 496 may be positioned on the base portion 494, with the grasping member (e.g., a button or lever) 492 extending out through an opening 495 in the shutter 496. The opening 495 may be formed between a first end 496A and a second end 496B of the shutter 495. The shutter 496 may be freely slidable relative to the base portion 494 such that the grasping member (e.g., a button or lever) 492 can move between a first end 495A of the opening 495 and a second end 495B of the opening 495 in the shutter 496.

The switching device 490 may be positioned within an opening 195, or a slot 195, formed in the housing 190, so that the grasping member (e.g., a button or lever) 492 may be accessible for manipulation by the user through the opening 195, for selection of one of the plurality of modes of operation of the tool 100 (i.e., selection of one of the plurality of output speeds of the tool 100). In some implementations, the sliding interaction of the shutter 496 relative to the base portion 494 may provide for enclosure of the opening 195 in the housing 190. The combination of the shutter 496 and the base portion 494 may provide for enclosure of the opening 195 with a relatively shorter overall length compared to, for example, a single piece base for the switching device 490. In some implementations, the shutter 496 may be freely slidable relative to the base portion 494, so that a length covered by the shutter 496 and the base portion 494 is variable. The variable length provided by the slidable interaction of the shutter 496 and the base portion 494 may occupy a shorter overall axial length (i.e., a shorter maximum axial length) to extend across the opening 195 than would otherwise be required by a single piece base, without the variable length afforded by the slidable interaction of the shutter 496 and the base portion 494. This will be described in more detail with respect to FIGS. 20A-20D.

Figure 20A:
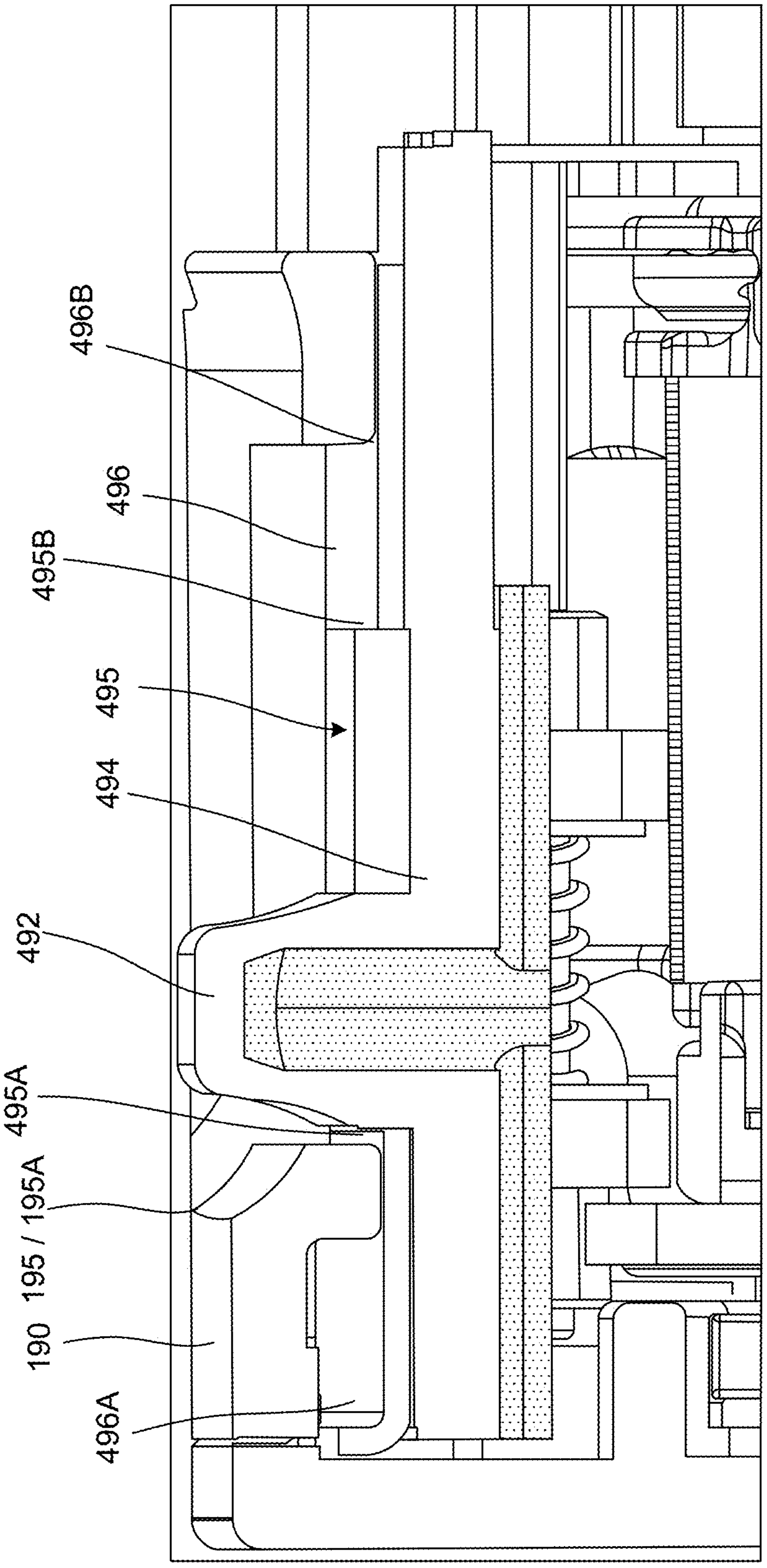
Figure 20C:
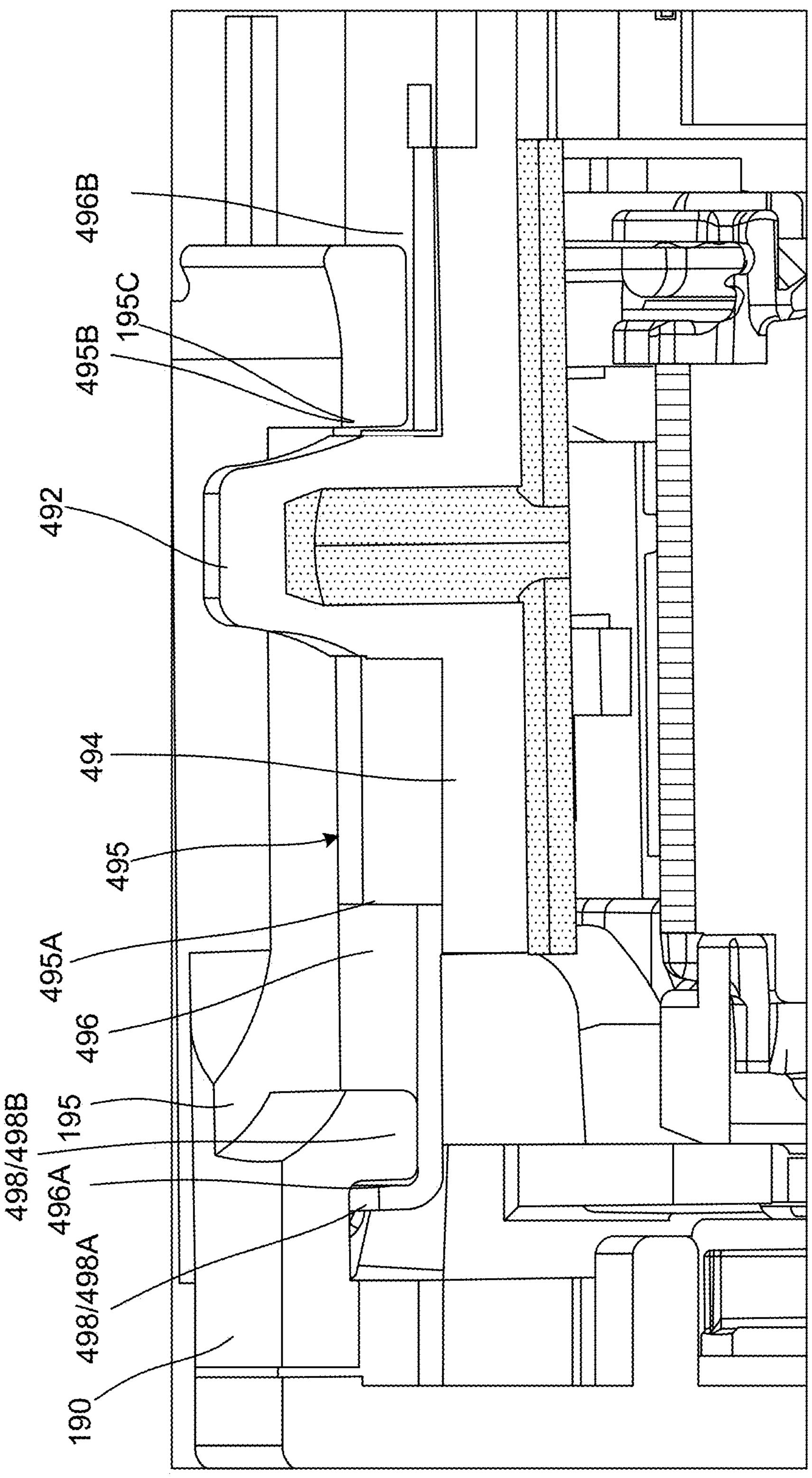
Figure 20D:
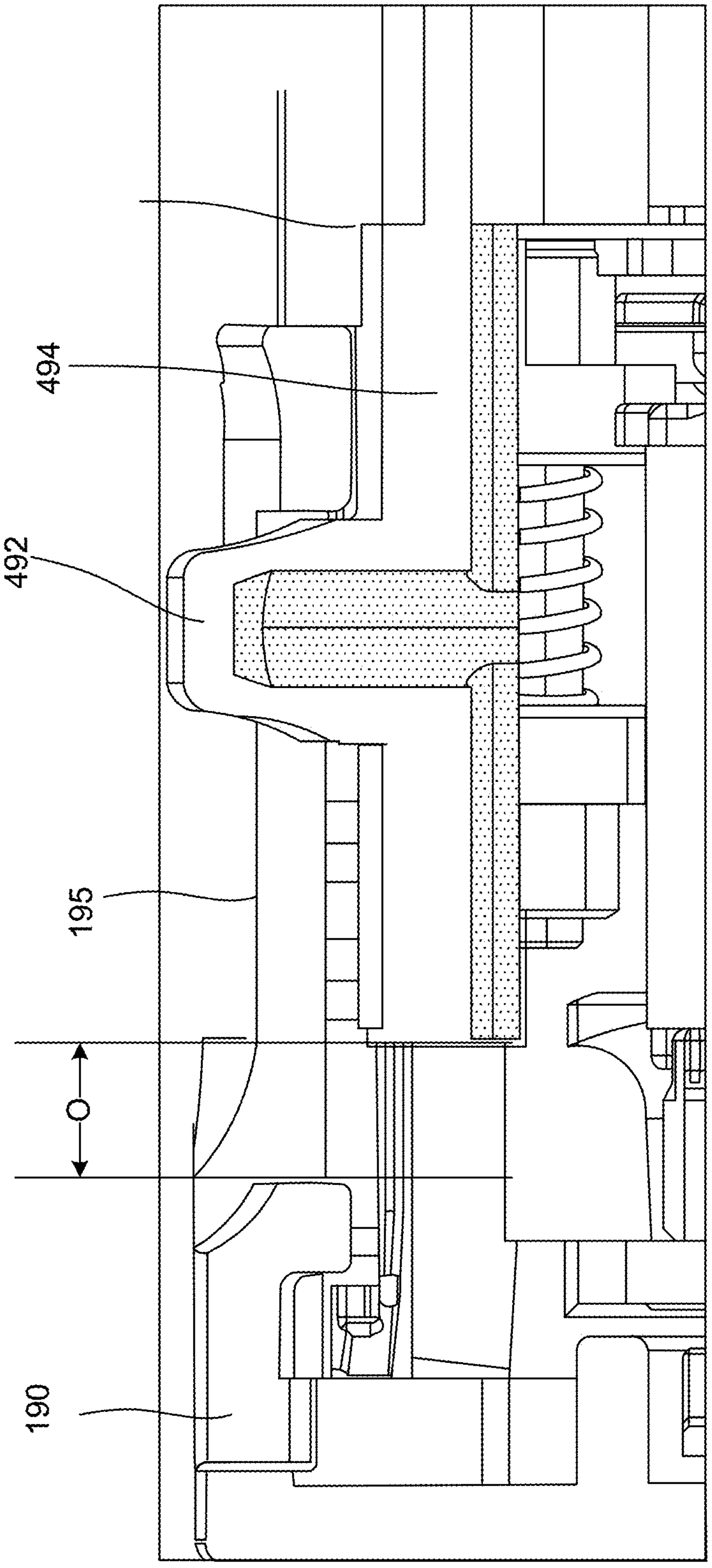

FIGS. 20A-20C are partial cross-sectional views of the switching device 490 of the speed selection mechanism 400, installed in the housing 190 of the tool 100. In particular, FIG. 20A is a cross-sectional view of the switching device 490 shown in FIG. 19, at a first position, corresponding to a first (for example, high) output speed mode of operation of the tool 100 (for example, as shown in FIG. 12A). FIGS. 20B(1) and 20B(2) are cross-sectional views of the switching device 490 shown in FIG. 19, at a second position, corresponding to a second, intermediate output speed mode of operation of the tool 100 (for example, as shown in FIG. 12B). FIG. 20C is a cross-sectional view of the switching device 490 shown in FIG. 19, at a third position, corresponding to a third (for example, low) output speed mode of operation of the tool 100 (for example, as shown in FIG. 12C). FIG. 20D is a cross-sectional view of the base portion 494 and the grasping member (e.g., a button or lever) 492 of the switching device 490, without the shutter 496, installed in the housing 190 of the tool 100.

As shown in FIG. 20A, in the first position of the switching device 490, corresponding to the first (for example, high) output speed mode of operation of the tool 100, the grasping member (e.g., a button or lever) 492 is positioned at a first end portion 195A of the opening 195 in the housing 190, at, essentially, a first extreme axial position of the switching device 490. In the position shown in FIG. 20A, a portion of the shutter 496, and a portion of the base portion 494 (exposed through the opening 495 in the shutter 496) extend across the opening 195 in the housing 190. In this manner, the housing 190 can remain enclosed (by the grasping member (e.g., a button or lever) 492, the base portion 494 and the shutter 496) in this first position of the switching device 490.

As shown in FIG. 20B, in the second position of the switching device 490, corresponding to the second, intermediate output speed mode of operation of the tool 100, the grasping member (e.g., a button or lever) 492 is positioned at an intermediate portion 195B of the opening 195 in the housing 190. In FIG. 20B(1), the shutter 496 is positioned at a first extreme end of travel of the shutter 496 relative to the base portion 494. In FIG. 20B(2), the shutter 496 is positioned at a second extreme end of travel of the shutter 496 relative to the base portion 494. In either of these positions, the opening 195 in the housing 190 is enclosed by the base portion 494 and the shutter 496. In this manner, the housing 190 can remain enclosed (by the grasping member (e.g., a button or lever) 492, the base portion 494 and the shutter 496) in this second, intermediate position of the switching device 490, regardless of the free sliding movement of the shutter 496 relative to the base portion 494.

As shown in FIG. 20C, in the third position of the switching device 490, corresponding to the third (for example, low) output speed mode of operation of the tool 100, the grasping member (e.g., a button or lever) 492 is positioned at a second end portion 195C of the opening 195 in the housing 190, at, essentially, a second extreme axial position of the switching device 490. In the position shown in FIG. 20C, a portion of the shutter 496, and a portion of the base portion 494 (exposed through the opening 495 in the shutter 496) extend across the opening 195 in the housing 190. In this manner, the housing 190 can remain enclosed (by the grasping member (e.g., a button or lever) 492, the base portion 494 and the shutter 496) in this third position of the switching device 490. As shown in FIG. 20C, in some implementations, the switching device 490 may include a stopping mechanism 498 to, for example, limit the axial movement of the shutter 496 in the housing 190. In the example implementation shown in FIG. 20C, the stopping mechanism 498 may include a first protrusion 498A extending upward at the first end 496A of the shutter 496, that is configured to engage a second protrusion 498B extending downward from a corresponding peripheral portion of the opening 195 in the housing 190.

In FIG. 20D, the switching device 490 is installed in the housing 190, at the same position as shown in FIG. 20C, but without the shutter in place on the base portion 494. As shown in FIG. 20D, without the variable length of the enclosure area provided by the sliding shutter 496 relative to the base portion 494 as described above, the base portion 494 of the switching device 490 would have to be elongated, for example, considerably elongated, to extend across an open area O, and completely enclose the opening 195 in the housing 190, particularly with the grasping member (e.g., a button or lever) 492 in the first position shown in FIG. 20C, and in the third position shown in FIGS. 20C and 20D. Elongating the base portion in this manner would, in turn, occupy additional axial space within the housing 190, thus requiring an elongated axial space in the housing to accommodate the movement of the switching device.

Thus, a switching device 490 including a slidable shutter 496 as described above may allow for a larger opening in the tool housing 190 to access the switching device 490 while still preventing dust and debris from entering the tool housing 190. Similarly, a switching device 490 including a slidable shutter 496 as described above may allow for an increased axial travel distance of the switching device for a given size of housing 190.

As noted above, in some implementations, the tool 100 may include a hammer mechanism 500 or an impact mechanism (not shown), which may selectively impart a repeated axial hammering force or a repeated rotational impacting force to a bit coupled to the power tool, respectively. In some implementations, an example rotational impact mechanism may have a design similar to one or more of the impact mechanisms disclosed in U.S. Pat. No. 5,016,501 and U.S. Patent Application Pub. Nos. 2007/0267207 and 2010/0071923, which are incorporated herein by reference. Other example impact mechanisms can be found in a model IDS600 Impact Screwdriver and a model FDS600 Impact Screwdriver commercially available from Black & Decker and in a model DCF895 Impact Driver, DCF896 Impact Driver, and DCF880 Impact Wrench available commercially from DeWalt Industrial Tool Co.

Figure 21:
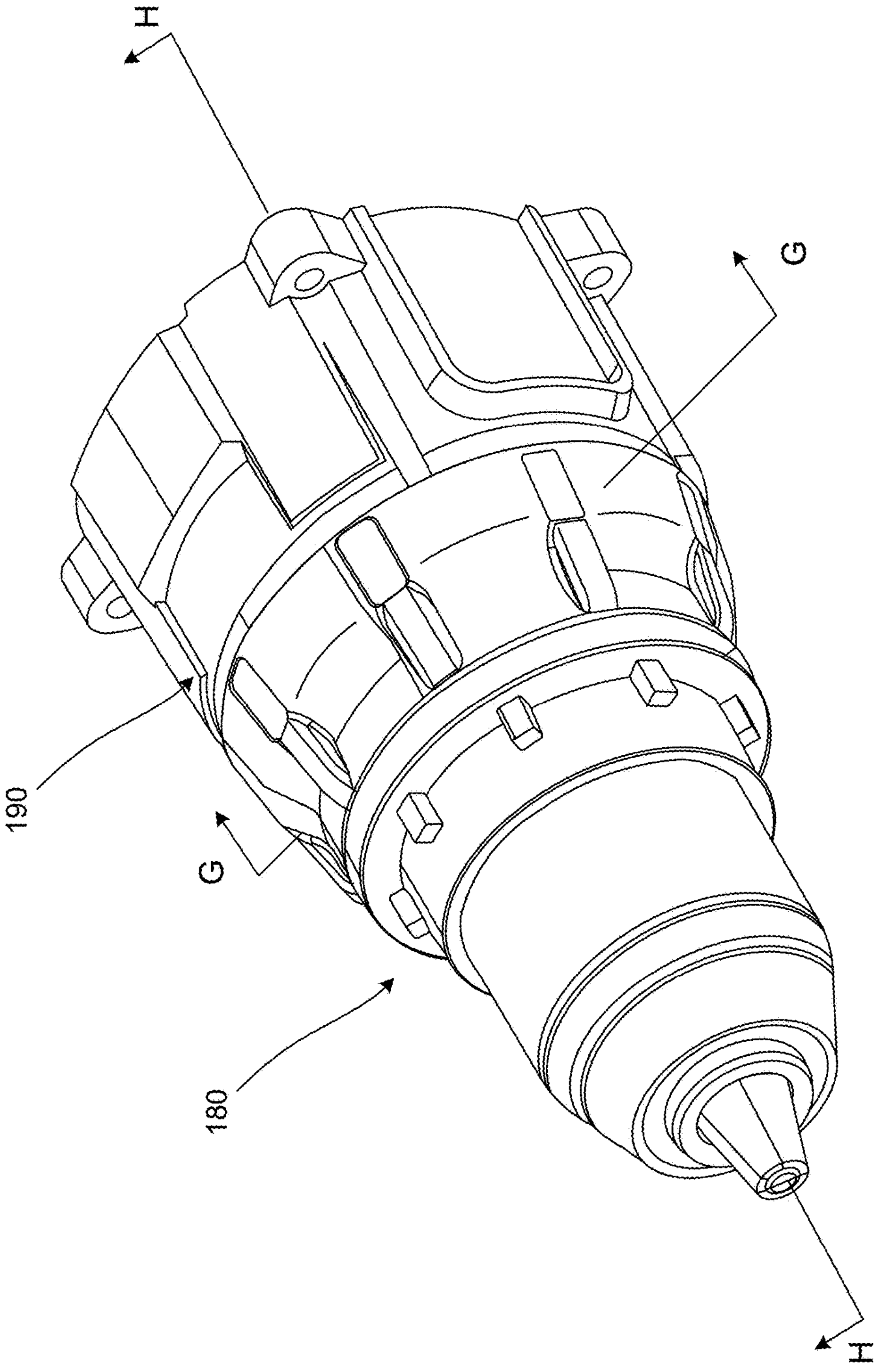
FIG. 21 is a partial perspective view of a working end portion of an example power-driven tool, in accordance with implementations described herein.
Figure 22B:
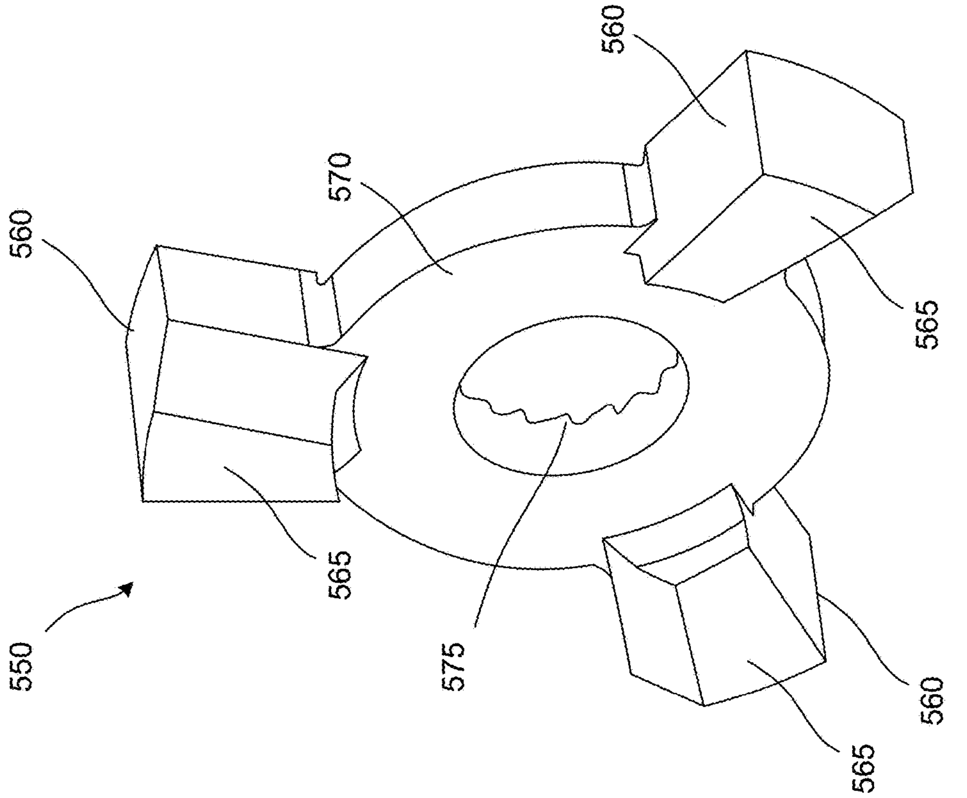
FIG. 22B is a perspective view of an implementation of a fixed ratchet configured to be engaged by the cam ring of FIG. 22A.
Figure 22A:
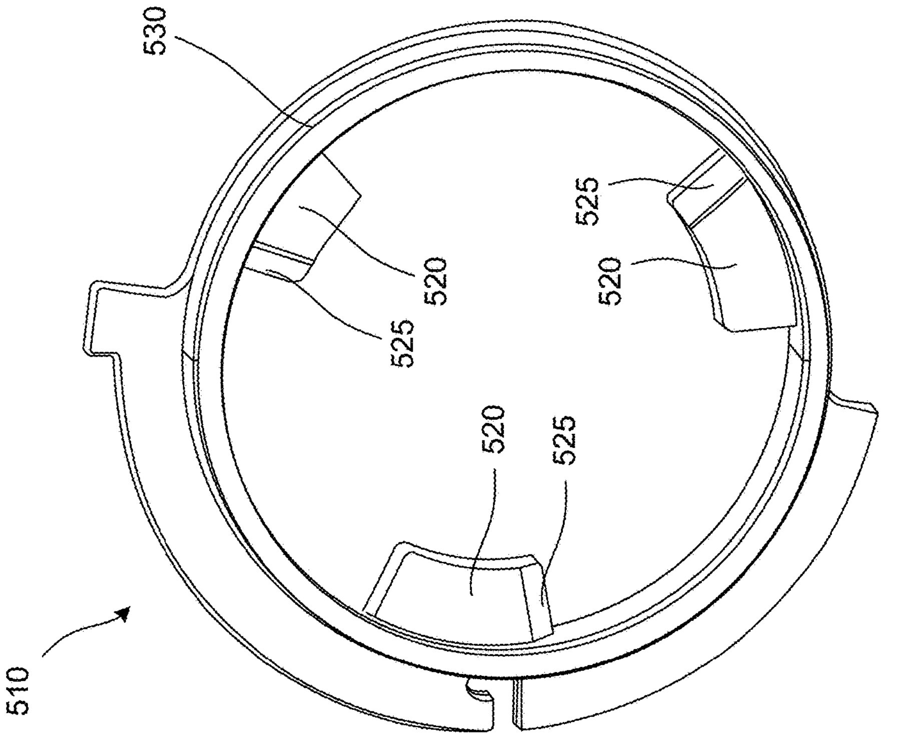
FIG. 22A is a perspective view of an implementation of a cam ring in the power tool of FIG. 21.

FIG. 21 is a perspective view of a working end of the tool 100, in which a hammer mechanism 500 may be housed, within the housing 190 of the tool 100. The example power-driven tool 100 including the hammer mechanism 500, in accordance with implementations described herein, may include a rotating cam mechanism 510, as shown in FIG. 22A, that interacts with a non-rotating ratchet 550, as shown in FIG. 22B. The rotating cam mechanism 510 may include cam lugs 520 having ramp surfaces 525, the cam lugs 520 extending radially inward from a cam ring 530. The non-rotating ratchet 550 may include lugs 560 having ramp surfaces 565, the lugs 560 extending radially outward from a hub 570. The cam mechanism 510 may surround the non-rotating ratchet 550, such that that the non-rotating ratchet 550 is nested within the cam mechanism 510. This arrangement may reduce an axial length of the hammer mechanism 500 (compared to, for example, an impacting mechanism in which a cam mechanism and a ratcheting mechanism are axially arranged), resulting in a more axially compact impacting mechanism 500, thus further enhancing utility and functionality of the tool 100. Operation of the hammer mechanism 500 will be described in more detail with respect to FIGS. 23A-23B.

Figure 23A:
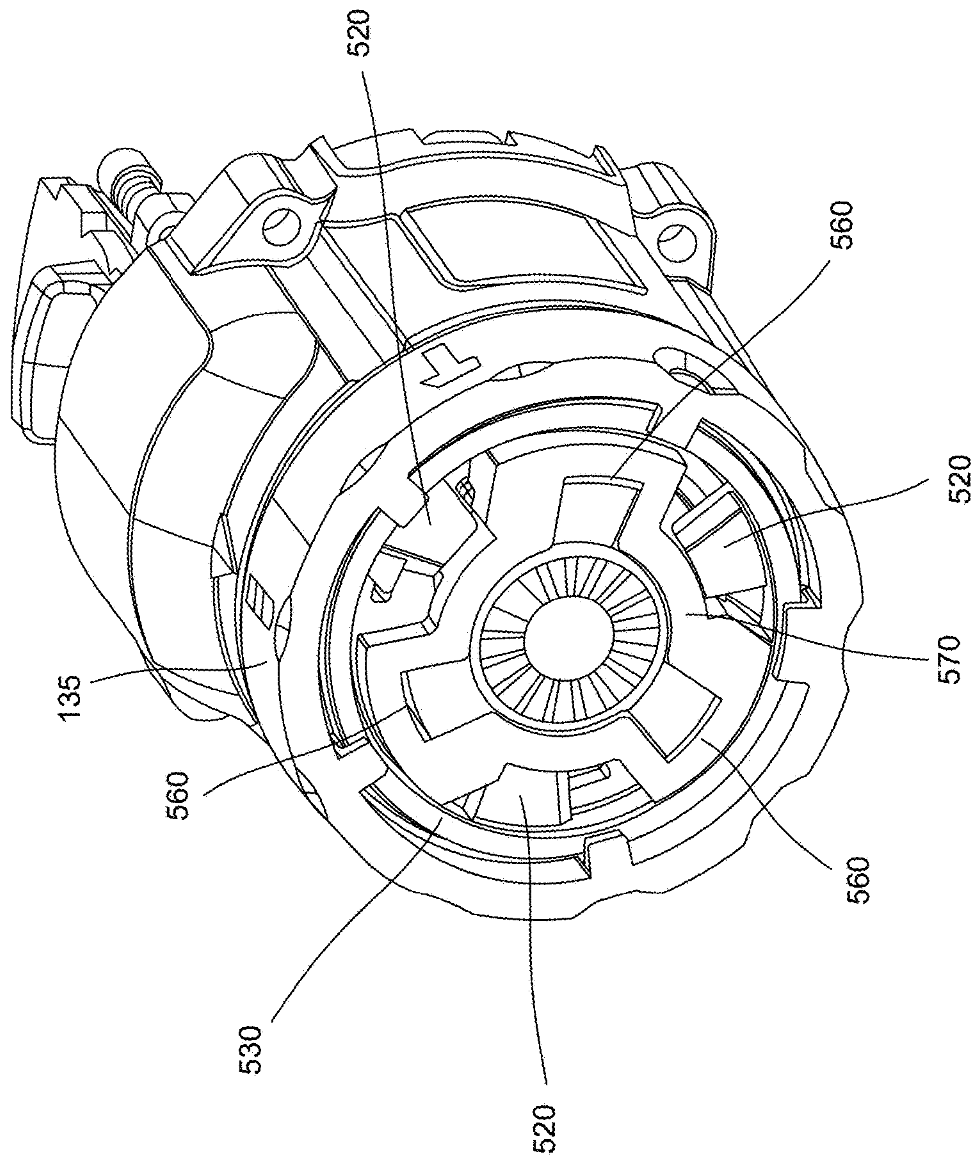
FIG. 23A is a cross-sectional view taken along line G-G of FIG. 21.
Figure 23B:
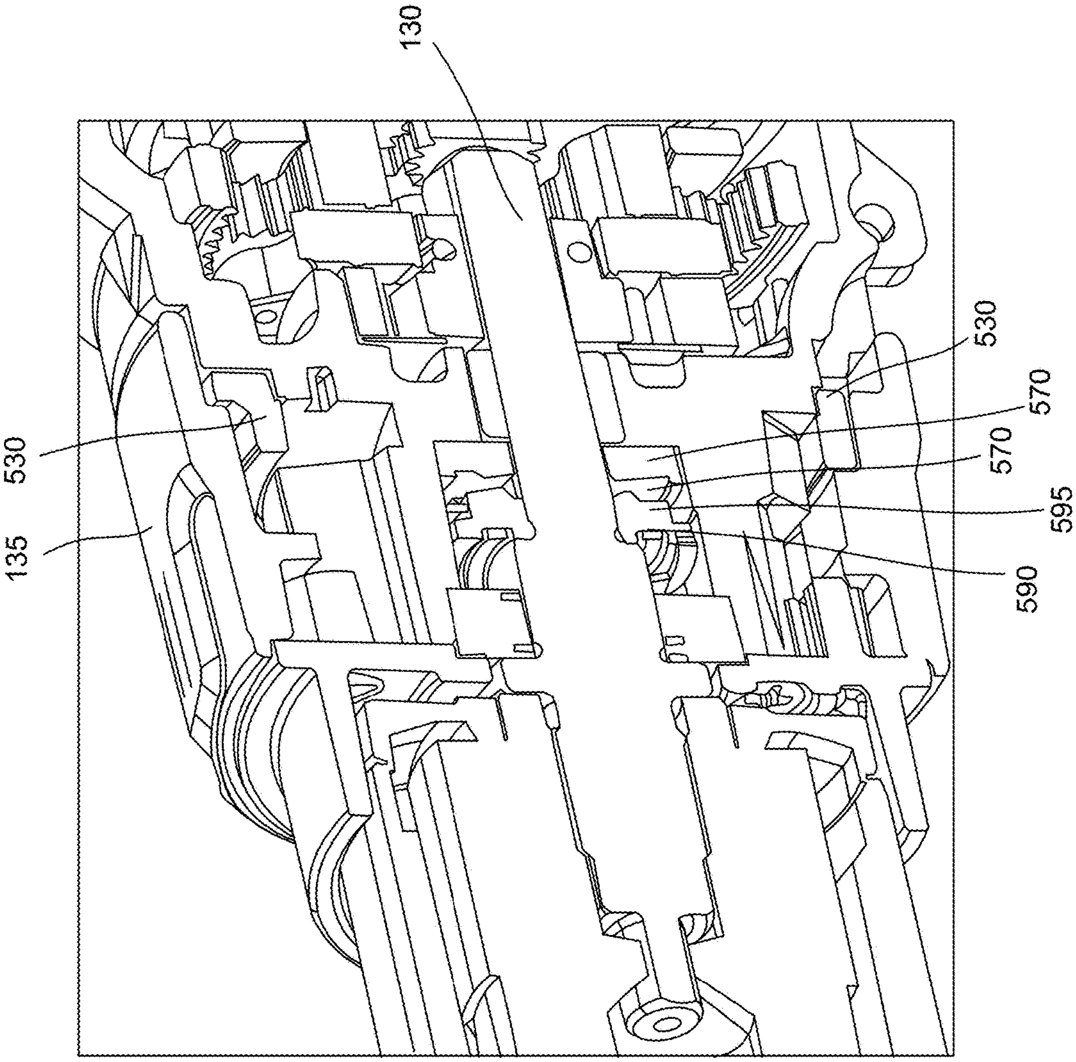
FIG. 23B is a cross-sectional view taken along line H-H, with the example power-driven tool in a second mode of operation, in accordance with implementations described herein.

FIGS. 23A and 23B are cross-sectional views taken along line taken along line G-G of FIG. 22. FIGS. 24B and 25B are cross-sectional views taken along line H-H of FIG. 22. In the cross-sectional views illustrated in FIGS. 23A and 23B, the example tool 100 is in a first mode of operation. In the cross-sectional views illustrated in FIGS. 24A and 24B, the example tool 100 is in a second mode of operation. In some implementations, in a power-driven tool including a hammer mechanism, in accordance with implementations described herein, the first mode of operation may be a driving mode, or a drilling mode of operation, and the second mode of operation may be a hammer mode of operation.

As shown in the cross-sectional views illustrated in FIGS. 23B and 24B, the non-rotating ratchet 550 may be non-rotatably fixed and axially moveable relative to the housing 190 of the tool 100. A rotating ratchet 590 may be non-rotatably fixed and axially movable relative to the output spindle 130. The fixed ratchet 590 and the rotating ratchet 550 may be axially aligned, such that teeth 575 formed on the hub 570 of the non-rotating ratchet 550 face teeth 585 on the rotating ratchet 590. In the first (driving, or drill) mode of operation, shown in FIGS. 23A and 23B, a collar 135 provided on an exterior of the housing 190 and coupled to the cam ring 530 is in a first selection position, for operation in the first mode of operation. In this first (drill) mode, the cam lugs 520/ramp surfaces 525 of the cam mechanism 510 and the lugs 560/ramp surfaces 565 of the non-rotating ratchet 550 are radially offset, and not engaged, as shown in FIG. 23A. In this first (drill) mode of operation, the non-rotating ratchet 550 and the rotating ratchet 590 are axially spaced apart, or separated, as shown in FIG. 24B, such that the teeth 575 of the non-rotating ratchet 550 and the teeth 595 of the rotating ratchet 590 are not engaged, and no axial percussion is applied to the output spindle 130. In the first (drill) mode, force (for example, rotational force) may be output from the output spindle 130 to, for example, an output accessory held in the chuck assembly 180.

Figure 24A:
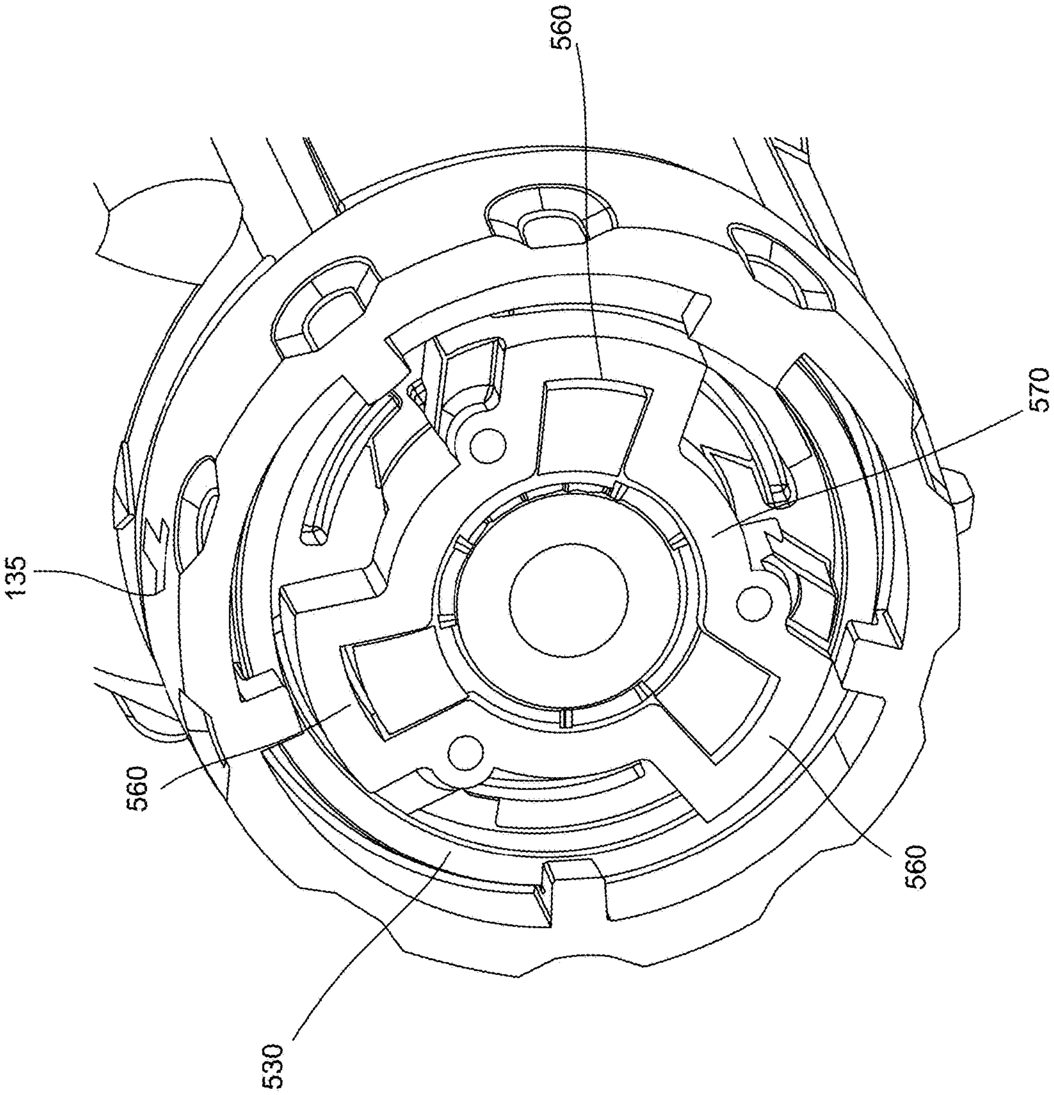
FIG. 24A is a perspective view of an example ratchet mechanism of an impacting mechanism of the example power-driven tool shown in FIGS. 22A-23B, in accordance with implementations described herein.
Figure 24B:
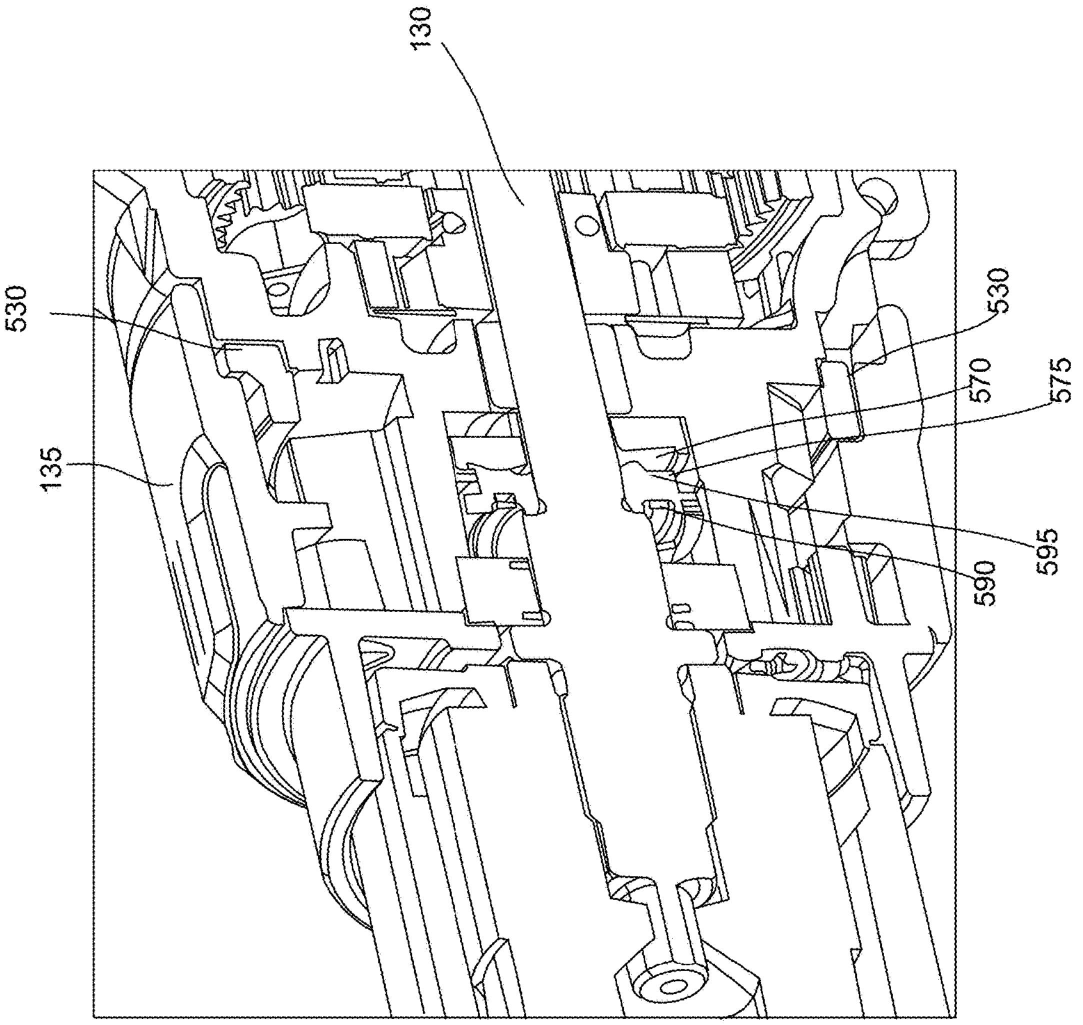
FIG. 24B is a perspective view of an example cam mechanism of an impacting mechanism of the example power-driven tool shown in FIGS. 22A-23B, in accordance with implementations described herein.

Rotation of the collar 135 from the first position shown in FIGS. 23A and 23B, to a second position shown in FIGS. 24A and 24B, may enable the second (hammer) mode of operation. In some implementations, rotation of the collar 135 (coupled to the cam ring 530 of the cam mechanism 510) to the second position may rotate the cam mechanism 510 by a set angular distance, as shown in FIG. 24A. This rotation of the cam mechanism 510 may cause the radial cam lugs 520/ramp surfaces 525 of the cam mechanism 510 to be aligned with the lugs 560/ramp surfaces 565 of the non-rotating ratchet 550. As shown in FIG. 24A, in this second position (corresponding to the second mode of operation), the cam lugs 520 are positioned behind the lugs 560 of the non-rotating ratchet 550. This movement of the cam mechanism 510 and alignment of the cam lugs 520 with the lugs 560 of the non-rotating ratchet 550 may push the non-rotating ratchet 550 axially forward, toward the rotating ratchet 590, so that that teeth 575 of the non-rotating ratchet 550 and the teeth 595 of the rotating ratchet 590 are engaged. Engagement of the teeth 575 of the non-rotating ratchet 550 and the teeth 595 of the rotating ratchet 590 may generate an axial percussion that is imparted on the output spindle 130 as the output spindle 130 rotates. This arrangement of components of the hammer mechanism 500 may provide for an axially compact hammer mechanism 500, contributing to a reduced overall tool profile, and further enhancing utility and functionality of the tool.

Figure 25A:
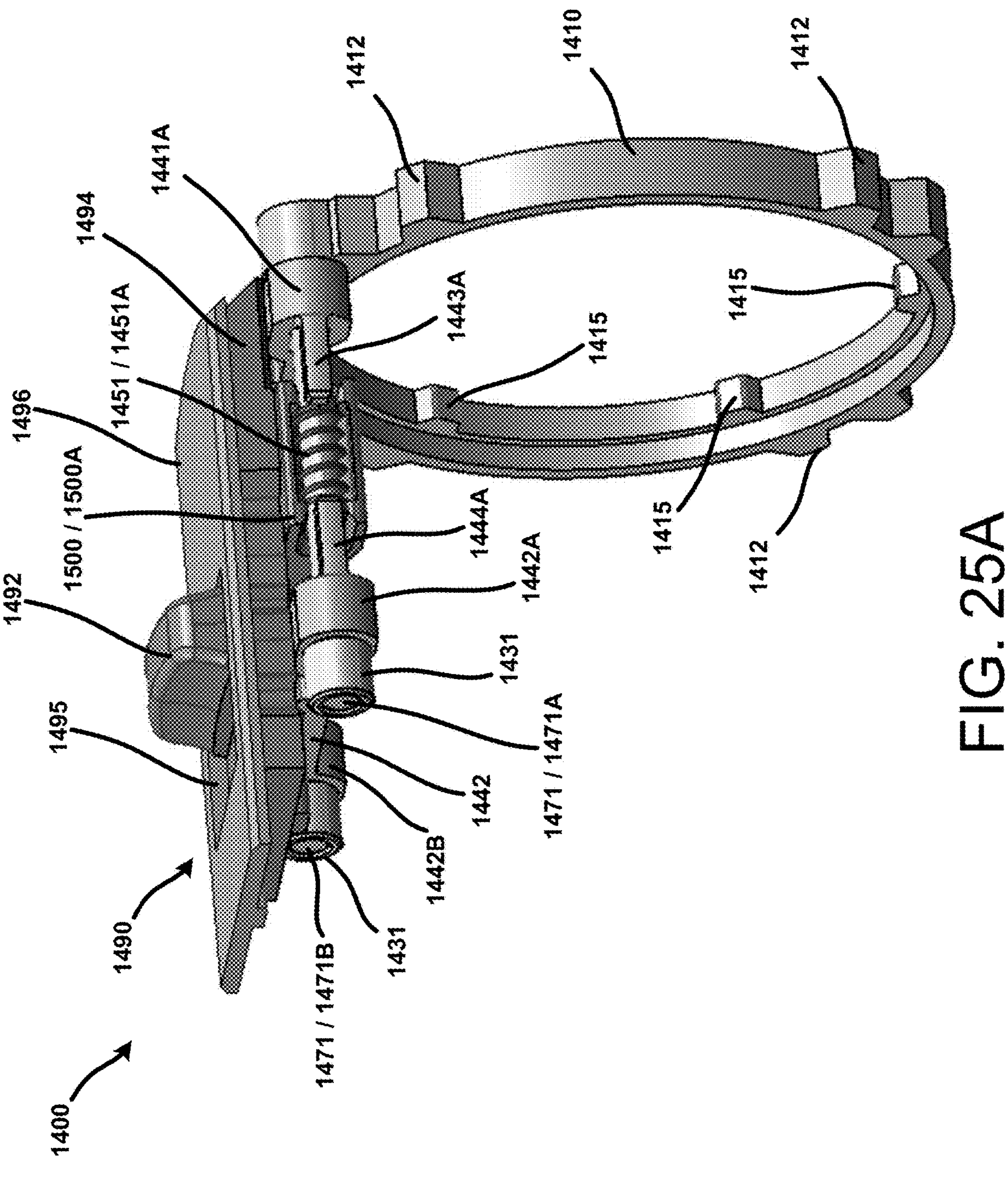
FIG. 25A is a side perspective view.
Figure 25B:
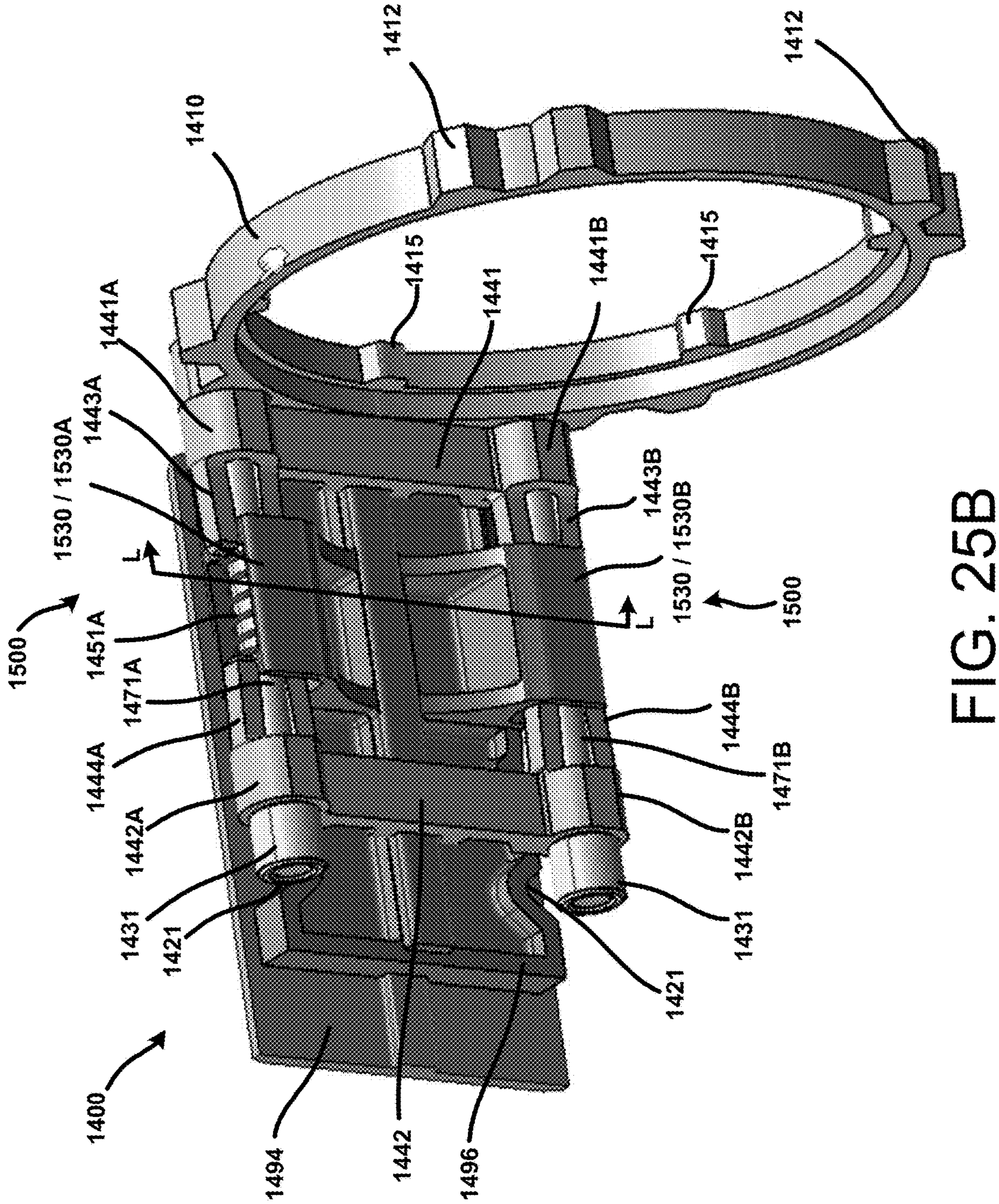
FIG. 25B is a bottom perspective view, of an example speed selection mechanism 1400, in accordance with implementations described herein.
Figure 25C:
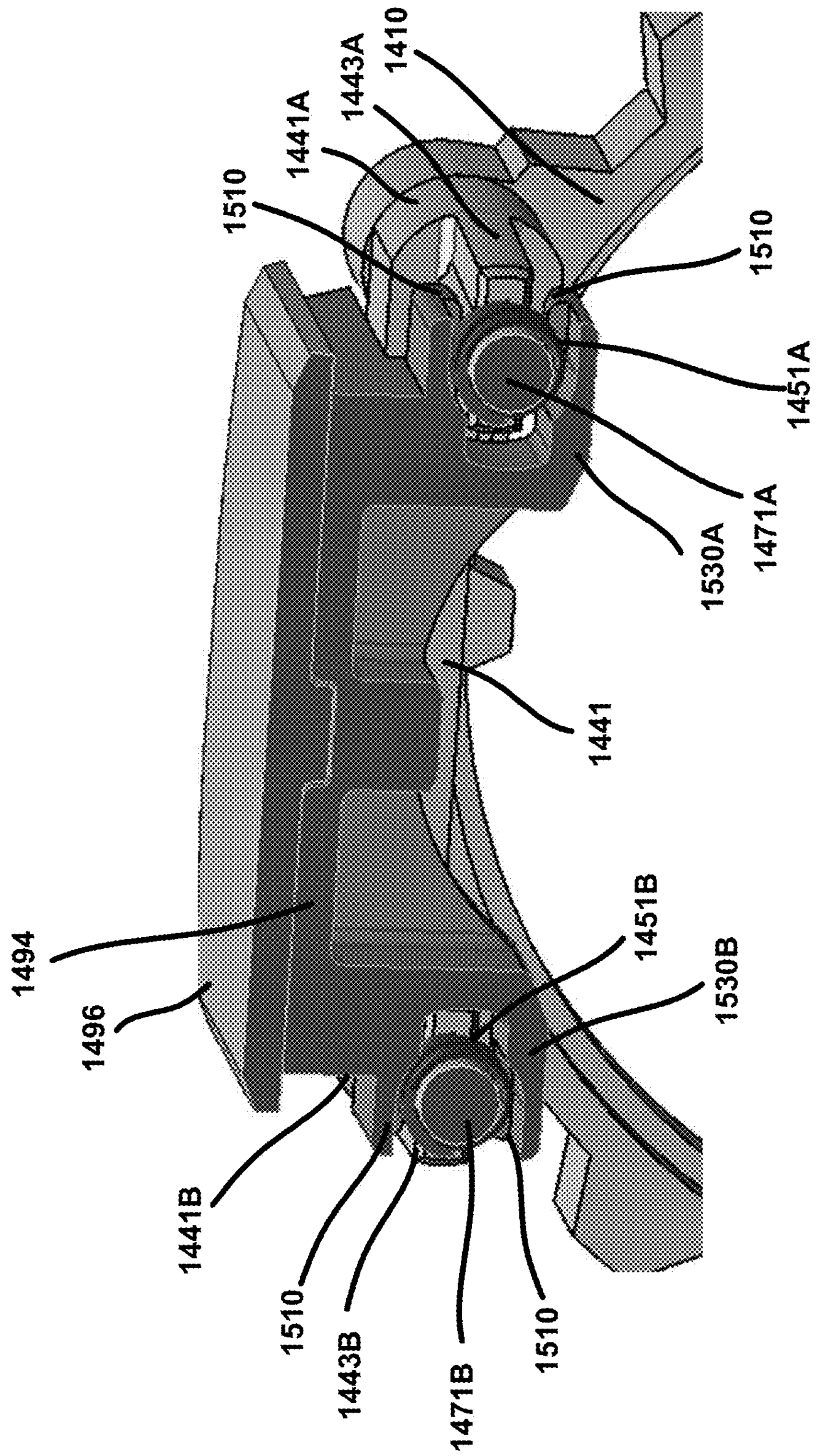
FIG. 25C is a cross-sectional view, taken along line L-L of FIG. 25B.
Figure 25D:
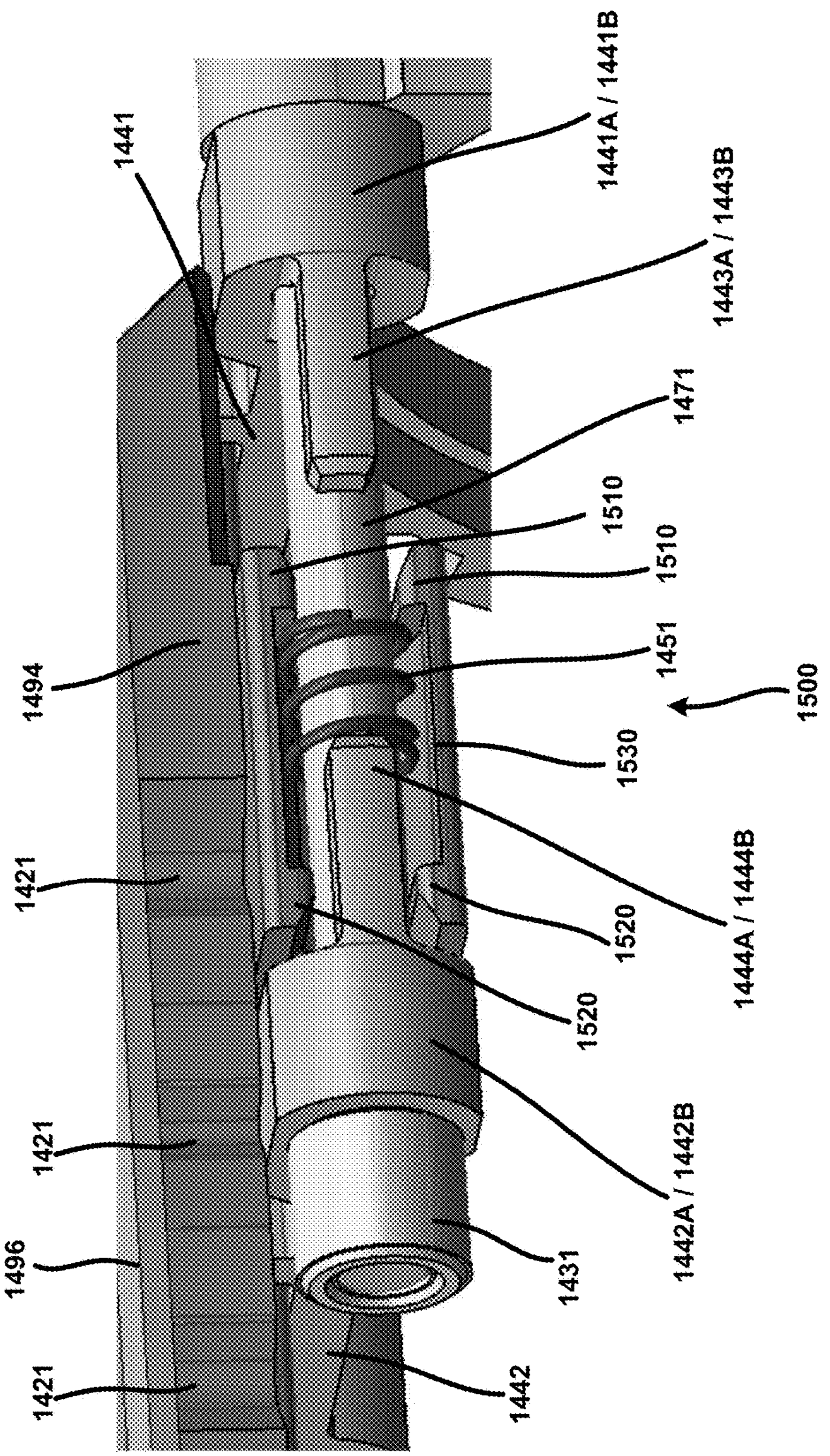
FIG. 25D is a close in perspective view of an example compliant mechanism of the speed selection mechanism 1400, in accordance with implementations described herein.
Figure 25E:
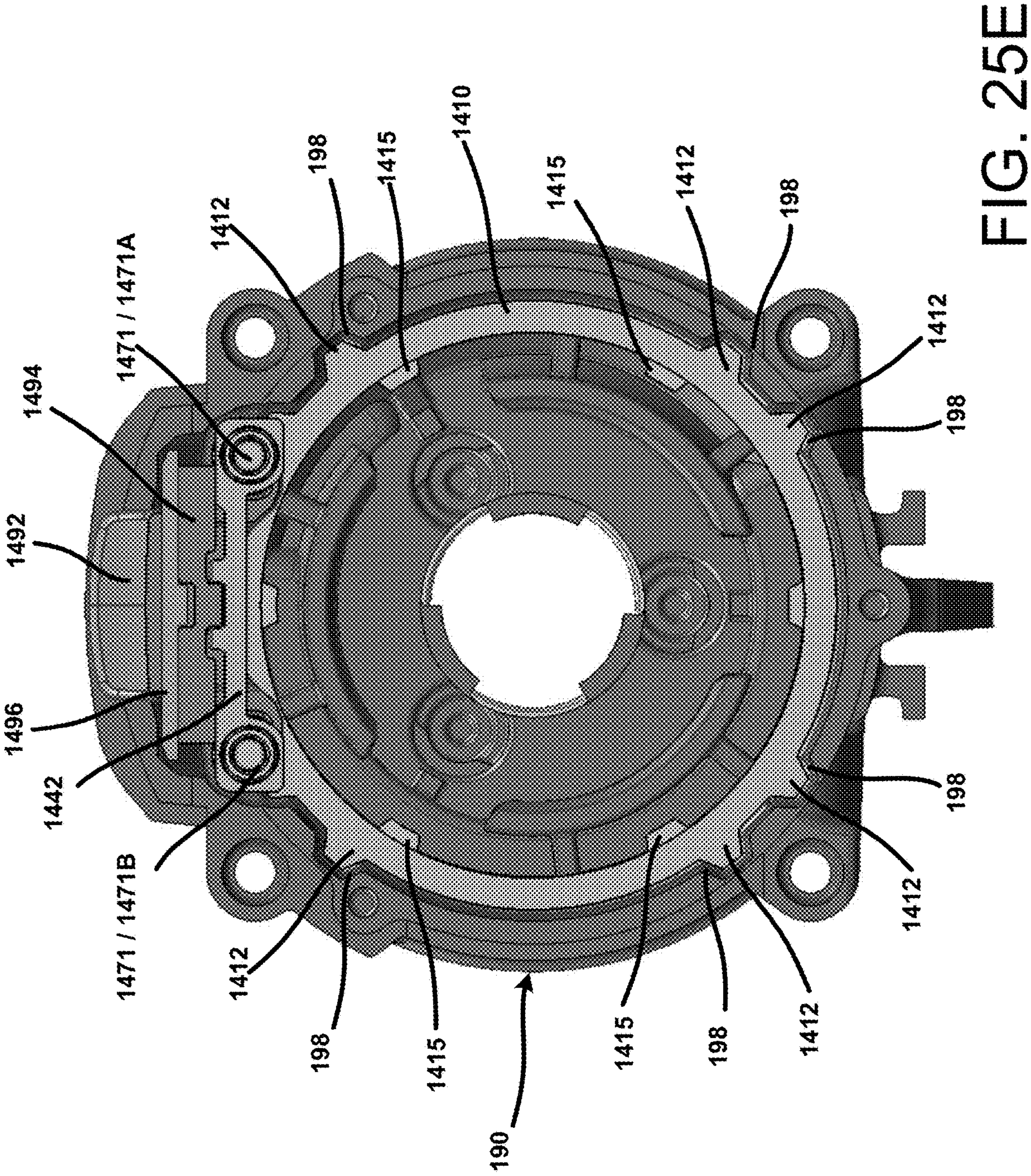
FIGS. 25E and 25F are cross-sectional views of the example speed selection mechanism 1400 installed in a housing of the example multi-speed power-driven tool.
Figure 25F:
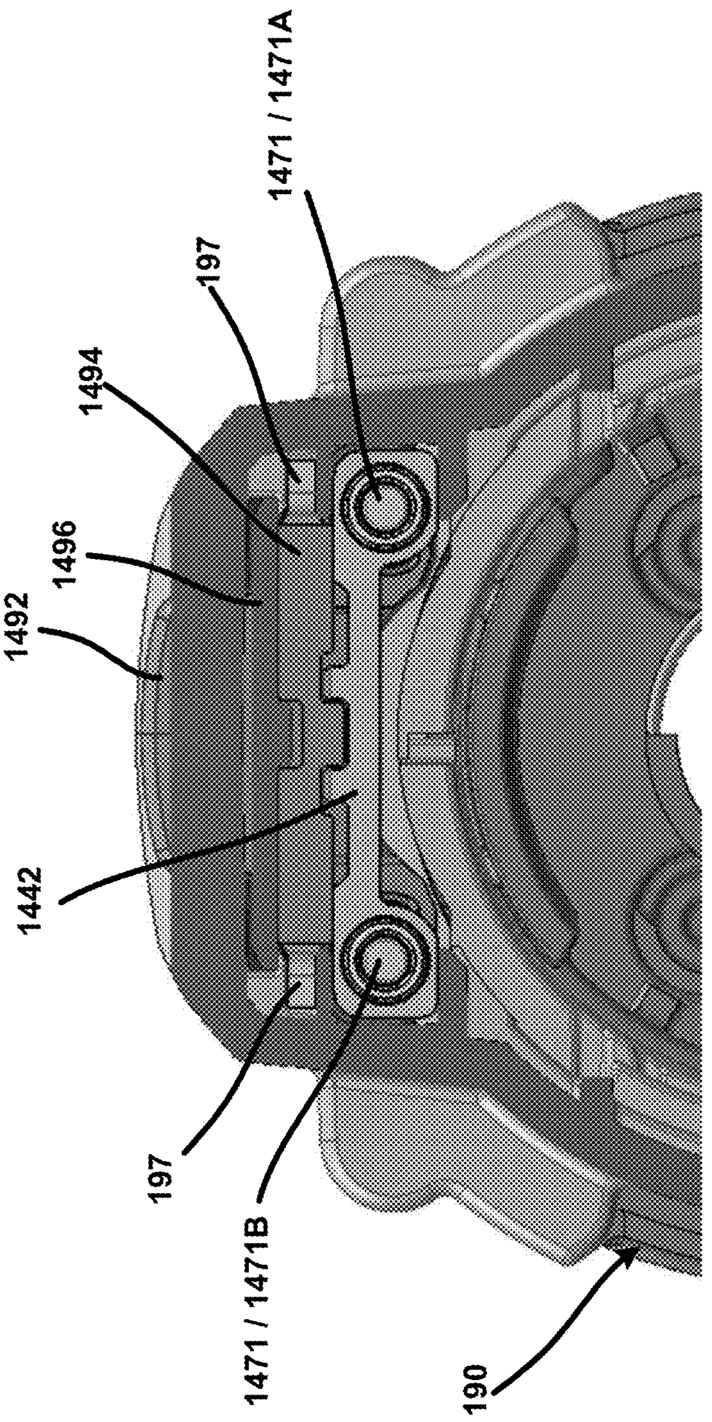

FIG. 25A is a side perspective view, and FIG. 25B is a bottom perspective view, of an example speed selection mechanism 1400, for use with the example multi-speed power-driven tool, in accordance with implementations described herein. FIG. 25C is a cross-sectional view, taken along line L-L of FIG. 25B. FIG. 25D is a close in perspective view of a compliant mechanism of the speed selection mechanism 1400, in accordance with implementations described herein. FIGS. 25E and 25F are cross-sectional views of the example speed mechanism 1400 installed in a housing of the example multi-speed power-driven tool.

The speed selection mechanism 1400, in accordance with implementations described herein, may provide for compliant shifting, for example, compliant multi-level shifting amongst a plurality of different speed reduction ratios, and amongst a plurality of corresponding operational output speeds, of the multi-speed power-driven tool. In the example implementation described above, the example multi-speed power-driven tool 100 included three modes of operation, or three output speeds (i.e., a first speed operation mode shown in FIGS. 11A and 12A, a second, intermediate speed operation mode shown in FIGS. 11B and 12B, and a third speed operation mode shown in FIGS. 11C, 11D and 12C). The example speed selection mechanism 1400 will be described with respect to shifting amongst three operation modes, or three output speeds, simply for purposes of discussion and illustration. The principles to be described herein with respect to the example speed selection mechanism may be adapted for use with a power driven tool that is operable in more, or fewer, operation modes and/or at more, or fewer, output speeds.

In some implementations, the speed selection mechanism 1400 may include a switching device 1490, or shifting device 1490, or speed selector 1490. The switching device 1490 may be coupled to a shift ring 1410 that is moved axially, in response to movement of the switching device 1490, to shift the output speed of the transmission mechanism 200 into the first, second or third mode of operation as described above, based on a position of the switching device 1490. The shift ring 1410 may be a complete ring (e.g., a circular shape) or a partial ring (e.g., a C-shape). In some implementations, the shift ring 1410 may include one or more guide lugs 1412 formed at an outer circumferential portion of the shift ring 1410. The guide lug(s) 1412 may be received in corresponding channels 198 formed in an interior of the housing 190, as shown in FIG. 25E, to guide the axial movement of the shift ring 1410. In some implementations, the shift ring 1410 may include one or more engagement lugs 1415 formed at an inner circumferential portion of the shift ring 1410. The engagement lugs 1415 may selectively engage features ring gears 270, 280, 290, for example, the lugs 272, 282, 292 of the first, second and third ring gears 270, 280, 290, respectively, to ground the selected ring gear 270, 280, 290 to the housing 190 for the selected output speed, as described above. A pair of axial pins 1471 (i.e., 1471A, 1471B) may each have a first end thereof coupled, for example, fixedly coupled, to the shift ring 1410. A first fork bushing 1441 may include a first fitting 1441A fixed to the first axial pin 1471A, and a second fitting 1441B fixed to the second axial pin 1471B. A second fork bushing 1442 may include a first fitting 1442A fixed to the first axial pin 1471A, and a second fitting 1442B fixed to the second axial pin 1471B. Thus, the first and second fork bushings 1441, 1442 may be fixed to, and may extend between, the pair of axial pins 1471, and the pair of axial pins 1471, and the first and second fork bushings 1441, 1442 may move axially, together with the shift ring 1410.

The switching device 1490 may be positioned over the axial pins 1471 and the fork bushings 1441, 1442. The switching device 1490 may include a finger grip 1492 that extends at least partially out of the housing 190 of the tool 100, so that the switching device 1490 is accessible from an exterior of the tool 100, for manipulation by an operator of the tool 100. The switching device 1490 may include a shutter 1496 positioned on a base 1494, with the finger grip 1492 extending up from the base 1494 and out through an opening 1495 in the shutter 1496, so that the finger grip 1492 is movable within the opening 1495 to a plurality of selection positions, allowing for operator selection of different output modes, or speeds, of the tool 100. In some implementations, a plurality of detents 1421 may be formed on opposite lateral sides of the base 1494. The detents 1421 may selectively engage leaf springs 197 provided in the housing 190 (see FIG. 25F) to retain an axial position of the speed selection mechanism 1400 relative to the transmission mechanism 200.

A pair of compression springs 1451 may be respectively positioned on the pair of axial pins 1471. For example, a first compression spring 1451A may positioned on the first axial pin 1471A, between the first fitting 1441A of the first fork bushing 1441 and the first fitting 1442A of the second fork bushing 1442. A second compression spring 1451B may be positioned on the second axial pin 1471B, between the second fitting 1441B of the first fork bushing 1441 and the second fitting 1442B of the second fork bushing 1442. In some implementations, bushings 1431 may be installed at the second ends of the axial pins 1471.

Figure 26A:
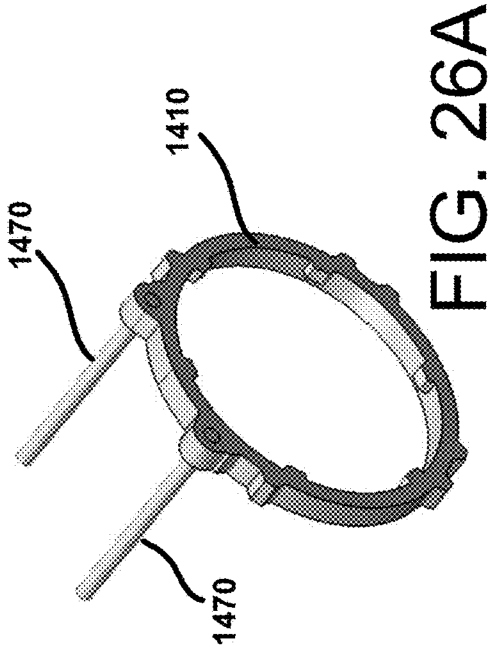
FIGS. 26A-26D are perspective views sequentially illustrating an assembly of the example speed selection mechanism shown in FIGS. 25A-26B, in accordance with implementations described herein.
Figure 26B:
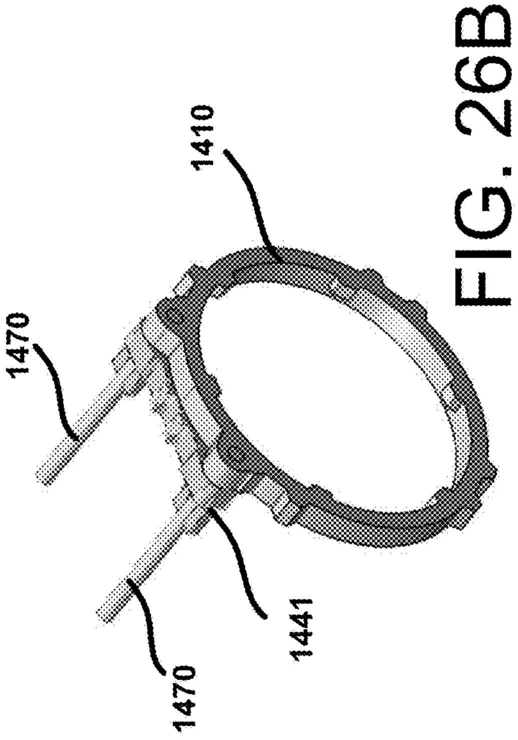
Figure 26C:
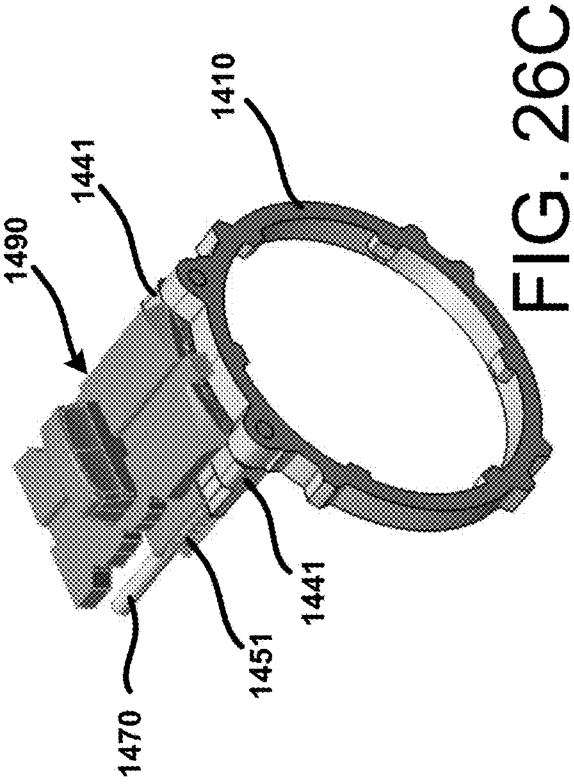
Figure 26D:
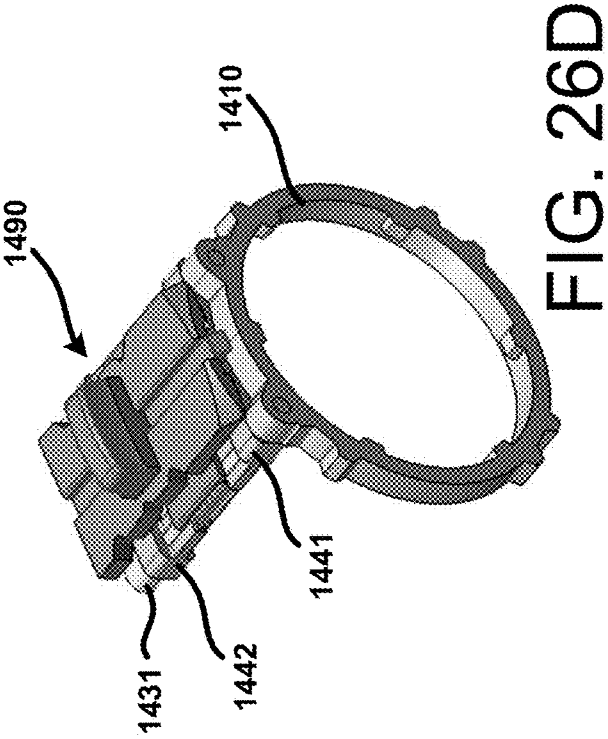

FIGS. 26A-26D are perspective views sequentially illustrating the assembly of the speed selection mechanism 1400, in accordance with implementations described herein, to illustrate the interaction of the components of the speed selection mechanism 1400. As shown in FIG. 26A, the first end portion of the first and second axial pins 1471 may be fit, for example, press fit, into corresponding receiving openings in the shift ring 1410, to fix the coupling of the pins 1471 to the shift ring 1140. As shown in FIG. 26B, the first fork bushing 1441 may be installed onto the pins 1471. For example, the first axial pin 1471A may be fit, for example, press fit, in the first fitting 1441A of the first fork bushing 1441, and the second axial pin 1471B may be fit, for example, press fit, in the second fitting 1441B of the first fork bushing 1441. The springs 1451 may be positioned within axial support arms 1530 of the base 1494 of the switching device 1490, and the base 1494 may be slidably coupled onto the pins 1471, as shown in FIG. 26C. The second fork bushing 1442 may then be installed by fitting, for example, press fitting the first and second axial pins 1471 into the first and second fittings 1442A, 1442B, respectively, and then fitting the bushings 1431 on the ends of the axial pins 1471, as shown in FIG. 26D.

In some implementations, a compliant mechanism 1500 may provide the speed selection mechanism 1400 with compliance in shifting between the various output speeds of the power-driven tool 100. For example, in some implementations, the pair of compression springs 1451 and corresponding portions of the pair of axial pins 1471 on which the springs 1451 are positioned, may be respectively received in a pair of support arms 1530 formed at a bottom portion of the base 1494. For example, the first pin 1471A and first spring 1451A may be received in a first support arm 1530A formed on a corresponding bottom surface portion of the base 1494. The second pin 1471B and the second spring 1451B may be received in a second support arm 1530B formed on a corresponding bottom surface portion of the base 1494. Interaction of the guide pins 1471 and compression springs 1451 with the first and second fork bushings 1441, 1442, and with the support arms 1530, in providing for compliance in shifting, will be described in more detail below.

In some implementations, protrusions 1443 may extend from the fittings of the first fork bushing 1441 toward the respective spring 1451, and protrusions 1444 may extend from the fittings of the second fork bushing 1442 toward the respective spring 1451. For example, as shown in FIG. 25B, a protrusion 1443A may extend from the first fitting 1441A of the first fork bushing 1441 toward the first spring 1451A on the first axial pin 1471A, and a protrusion 1443B may extend from the second fitting 1441B of the first fork bushing 1441 toward the second spring 1451B on the second axial pin 1471B. Similarly, a protrusion 1444A may extend from the first fitting 1442A of the second fork bushing 1442 toward the first spring 1451A on the first axial pin 1471A, and a protrusion 1444B may extend from the second fitting 1442B of the second fork bushing 1442 toward the second spring 1451B on the second axial pin 1471B. Each of the support arms 1530 may include a first pair of tabs 1510 at a first axial end of the support arm 1530, and a second pair of tabs 1520 at a second axial end of the support arm 1530. FIG. 25D provides a close in view of the arrangement of these components of the compliant mechanism 1500, shown from a first side of the speed selection mechanism 1400. It is understood these components will be similarly arranged on the second side of the speed selection mechanism 1400.

Figure 27A:
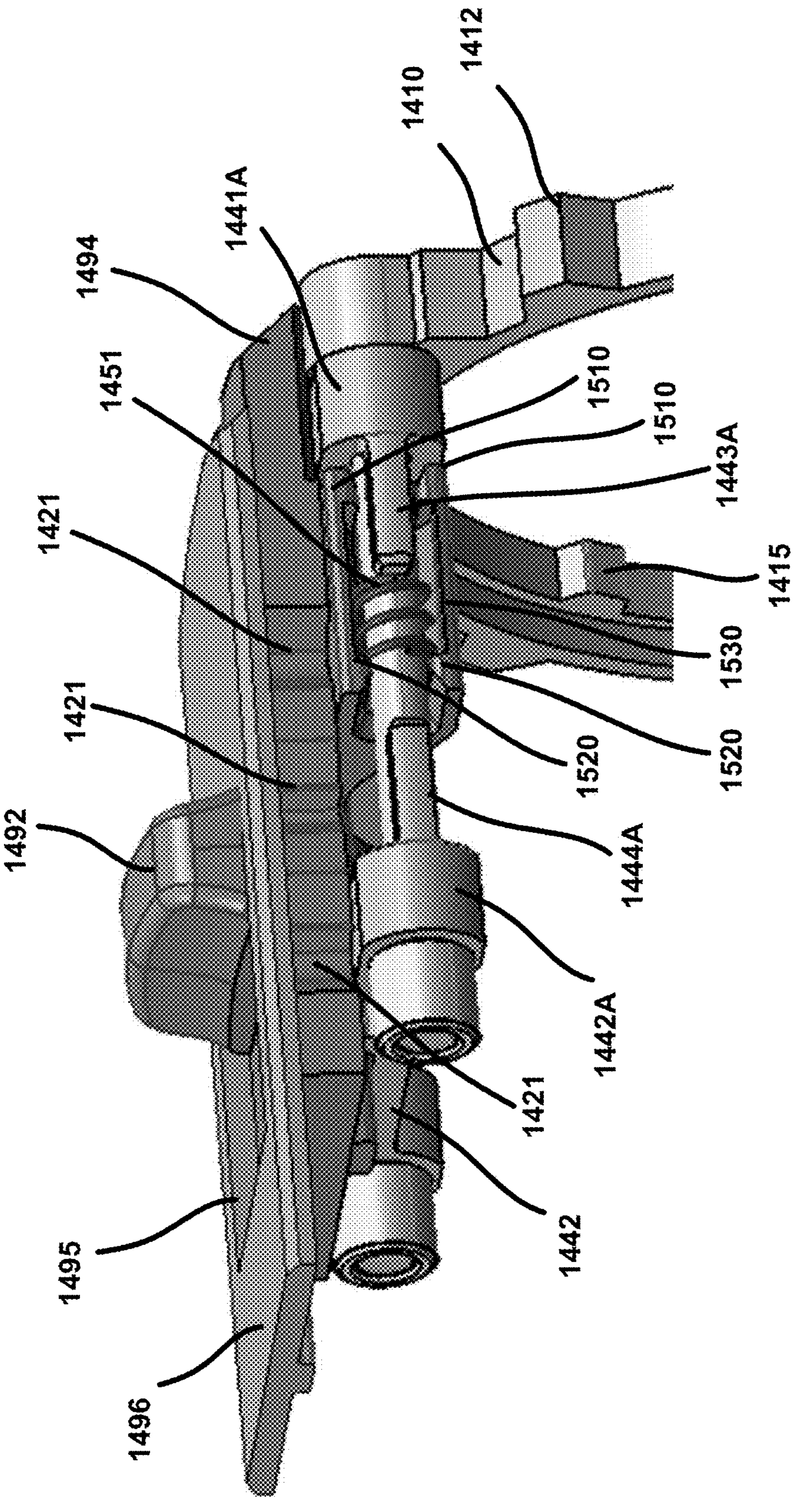
FIGS. 27A and 27B are partial perspective views of the example speed selection mechanism shown in FIGS. 25A-25C, illustrating operation of the example compliant mechanism shown in FIG. 25D, in accordance with implementations described herein.
Figure 27B:
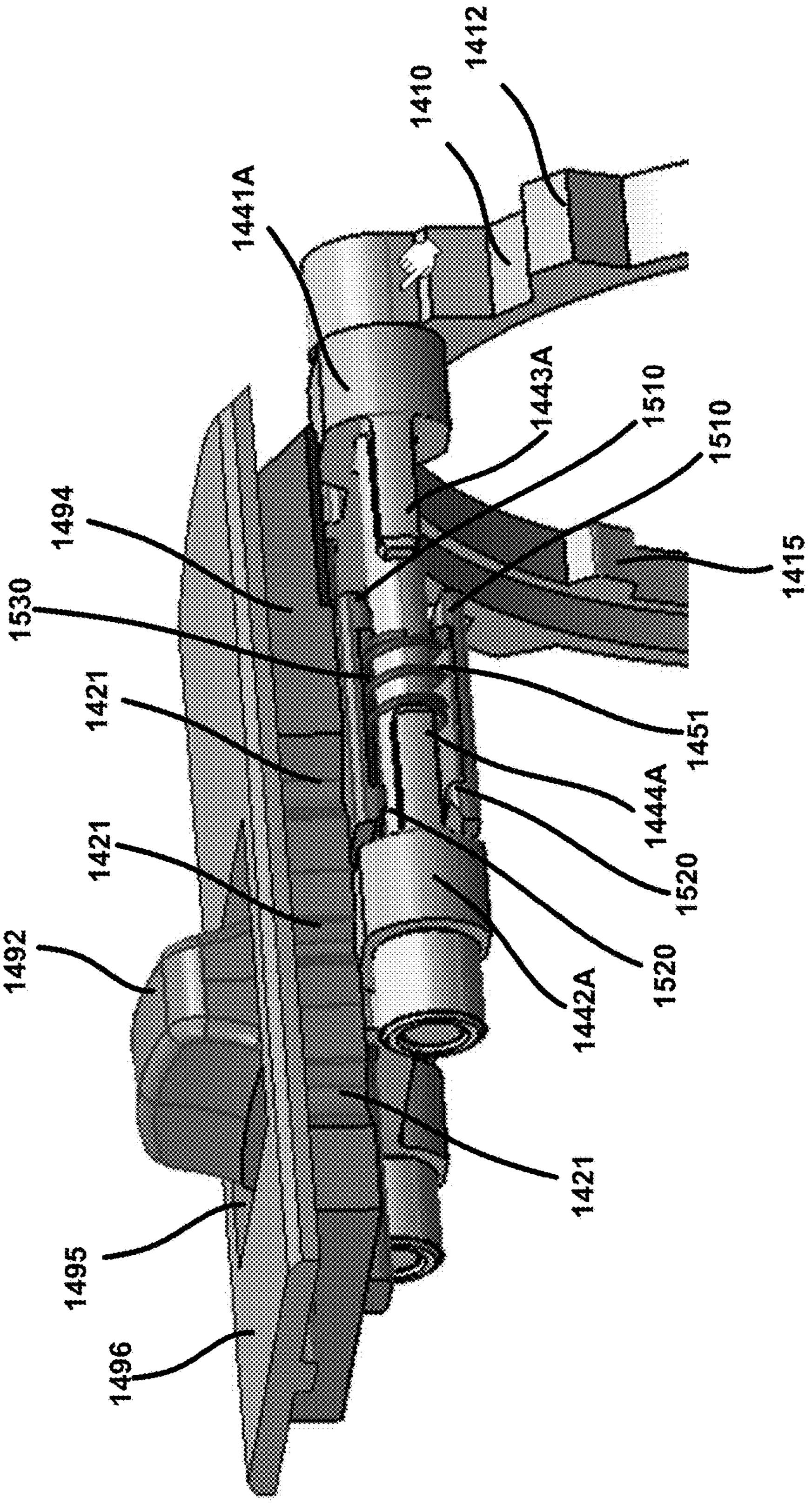

FIGS. 27A and 27B are partial perspective views of the speed selection mechanism 1400, illustrating operation of the compliance mechanism 1500 for engagement of the speed selection mechanism 1400 and the transmission mechanism 200 (not shown in FIGS. 27A and 27B), in accordance with implementations described herein.

In the position shown in FIG. 27A, the switching device 1490 has been moved to a position at a first end of the opening 1495 in the shutter 1496, to select the first output speed. This axial selection position may be retained by interaction of the leaf spring 197 attached to the interior of the housing 190 with corresponding detent(s) 1421 formed in the lateral side(s) of the base 1494 (see FIG. 25F). In this position, the springs 1451 are compressed in a forward position on the axial pins 1471 (in the orientation shown in FIG. 27A), with the tabs 1520 at the axially rearward end portion of the support arms 1530 pressing the springs 1451 against the protrusions 1443 of the first fork bushing 1441. In this arrangement, the first fork bushing 1441, the axial pins 1471, and the shift ring 1410 are axially stationary. Due to, for example, the relative arrangement of the ring gears 270, 280, 290, and in particular the circumferential positioning of the lugs 272, 282, 292 of the ring gears 270, 280, 290, with respect to the engagement lugs 1415 of the shift ring 1410, it may be that the shift ring 1410 is temporarily blocked, or restricted, from moving axially to engage the desired ring gear 270, 280, 290. In this case, the shift ring 1410 may move to an intermediate position between the previously engaged ring gear and the desired ring gear.

Figure 27C:
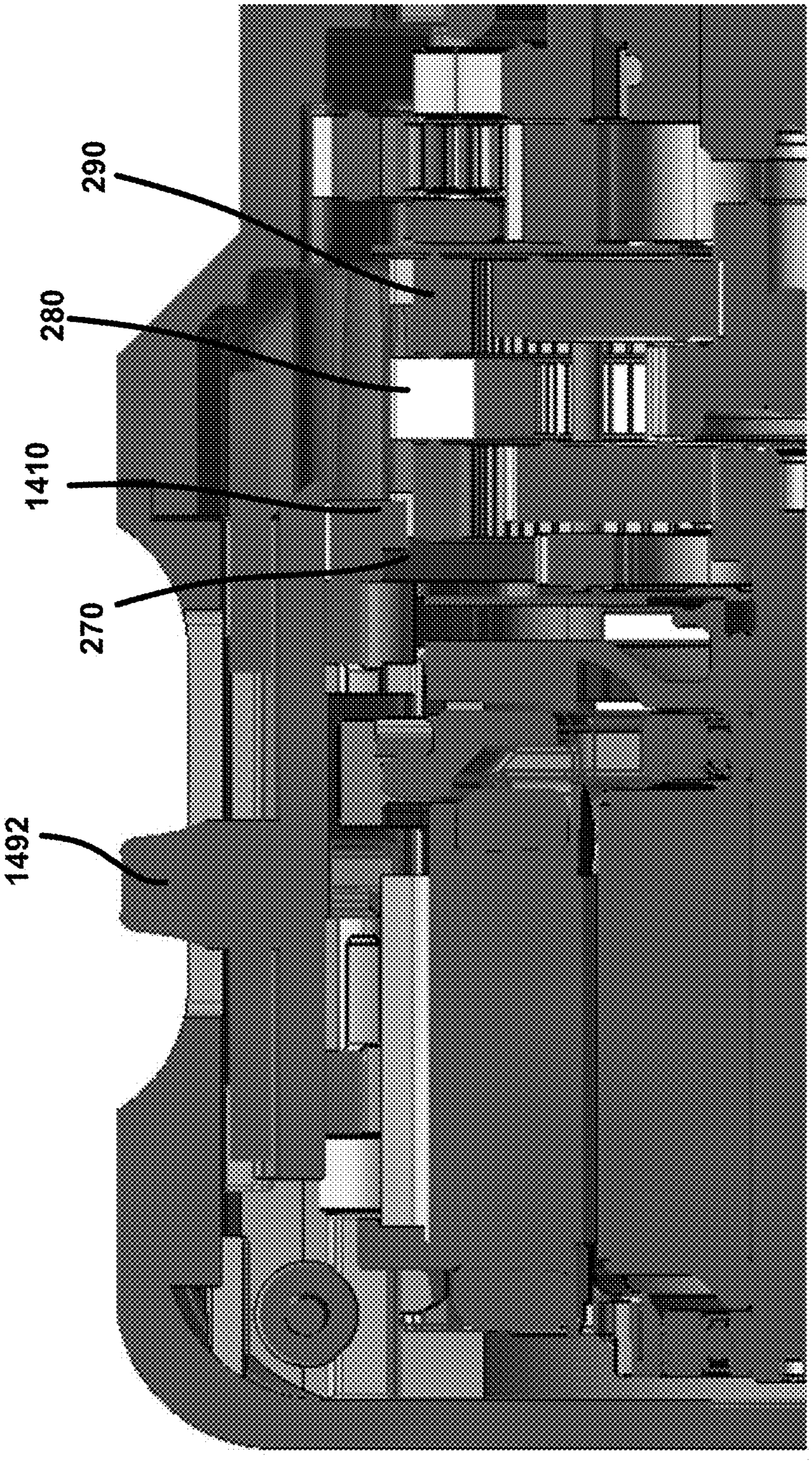
FIGS. 27C-27E are partial cross-sectional views of an interaction between the example speed selection mechanism, the example compliant mechanism, and the example transmission mechanism, in accordance with implementations described herein.
Figure 27D:
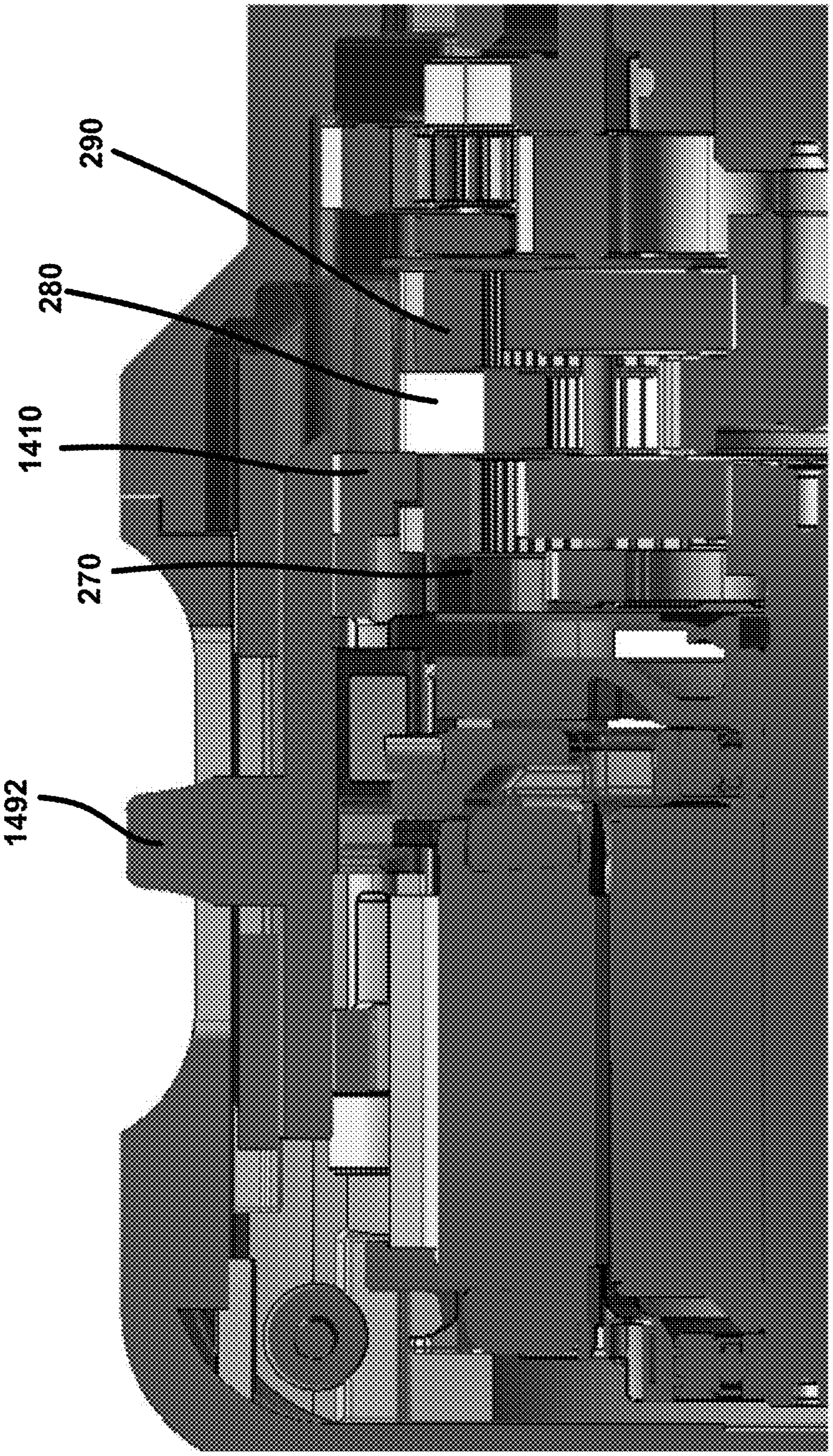
Figure 27E:
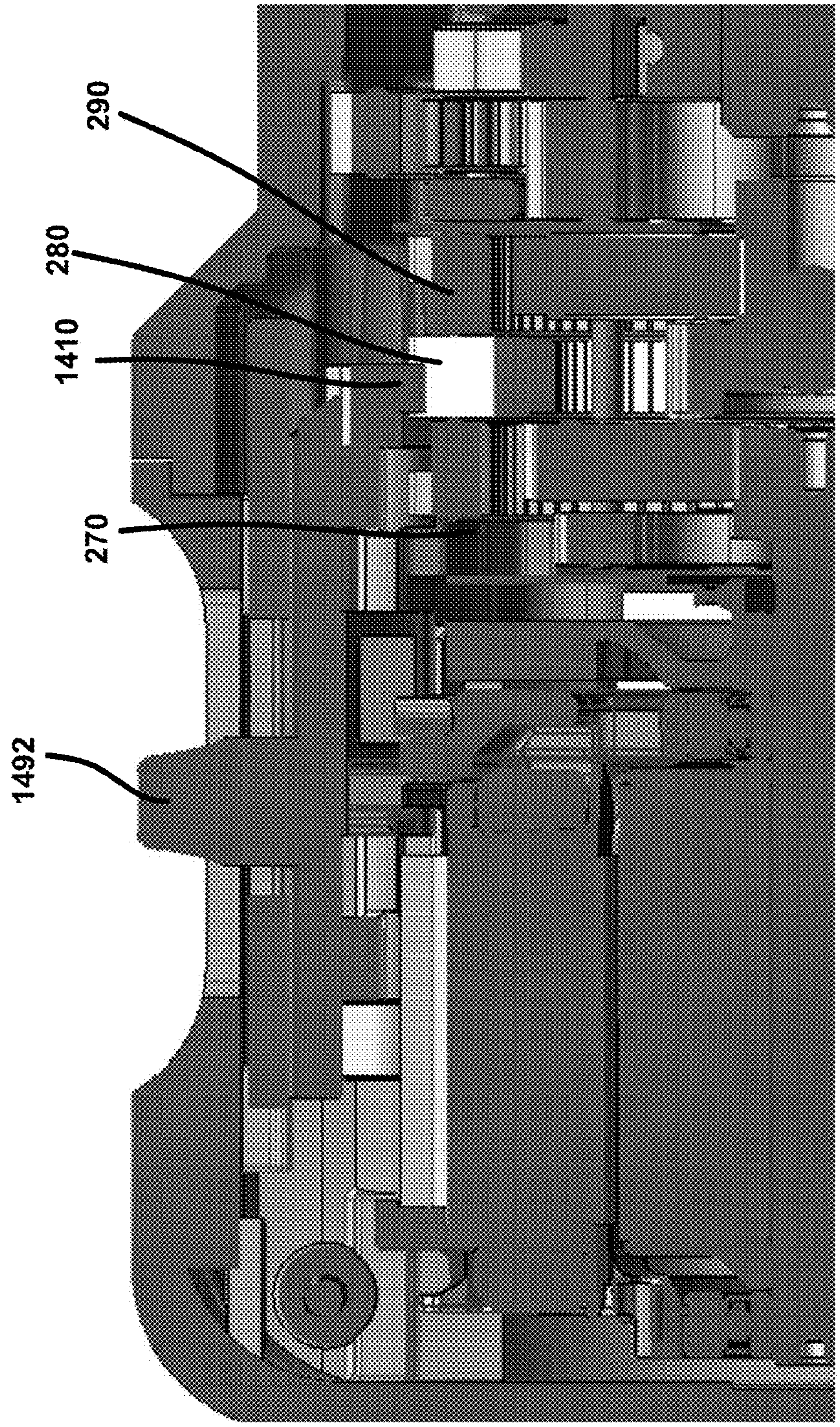

For example, FIG. 27C provides a cross-sectional view illustrating a position of the shift ring 1410 relative to the ring gears 270, 280, 290 at the first output speed. In this position, the shift ring 1410 is engaged with the first ring gear 270, so as to ground the first ring gear 270 relative to the housing 190 and select operation of the tool 100 at the first output speed. An operator may move or slide the grasping member (e.g., a button or lever) 1492, from the position shown in FIG. 27C to the left in the orientation shown in FIGS. 27C-27E, to select the second output speed. As shown in FIG. 27D, the relative arrangement of the ring gears 270, 280, 290 and the corresponding circumferential positioning of the lugs 272, 282, 292 with respect to the engagement lugs 1415 of the shift ring 1410 has temporarily blocked, or restricted axial movement of the shift ring 1410, and the shift ring 1410 is positioned between the previously engaged ring gear (the first ring gear 270 in this example) and the desired ring gear (the second ring gear 280 in this example). In response to application of power, one or more of the ring gears 270, 280, 290 may rotate so that the axial movement of the shift ring 1410 is no longer obstructed. The force of the springs 1451 pushes against the protrusion 1443 of the first fork bushing 1441, allowing the first and second fork bushing 1441, 1442 and the shift ring 1410 to move axially into engagement with the desired ring gear (the second ring gear 280 in this example), as shown in FIG. 27E.

As noted above, the axial selection position may be retained by interaction of the leaf spring 197 attached to the interior of the housing 190 with corresponding detent(s) 1421 formed in the lateral side(s) of the base 1494.

In this position, the springs 1451 are compressed in a rearward position on the axial pins 1471 (in the orientation shown in FIG. 27B), with the tabs 1510 at the axially forward end portion of the support arms 1530 pressing the springs 1451 against the protrusions 1444 of the second fork bushing 1442. As described above, due to, for example, the relative arrangement of the ring gears 270, 280, 290, and in particular the circumferential positioning of the lugs 272, 282, 292 of the ring gears 270, 280, 290, with respect to the engagement lugs 1415 of the shift ring 1410, it may be that the shift ring 1410 is temporarily blocked, or restricted, from moving axially to engage the desired ring gear 270, 280, 290. In response to application of power, one or more of the ring gears 270, 280, 290 may spin, the axial movement of the shift ring 1410 may no longer be obstructed, and the force of the springs 1451 will push against the protrusion 1444 of the second fork bushing 1442, allowing the first and second fork bushing 1441, 1442 and the shift ring 1410 to move axially into engagement with the desired ring gear 270, 280, 290.

The first and second axial springs 1451 are arranged substantially in parallel on the first and second axial pins 1471, which move axially together with the shift ring 1410. Axial movement of the axial springs 1451 on the axial pins 1471 exert a biasing force on the shift ring 1410 in both the forward and the rearward directions relative to switching device 1490. The bi-directional biasing provided by the two axial springs 1451 arranged in parallel provides for shifting compliance in both movement directions of the speed selection mechanism 1400, and may reduce imbalance experienced during shifting, particularly when compared to an arrangement in which the springs are positioned serially.

Figure 28A:
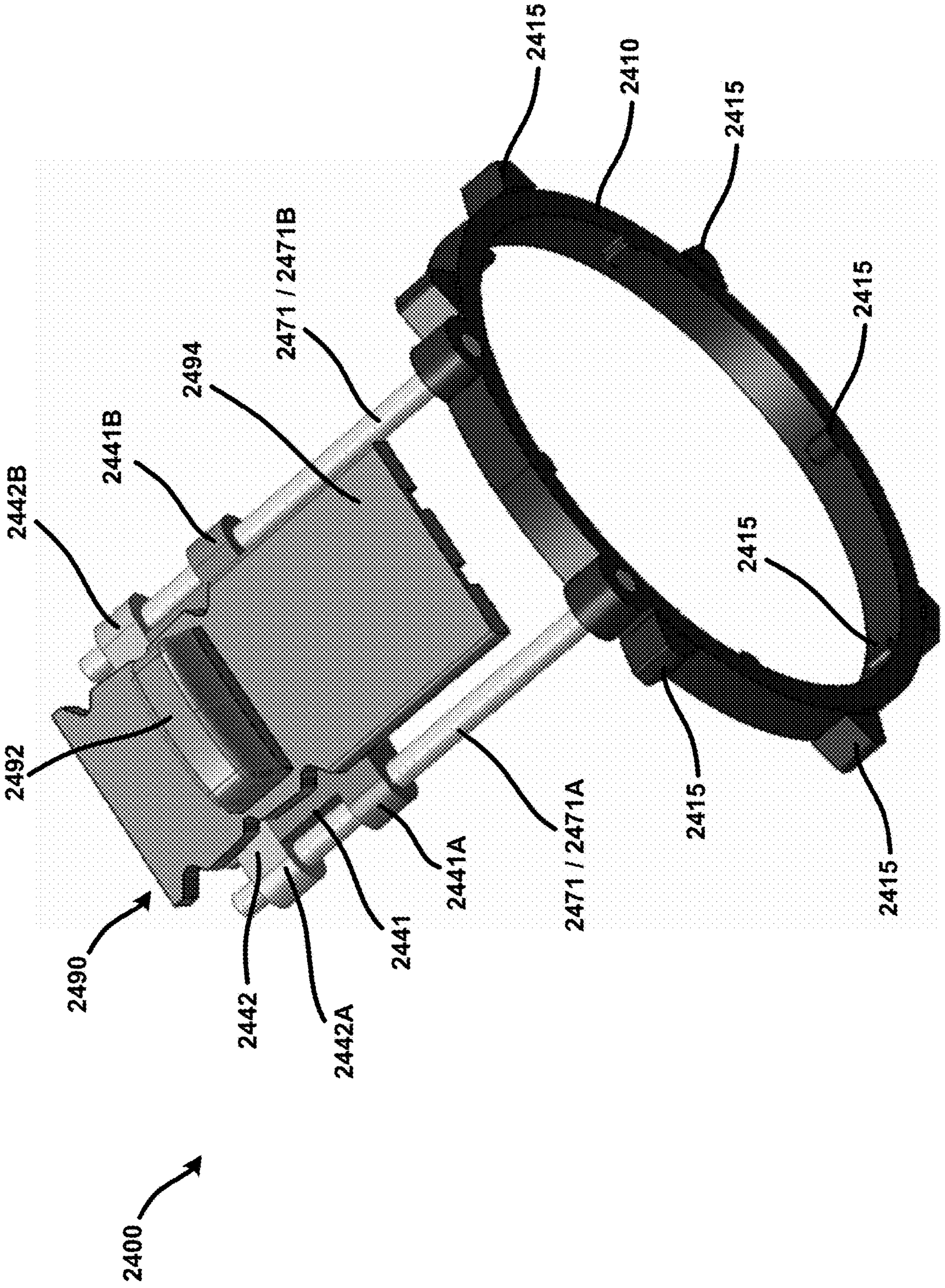
FIG. 28A is a top perspective view of an example speed selection mechanism, in accordance with implementations described herein.
Figure 28B:
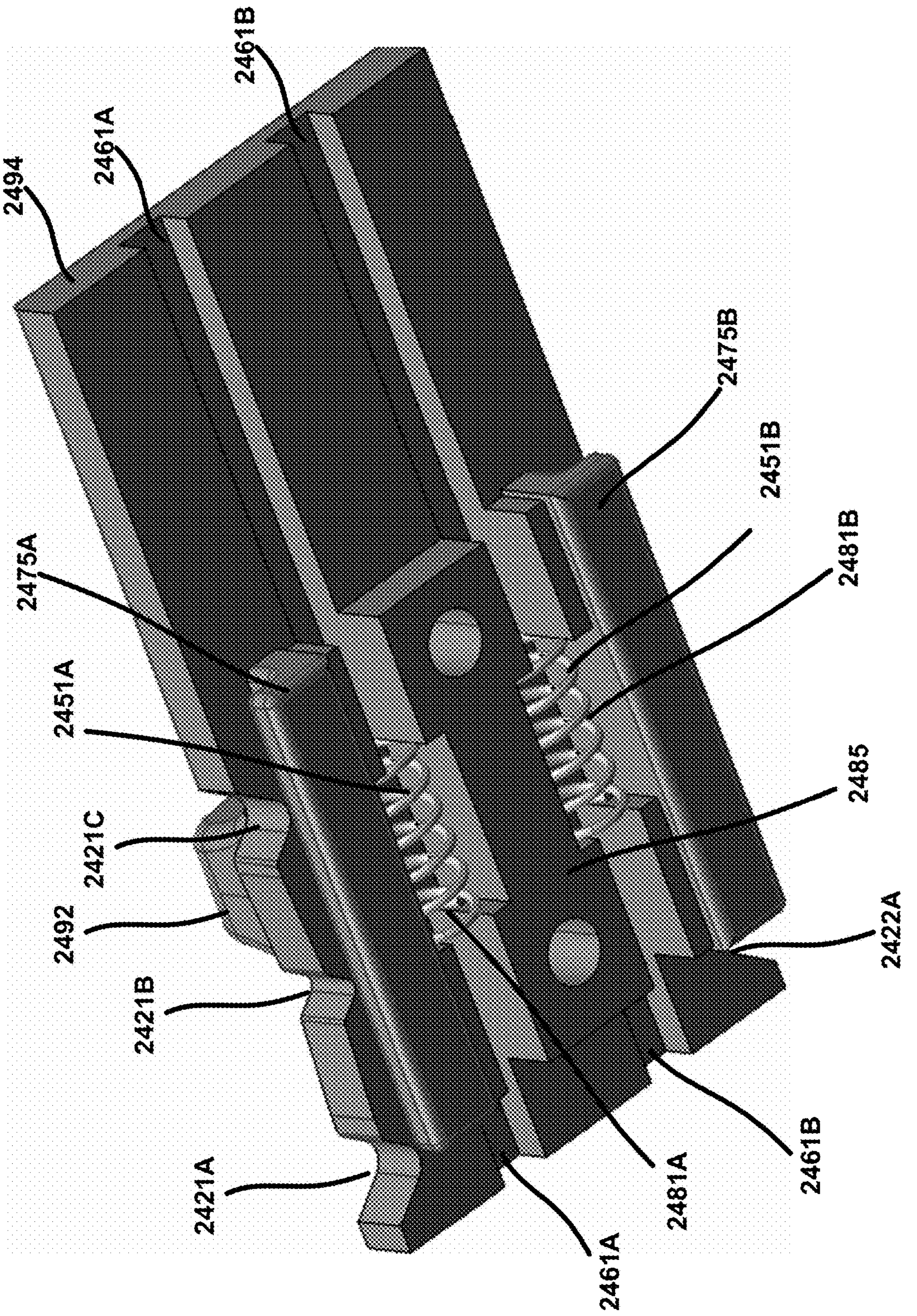
FIG. 28B is a bottom perspective view of a base of a switching device of the example speed selection mechanism shown in FIG. 28A.

FIG. 28A is a top perspective view of another example speed selection mechanism 2400, for use with the example multi-speed power-driven tool, in accordance with implementations described herein. FIG. 28B is a bottom perspective view of portion of the example speed selection mechanism 2400 shown in FIG. 28A.

The speed selection mechanism 2400, in accordance with implementations described herein, may provide for compliant shifting, for example, compliant multi-level shifting amongst a plurality of different speed reduction ratios, and amongst a plurality of corresponding operational output speeds, of the multi-speed power-driven tool. In the example implementations described above, the example multi-speed power-driven tool 100 included three modes of operation, or three output speeds (i.e., a first speed operation mode shown in FIGS. 11A and 12A, a second, intermediate speed operation mode shown in FIGS. 11B and 12B, and a third speed operation mode shown in FIGS. 11C, 11D and 12C). The example speed selection mechanism 2400 will be described with respect to shifting amongst three operation modes, or three output speeds, simply for purposes of discussion and illustration. The principles to be described herein with respect to the example speed selection mechanism may be adapted for use with a power driven tool that is operable in more, or fewer, operation modes and/or at more, or fewer, output speeds.

As shown in FIG. 28A, in some implementations, the speed selection mechanism 2400 may include a switching device 2490, or shifting device 2490, or speed selector 2490. The switching device 2490 may be coupled to a shift ring 2410 that is moved axially, in response to movement of the switching device 2490, to shift the output speed of the transmission mechanism 200 into the first, second or third mode of operation as described above, based on a position of the switching device 2490. The shift ring 2410 may be a complete ring (e.g., a circular shape) or a partial ring (e.g., a C-shape). In some implementations, the shift ring 2410 may include one or more guide lugs 2412 formed at an outer circumferential portion of the shift ring 2410. The guide lug(s) 21412 may be received in corresponding channels formed in an interior of the housing 190 (not shown), to guide the axial movement of the shift ring 2410. In some implementations, the shift ring 2410 may include one or more engagement lugs 2415 formed at an inner circumferential portion of the shift ring 2410. The engagement lugs 2415 may selectively engage features ring gears 270, 280, 290, for example, the lugs 272, 282, 292 of the first, second and third ring gears 270, 280, 290, respectively, to ground the selected ring gear 270, 280, 290 to the housing 190 for the selected output speed, as described above. A pair of axial pins 2471 (i.e., a first axial pin 2471A and a second axial pin 2471B) may each have a first end thereof coupled, for example, fixedly coupled, to the shift ring 2410. A first fork bushing 2441 may include a first fitting 2441A fixed to the first axial pin 2471A, and a second fitting 2441B fixed to the second axial pin 2471B. A second fork bushing 2442 may include a first fitting 2442A fixed to the first axial pin 2471A, and a second fitting 2442B fixed to the second axial pin 2471B. Thus, the first and second fork bushings 2441, 2442 may be fixed to, and may extend between, the pair of axial pins 2471, and the first and second fork bushings 2441, 2442 may move axially, together with the shift ring 2410.

The switching device 2490 may be positioned over the axial pins 2471 and the fork bushings 2441, 2442. The switching device 2490 may include a finger grip 1492 that extends at least partially out of the housing 190 of the tool 100, so that the switching device 2490 is accessible from an exterior of the tool 100, for manipulation by an operator of the tool 100. The switching device 2490 may include a shutter 2496 positioned on a base 2494, with the finger grip 2492 extending up from the base 2494 and out through an opening 2495 in the shutter 2496, so that the finger grip 2492 is movable within the opening 2495 to a plurality of selection positions, allowing for operator selection of different output modes, or speeds, of the tool 100.

As illustrated in the bottom perspective view of the base 2494 of the switching device 2490 shown in FIG. 28A, the first spring 2451A may be positioned in a first pocket 2481A defined in a bottom surface of the base 2494. The second spring 2451B may be positioned in a second pocket 2481B defined in the bottom surface of the base 2494. The first pocket 2481A may be at least partially defined by a first rail 2475A, together with a first side portion of a central post 2485 and a first channel 2461A extending along the length of the bottom portion of the base 2494. The second pocket 2481B may be at least partially defined by a second rail 2475B, together with a second side portion of the central post 2485 and a second channel 2461B extending along the length of the bottom portion of the base 2494. Opposite ends of the first spring 2451A may be retained against a first block 2455A of the first fork bushing 2441 and a first block 2457A of the second fork bushing 2442. Similarly, opposite ends of the second spring 2452 may be retained against a second block 2455B of the first fork bushing 2441 and a second block 2457B of the second fork bushing 2442.

A first set of detents 2421 (for example, three detents 2421A, 2421B and 2421C in the example arrangement shown) may be defined in a first side surface portion of the base 2494. A second set of detents 2422 (for example, three detents 2422A, 2422B and 2422C in the example arrangement shown) may be defined in a second side surface portion of the base 2494, at positions corresponding to the first set of detents 2421.

Figure 29A:
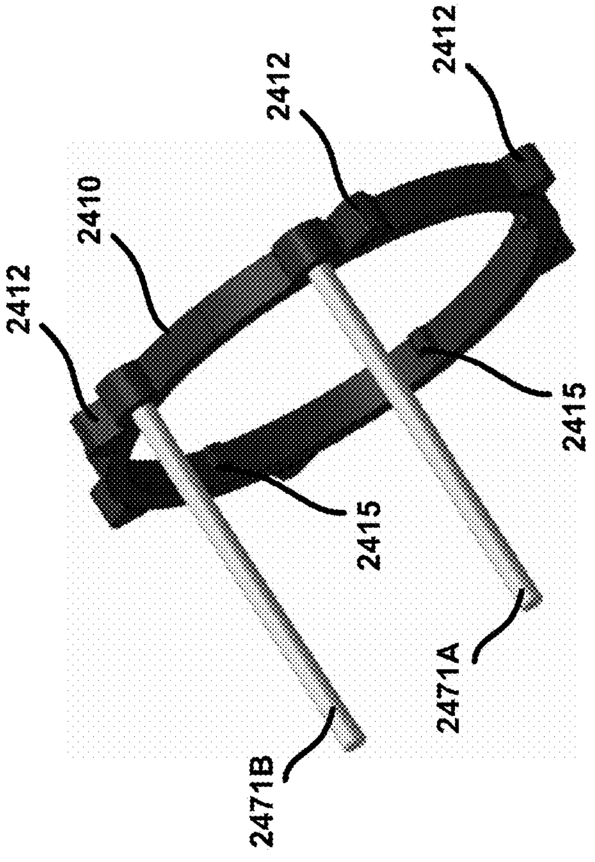
FIGS. 29A-29D are perspective views sequentially illustrating an assembly of the example speed selection mechanism shown in FIG. 27, in accordance with implementations described herein.
Figure 29B:
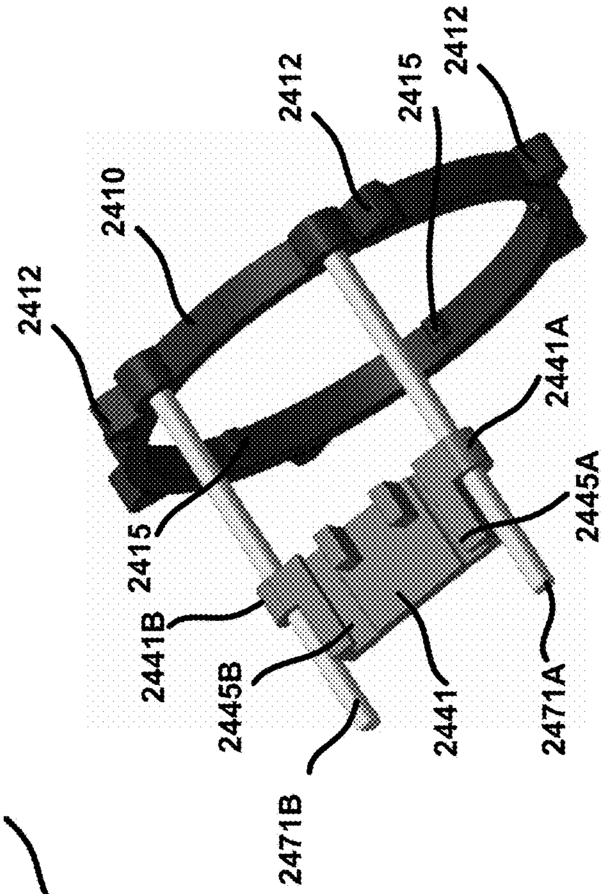
Figure 29D:
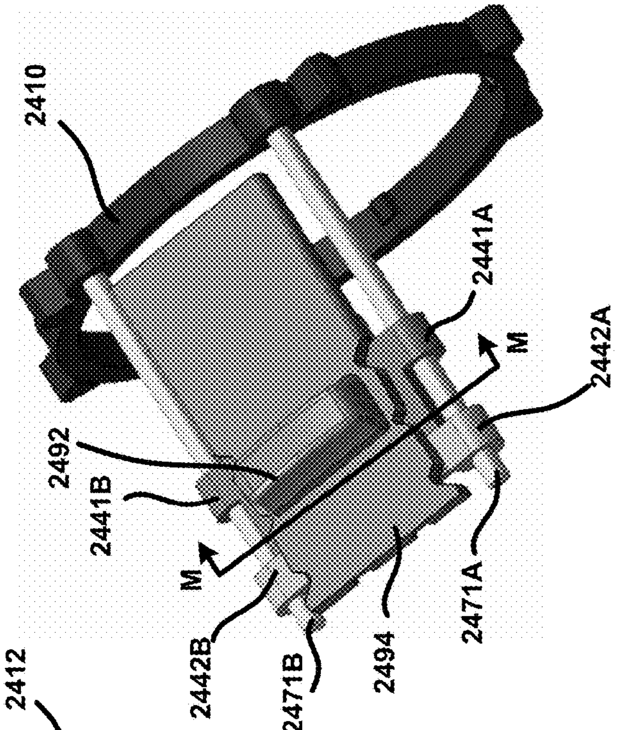
Figure 29C:
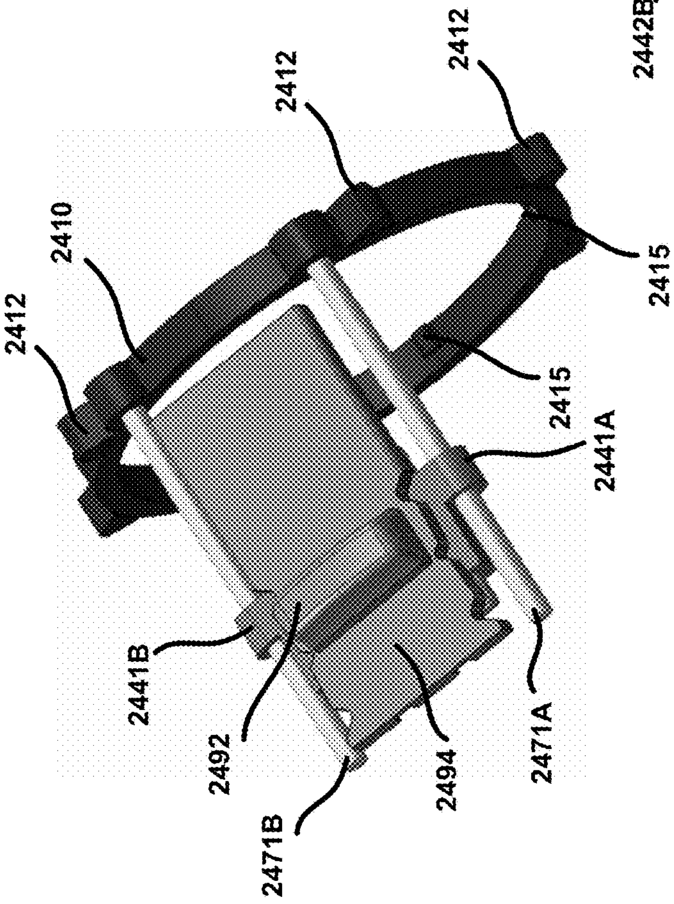

FIGS. 29A through 29D are perspective views sequentially illustrating the assembly of the speed selection mechanism 2400, in accordance with implementations described herein, to illustrate the interaction of the components of the speed selection mechanism 2400. As shown in FIG. 29A, the first end portion of the first and second axial pins 2471 may be fit, for example, press fit, into corresponding receiving openings in the shift ring 2410, to fix the coupling of the pins 2471 to the shift ring 2140. As shown in FIG. 29B, the first fork bushing 2441 may be installed onto the pins 2471. For example, the first axial pin 1471A may be fit, for example, press fit, in the first fitting 2441A of the first fork bushing 2441, and the second axial pin 1471B may be fit, for example, press fit, in the second fitting 2441B of the first fork bushing 2441. With the springs 2451 compressed into the respective pockets 2481 of the base 2494 of the switching device 2490, the base 2494 may be slidably coupled onto the first fork bushing 2441, as shown in FIG. 29C. In some implementations, the first rail 2475A formed on the bottom portion of the base 2494 may be slidably received in a corresponding first recess 2445A formed in the first fork bushing 2441, and the second rail 2475B of the base 2494 may be slidably received in a corresponding second recess 2445B formed in the first fork bushing 2441, to couple the base 2494 of the switching device 2490 to the first fork bushing 2441. The second fork bushing 2442 may then be installed by fitting, for example, press fitting the first and second axial pins 1471 into the first and second fittings 2442A, 2442B, respectively. This may also include slidably coupling the first and second rails 2475A, 2475B into corresponding first and second recesses 2447A and 2447B in the second fork bushing 2442.

Figure 30A:
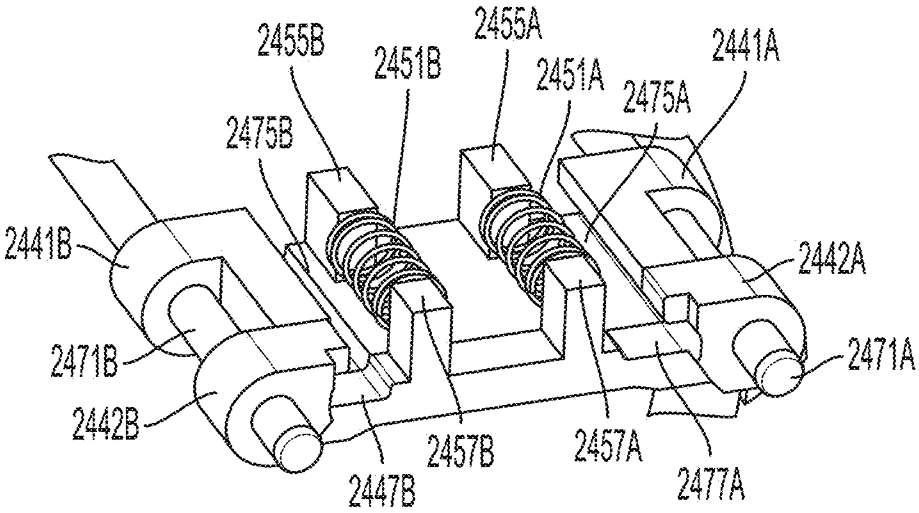
FIGS. 30A and 30B are perspective views first and second fork bushings and first and second pins of the example speed selection mechanism shown in FIG. 27, in accordance with implementations described herein.
Figure 30B:
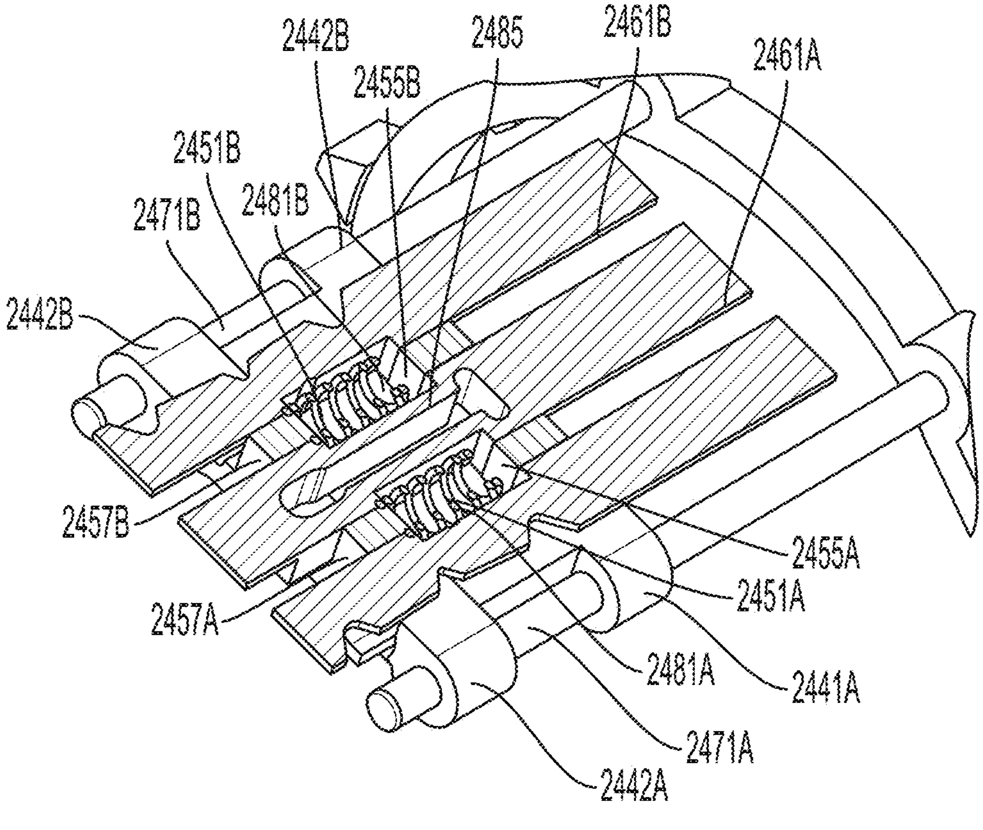
Figure 30C:
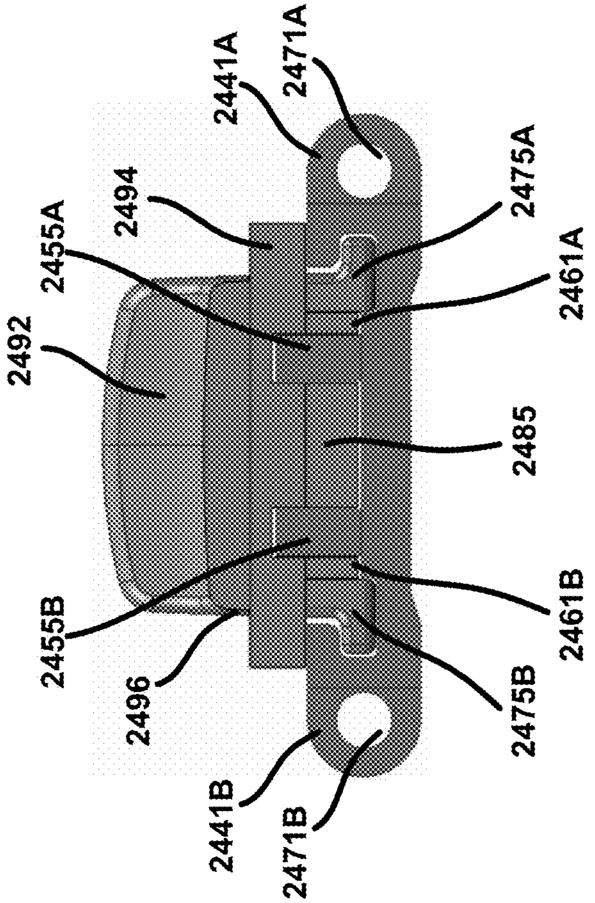
FIG. 30C is a cross sectional view taken along line M-M of FIG. 29D

FIG. 30A is a perspective view of the arrangement of the first and second fork bushings 2441, 2442 on the first and second pins 2471, with the base 2494 removed, so that the alignment of the first and second recesses 2475A, 2475B of the first fork bushing 2441 with the first and second recesses 2477A, 2477B of the second fork bushing 1442 is more clearly visible. FIG. 30B is a perspective view of the arrangement of the first and second fork bushings 2441, 2442 on the first and second rails 2475, with the base 2494 illustrated in shadow, so that the relationship of the first and second recesses 2475A, 2475B of the first fork bushing 2441, the first and second recesses 2477A, 2477B of the second fork bushing 2442, the first and second channels 2461A, 2461B of the base 2494, and the pockets 2481A, 2481B in which the springs 2451A, 2451B are respectively received, is more easily visible. FIG. 30C is a cross sectional view taken along line M-M of FIG. 29D.

Figure 31A:
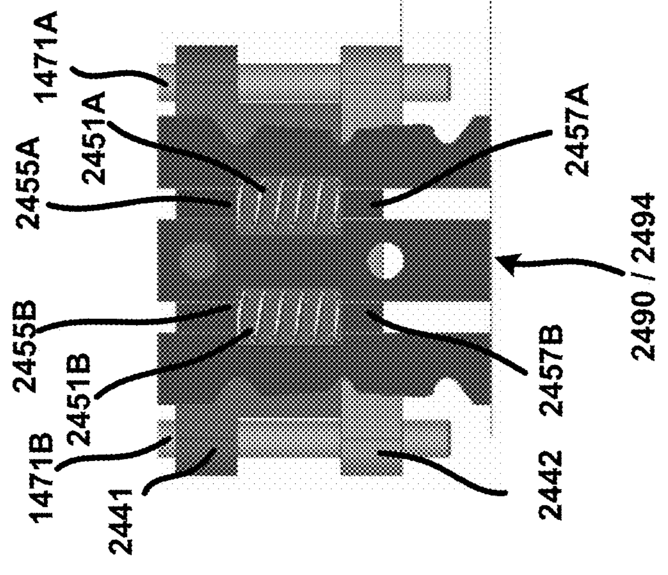
FIGS. 31A-31C illustrate a positioning of components of the example speed selection mechanism during an example shifting movement, in accordance with implementations described herein.
Figure 31B:
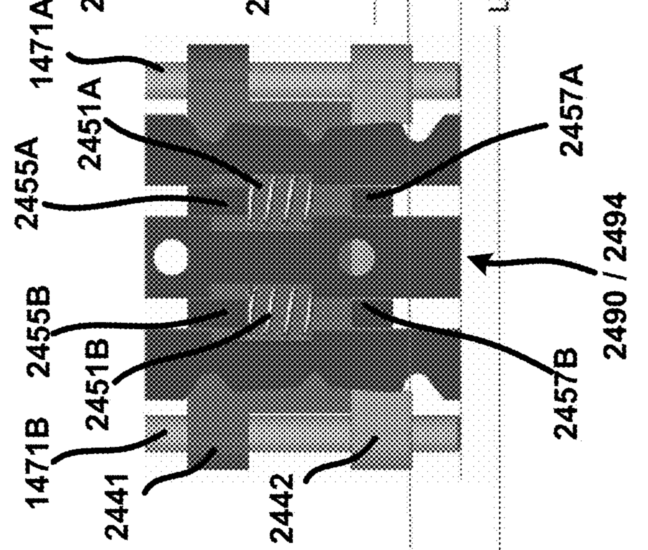
Figure 31C:
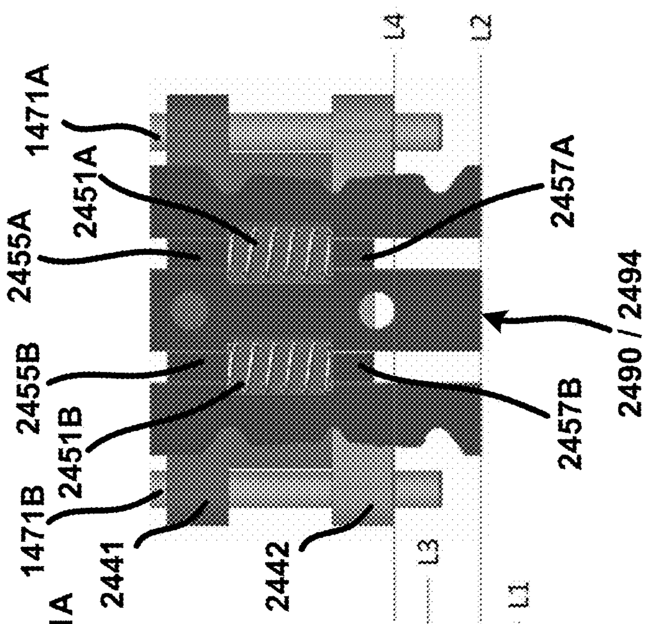

FIGS. 31A-31C illustrate movement of some of the components of the example speed selection mechanism 2400 during an example shifting movement, in accordance with implementations described herein. In particular, FIG. 31A illustrates a positioning of components at a first output speed setting, FIG. 31C illustrates a positioning of components at a second output speed setting, and FIG. 31B illustrates in interim arrangement of the components, as the mechanism 2400 shifts between the first output speed and the second output speed.

In the arrangement shown in FIG. 31A, the selection device 2490 is positioned so as to select a first output speed. At the first output speed, the end of base 2494 is positioned at the line L1, and the first and second fork bushings 2441, 2441 aligned at the position L3, with a position of the selection device 2490 retained by, for example, the engagement of one of the set of detents 2421/2422 engaged with a leaf spring fixed in the housing 190 (now shown). In FIG. 31B, the selection device 2490 has been moved from the position L2 to the position L2. At this interim position, the axial pins 1471 and the first and second fork bushings 2441, 2442 have remained stationary, aligned at the position L3. In this interim position, corner portions of the pockets 2481A, 2481B defined in the base 2494 compress the springs 2451A, 2451B against the blocks 2455A, 2455B of the first fork bushing 2441. At this interim position, due to, for example, the relative arrangement of the ring gears 270, 280, 290, and in particular the circumferential positioning of the lugs 272, 282, 292 of the ring gears 270, 280, 290, with respect to the engagement lugs 2415 of the shift ring 2410, it may be that the shift ring 2410 is temporarily blocked, or restricted, from moving axially to engage the desired ring gear 270, 280, 290. In response to application of power, one or more of the ring gears 270, 280, 290 may spin, the axial movement of the shift ring 2410 may no longer be obstructed, and the force of the springs 2451A, 2451B will push against the blocks 2455A, 2455B of the first fork bushing 2441, moving the first and second fork bushings 2441, 2442 and the axial pins 1471 from the position L3 to the position L4, and allowing the shift ring 2410 to move axially into engagement with the desired ring gear 270, 280, 290.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A multi-speed power tool, comprising:

a housing;

a motor received in the housing;

a multi-speed planetary transmission rotationally driven by the motor and defining a transmission axis, wherein the multi-speed transmission includes a plurality of subsections, each of the plurality of subsections being configured to produce a corresponding speed reduction, the plurality of subsections including a first subsection having a first set of planet gears and a first ring gear meshed with the first set of planet gears, and a second subsection having a second set of planet gears and a second ring gear meshed with the second set of planet gears, the transmission further including a carrier assembly, including a first carrier segment, a second carrier segment, a third carrier segment, a first set of supports connecting the first carrier segment to one of the second carrier segment or the third carrier segment and carrying the first set of planet gears, and a second set of supports connecting the third carrier segment to one of the first carrier segment or the second carrier segment and carrying the second set of planet gears, such that the first, second, and third carrier segments rotate in unison about the transmission axis, wherein each of the first set of supports is angularly spaced from each of the second set of supports, such that each of the first set of planet gears is angularly offset from each of the second set of planet gears;

an output shaft rotationally driven by the transmission; and a speed selector moveable among a first plurality of positions where the speed selector engages one or more of the plurality of subsections so as to cause the transmission to rotate the output shaft at a plurality of different output speeds.

2. The multi-speed power tool of claim 1, wherein each of the first set of planet gears include a front face facing the second set of planet gears and aligned in a first plane, and each of the second set of planet gears include a rear face facing the first set of planet gears and aligned in a second plane, wherein the first plane and the second plane are substantially coplanar.

3. The multi-speed power tool of claim 1, wherein the transmission further comprises a first sun gear meshed with the first set of planet gears and a second sun gear meshed with the second set of planet gears, the first and second sun gears being axially aligned, with at least the first sun gear being rotatably driven by the motor.

4. The multi-speed power tool of claim 1, wherein the speed selector is configured to ground the first ring gear to the housing in a first position to cause the transmission to rotate the output shaft a first speed, and to ground the second ring gear to the housing in a second position to cause the transmission to rotate the output shaft at a second speed that is different than the first speed.

5. The multi-speed power tool of claim 1, wherein the transmission further comprises a third subsection having a third set of planet gears and a third ring gear meshed with the third set of planet gears, the third set of planet gears carried by a third set of supports connected to one of the first carrier segment, the second carrier segment or the third carrier segment.

6. The multi-speed power tool of claim 5, wherein the speed selector is configured to ground the first ring gear to the housing in a first position to cause the transmission to rotate the output shaft a first speed, to ground the second ring gear to the housing in a second position to cause the transmission to rotate the output shaft at a second speed that is different from the first speed, and to ground the third ring gear to the housing in a third position to cause the transmission to rotate the output shaft at a third speed that is different from the first speed and the second speed.

7. The multi-speed power tool of claim 5, wherein the third set of supports is arranged such that the third set of planet gears is angularly offset from each of the first set of planet gears and second set of planet gears.

8. The multi-speed power tool of claim 5, wherein the carrier assembly further comprises a fourth carrier segment, wherein the third set of supports connect the fourth carrier segment to one of the second carrier segment or the third carrier segment.

9. The multi-speed power tool of claim 5, wherein the transmission further includes a plurality of sun gears that includes a first sun gear, a second sun gear and a third sun gear, wherein the first, second and third sun gears are axially aligned, and wherein the first set of planet gears includes a first stage thereof engaged with the first sun gear and a second stage thereof engaged with the second sun gear, the second set of planet gears includes a first stage thereof engaged with the second sun gear and a second stage thereof engaged with the third sun gear, and the third set of planet gears is engaged with the third sun gear.

10. The multi-speed power tool of claim 1, wherein the speed selector includes:

a shift member with an at least partial ring shape configured to move axially with respect to the transmission among the first plurality of positions; and a plurality of engagement members coupled to the shift member and configured to selectively engage one of the ring gears based on an axial position of the shift member with respect to the transmission.

11. The multi-speed power tool of claim 10, wherein the speed selector further includes:

a switch that is accessible from an outside of the housing, and that is movable within an opening formed in the housing; and at least one shift rail having a first end portion fixed to the switch and a second end portion fixed to the shift member, wherein the switch includes a base portion having a first side portion coupled to the at least one shift rail, a shutter slidably coupled on a second side portion of the base portion, opposite the first side portion thereof, and grasping portion extending from the base portion through an opening formed in the shutter, and wherein the selector is movable among a second plurality of positions between a first end of the opening in the housing and a second end of the opening in the housing, the second plurality of positions corresponding to the first plurality of positions of the shift member with respect to the transmission.

12. The multi-speed power tool of claim 1, wherein the speed selector comprises:

a shift member inside the housing moveable among the first plurality of positions;

a switch accessible from outside the housing, coupled to the shift member, and moveable among a second plurality of positions corresponding to selected output speeds of the transmission to cause movement of the shift member among the first plurality of positions; and at least one spring disposed between the shift member and the switch, wherein if the switch is moved from a first switch position to a second switch position of the second plurality of positions and the shift member is blocked from moving from a first speed position to a second speed position of the first plurality of positions, the shift member remains stationary and when the shift member is later unblocked from moving from the first speed position to the second speed position, a force provided by the at least one spring urges the shift member to move to the second speed position while the switch remains stationary.

13. The multi-speed power tool of claim 11, wherein a distance from a first end of the base portion to a second end of the base portion is less than a distance from the first end of the opening in the housing to the second end of the opening in the housing, and the shutter is configured to slide with respect to the base portion as the selection device moves in the opening, such that the shutter and the base portion close the opening in the housing at the plurality of positions of the selector between the first end and the second end of the opening.

14. The multi-speed power tool of claim 12, wherein the at least one spring exerts a bi-directional biasing force on the shift member in both an axial forward and an axial rearward direction relative to the switch.

15. The multi-speed power tool of claim 14, wherein the at least one spring comprises a plurality of springs arranged parallel to one another without any springs arranged serially relative to one another.

16. The multi-speed power tool of claim 1, wherein at least one of the first set of planet gears or the second set of planet gears is at least partially nested inside the second carrier segment.

17. The multi-speed power tool of claim 1, wherein the transmission further comprises a third subsection having a third set of planet gears and a third ring gear meshed with the third set of planet gears, the third set of planet gears being carried by a third set of supports connecting one of the first carrier segment, the second carrier segment or the third carrier segment to a fourth carrier segment, and wherein the first set of supports, the second set of supports and the third set of supports are arranged such that the first set of planet gears, the second set of planet gears, and the third set of planet gears are angularly offset from each other.

18. The multi-speed power tool of claim 16, wherein each of the first set of planet gears includes a front face facing the second set of planet gears, each of the second set of planet gears include a rear face facing the first set of planet gears, and the front face and the rear face are substantially in a common plane.

19. A multi-speed transmission for a power tool, comprising:

an input shaft configured to rotate about a transmission axis;

a plurality of subsections, each of the plurality of subsections being configured to produce a corresponding speed reduction, the plurality of subsections including a first subsection including a first set of planet gears configured to be driven by rotation of the input shaft and a first ring gear meshed with the first set of planet gears and configured to provide a first speed reduction, a second subsection including a second set of planet gears and a second ring gear meshed with the second set of planet gears and configured to provide a second speed reduction, and a carrier assembly including a first carrier segment, a second carrier segment, and a third carrier segment, wherein the carrier assembly further includes a first set of supports connecting the first carrier segment to one of the second carrier segment or the third carrier segment and carrying the first set of planet gears, and a second set of supports connecting the third carrier segment to one of the first carrier segment or the second carrier segment and carrying the second set of planet gears, such that the first, second, and third carrier segments rotate in unison about the transmission axis;

an output shaft configured to be driven by the carrier assembly about the transmission axis; and a speed selector moveable among a plurality of positions where the speed selector engages one or more of the first subsection or the second subsection so as to cause the output shaft to rotate at a first output speed or a second output speed, wherein each of the first set of supports is angularly spaced from each of the second set of supports, such that each of the first set of planet gears is angularly offset from each of the second set of planet gears.

20. A multi-speed transmission for a power tool, comprising:

an input shaft configured to rotate about a transmission axis;

a plurality of subsections, each of the plurality of subsections being configured to produce a corresponding speed reduction, the plurality of subsections including a first subsection having a first set of planet gears and a first ring gear meshed with the first set of planet gears, a second subsection having a second set of planet gears and a second ring gear meshed with the second set of planet gears, and a carrier assembly including a first carrier segment, a second carrier segment, a third carrier segment, the carrier assembly further including a first set of supports connecting the first carrier segment to one of the second carrier segment or the third carrier segment, and a second set of supports connecting the third carrier segment to one of the first carrier segment or the third second carrier segment;

an output shaft configured to be driven by the carrier assembly about the transmission axis; and a speed selector moveable among a plurality of positions where the speed selector engages one or more of the plurality of subsections so as to cause the transmission to rotate the output shaft at a plurality of different output speeds, wherein the first set of supports carries the first set of planet gears and the second set of supports carries the second set of planet gears such that the first, second, and third carrier segments rotate in unison about the transmission axis, and wherein at least one of the first set of planet gears or the second set of planet gears is at least partially nested inside the second carrier segment.

21. The multi-speed transmission of claim 19, wherein each of the first set of planet gears include a front face facing the second set of planet gears and aligned in a first plane, and each of the second set of planet gears include a rear face facing the first set of planet gears and aligned in a second plane, wherein the first plane and the second plane are substantially coplanar.

22. The multi-speed transmission of claim 19, further comprising a first sun gear meshed with the first set of planet gears and a second sun gear meshed with the second set of planet gears, the first and second sun gears being axially aligned, with at least the first sun gear being rotatably driven by a motor of the power tool.

23. The multi-speed transmission of claim 19, wherein the speed selector is configured to ground the first ring gear to a housing of the power tool in a first position to cause the transmission to rotate the output shaft a first speed, and to ground the second ring gear to the housing in a second position to cause the transmission to rotate the output shaft at a second speed that is different than the first speed.

24. The multi-speed transmission of claim 19, further comprising a third subsection having a third set of planet gears and a third ring gear meshed with the third set of planet gears, the third set of planet gears carried by a third set of supports connected to one of the first carrier segment, the second carrier segment or the third carrier segment.

25. The multi-speed transmission of claim 19, wherein the speed selector includes:

a shift member with an at least partial ring shape configured to move axially with respect to the transmission among the first plurality of positions; and a plurality of engagement members coupled to the shift member and configured to selectively engage one of the ring gears based on an axial position of the shift member with respect to the transmission.

26. The multi-speed transmission of claim 19, wherein the speed selector comprises:

a shift member inside a housing of the power tool, moveable among the first plurality of positions;

a switch accessible from outside the housing, coupled to the shift member, and moveable among a second plurality of positions corresponding to selected output speeds of the transmission to cause movement of the shift member among the first plurality of positions; and at least one spring disposed between the shift member and the switch, wherein if the switch is moved from a first switch position to a second switch position of the second plurality of positions and the shift member is blocked from moving from a first speed position to a second speed position of the first plurality of positions, the shift member remains stationary and when the shift member is later unblocked from moving from the first speed position to the second speed position, a force provided by the at least one spring urges the shift member to move to the second speed position while the switch remains stationary.

27. The multi-speed transmission of claim 19, wherein at least one of the first set of planet gears or the second set of planet gears is at least partially nested inside the second carrier segment.

28. The multi-speed transmission of claim 20, wherein each of the first set of planet gears include a front face facing the second set of planet gears and aligned in a first plane, and each of the second set of planet gears include a rear face facing the first set of planet gears and aligned in a second plane, wherein the first plane and the second plane are substantially coplanar.

29. The multi-speed transmission of claim 20, further comprising a first sun gear meshed with the first set of planet gears and a second sun gear meshed with the second set of planet gears, the first and second sun gears being axially aligned, with at least the first sun gear being rotatably driven by a motor of the power tool.

30. The multi-speed transmission of claim 20, wherein the speed selector is configured to ground the first ring gear to a housing of the power tool in a first position to cause the transmission to rotate the output shaft a first speed, and to ground the second ring gear to the housing in a second position to cause the transmission to rotate the output shaft at a second speed that is different than the first speed.

31. The multi-speed transmission of claim 20, further comprising a third subsection having a third set of planet gears and a third ring gear meshed with the third set of planet gears, the third set of planet gears carried by a third set of supports connected to one of the first carrier segment, the second carrier segment or the third carrier segment.

32. The multi-speed transmission of claim 20, wherein the speed selector includes:

a shift member with an at least partial ring shape configured to move axially with respect to the transmission among the first plurality of positions; and a plurality of engagement members coupled to the shift member and configured to selectively engage one of the ring gears based on an axial position of the shift member with respect to the transmission.

33. The multi-speed transmission of claim 20, wherein the speed selector comprises:

a shift member inside a housing of the power tool, moveable among the first plurality of positions;

a switch accessible from outside the housing, coupled to the shift member, and moveable among a second plurality of positions corresponding to selected output speeds of the transmission to cause movement of the shift member among the first plurality of positions; and at least one spring disposed between the shift member and the switch, wherein if the switch is moved from a first switch position to a second switch position of the second plurality of positions and the shift member is blocked from moving from a first speed position to a second speed position of the first plurality of positions, the shift member remains stationary and when the shift member is later unblocked from moving from the first speed position to the second speed position, a force provided by the at least one spring urges the shift member to move to the second speed position while the switch remains stationary.

* * * * *